US012695793B1

(12) United States Patent
Hassey et al.

(10) Patent No.: US 12,695,793 B1
(45) Date of Patent: Jul. 28, 2026

(54) DISTRIBUTING SECURITY POLICIES

(71) Applicant: Delinea Inc., San Francisco, CA (US)

(72) Inventors: Philip David Hassey, Rye, CO (US);
Patrick Richard Jakubowski, Seattle,
WA (US); Kevin David Jamieson,
North Vancouver (CA); **William Craig
Jones**, Lake Charles, LA (US)

(73) Assignee: Delinea Inc., San Francisco, CA (US)

( * ) Notice: Subject to any disclaimer, the term of this
patent is extended or adjusted under 35
U.S.C. 154(b) by 0 days.

(21) Appl. No.: 19/382,040

(22) Filed: Nov. 6, 2025

(51) Int. Cl.
*H04L 9/40* (2022.01)

(52) U.S. Cl.
CPC .................................... *H04L 63/20* (2013.01)

(58) Field of Classification Search
CPC ........ H04L 63/20; H04L 63/1425; G06F 9/45
See application file for complete search history.

(56) References Cited

U.S. PATENT DOCUMENTS

| | | | |
|---|---|---|---|
| 5,867,494 | A | 2/1999 | Krishnaswamy et al. |
| 5,867,495 | A | 2/1999 | Elliott et al. |
| 5,884,794 | A | 3/1999 | Calhoun et al. |
| 5,987,247 | A | 11/1999 | Lau |
| 6,335,927 | B1 | 1/2002 | Elliott et al. |
| 6,345,386 | B1 | 2/2002 | Delo et al. |
| 6,418,447 | B1 | 7/2002 | Frey et al. |
| 6,418,554 | B1 | 7/2002 | Delo et al. |
| 6,442,564 | B1 | 8/2002 | Frey et al. |
| 6,463,470 | B1 | 10/2002 | Mohaban et al. |
| 6,466,932 | B1 | 10/2002 | Dennis et al. |
| 6,502,103 | B1 | 12/2002 | Frey et al. |
| 6,505,210 | B1 | 1/2003 | Frey et al. |
| 6,523,166 | B1 | 2/2003 | Mishra et al. |
| 6,553,384 | B1 | 4/2003 | Frey et al. |
| 6,560,609 | B1 | 5/2003 | Frey et al. |

(Continued)

FOREIGN PATENT DOCUMENTS

| | | |
|---|---|---|
| CA | 2847507 A1 | 11/2014 |
| EP | 3422236 B1 | 6/2022 |

OTHER PUBLICATIONS

Office Communication for U.S. Appl. No. 19/335,531 mailed Nov. 17, 2025, 17 pages.

(Continued)

*Primary Examiner* — Khalid M Almaghayreh
(74) *Attorney, Agent, or Firm* — John W. Branch; Branch
Partners PLLC

(57) ABSTRACT

Embodiments distribute security policies in network environments. Entity change entries associated with updating, adding or removing entities from an entity datastore may be obtained. A request to obtain a security state view may be employed to perform additional actions, including: obtaining a new log identifier based on a current log identifier associated with the request; obtaining log change entries associated with the new log identifier and the plurality of entities based on the entity change entries; collecting one or more entities based on other log change entries that may be associated with log identifiers that may be associated with the request; obtaining the security state view based on the one or more entities such that the security state view may be associated with the new log identifier and such that the security state view enforces security policies for the one or more entities in the computing environment.

20 Claims, 19 Drawing Sheets

(56) References Cited

U.S. PATENT DOCUMENTS

| | | | |
|---|---|---|---|
| 6,567,818 B1 | 5/2003 | Frey et al. | |
| 6,594,671 B1 | 7/2003 | Aman et al. | |
| 6,836,794 B1 | 12/2004 | Lucovsky et al. | |
| 6,909,708 B1 | 6/2005 | Krishnaswamy et al. | |
| 7,165,107 B2 | 1/2007 | Pouyoul et al. | |
| 7,174,361 B1 | 2/2007 | Paas | |
| 7,233,569 B1 | 6/2007 | Swallow | |
| 7,752,466 B2 | 7/2010 | Ginter et al. | |
| 7,752,487 B1 | 7/2010 | Feeser et al. | |
| 7,788,399 B2 | 8/2010 | Brouk et al. | |
| 7,797,406 B2 | 9/2010 | Patel et al. | |
| 7,882,247 B2 | 2/2011 | Sturniolo et al. | |
| 7,886,339 B2 | 2/2011 | Keohane et al. | |
| 8,102,814 B2 | 1/2012 | Rahman et al. | |
| 8,135,815 B2 | 3/2012 | Mayer | |
| 8,165,905 B2 | 4/2012 | Yamamoto | |
| 8,321,941 B2 | 11/2012 | Tuvell et al. | |
| 8,656,154 B1 | 2/2014 | Kailash et al. | |
| 8,656,478 B1 | 2/2014 | Forristal | |
| 8,806,593 B1 | 8/2014 | Raphel et al. | |
| 8,817,668 B2 | 8/2014 | Sekaran et al. | |
| 8,869,259 B1 | 10/2014 | Udupa et al. | |
| 9,002,805 B1 | 4/2015 | Barber et al. | |
| 9,026,079 B2 | 5/2015 | Raleigh et al. | |
| 9,052,942 B1 | 6/2015 | Barber et al. | |
| 9,063,946 B1 | 6/2015 | Barber et al. | |
| 9,082,402 B2 | 7/2015 | Yadgar et al. | |
| 9,088,571 B2 | 7/2015 | Bryan et al. | |
| 9,176,758 B2 | 11/2015 | Swaminathan | |
| 9,178,793 B1 | 11/2015 | Marlow | |
| 9,185,082 B2 | 11/2015 | Dashora et al. | |
| 9,239,834 B2 | 1/2016 | Donabedian et al. | |
| 9,264,449 B1 * | 2/2016 | Roth | H04L 63/102 |
| 9,300,635 B1 | 3/2016 | Gilde et al. | |
| 9,344,509 B1 | 5/2016 | Serboncini et al. | |
| 9,355,060 B1 | 5/2016 | Barber et al. | |
| 9,369,433 B1 | 6/2016 | Paul et al. | |
| 9,380,456 B1 | 6/2016 | Lee et al. | |
| 9,380,523 B1 | 6/2016 | Mijar et al. | |
| 9,380,562 B1 | 6/2016 | Vetter et al. | |
| 9,417,917 B1 | 8/2016 | Barber et al. | |
| 9,471,775 B1 | 10/2016 | Wagner et al. | |
| 9,491,157 B1 | 11/2016 | Amdahl et al. | |
| 9,521,115 B1 | 12/2016 | Woolward | |
| 9,560,081 B1 | 1/2017 | Woolward | |
| 9,578,052 B2 | 2/2017 | Cp et al. | |
| 9,584,523 B2 | 2/2017 | Santhiveeran | |
| 9,619,673 B1 | 4/2017 | Vetter et al. | |
| 9,632,828 B1 | 4/2017 | Mehta et al. | |
| 9,658,983 B1 | 5/2017 | Barber et al. | |
| 9,667,703 B1 | 5/2017 | Vetter et al. | |
| 9,697,629 B1 | 7/2017 | Vetter et al. | |
| 9,727,522 B1 | 8/2017 | Barber et al. | |
| 9,729,581 B1 | 8/2017 | Skene et al. | |
| 9,762,619 B1 | 9/2017 | Vaidya et al. | |
| 9,787,639 B1 | 10/2017 | Sun et al. | |
| 9,800,517 B1 | 10/2017 | Anderson | |
| 9,819,593 B1 | 11/2017 | Vetter et al. | |
| 9,825,911 B1 | 11/2017 | Brandwine | |
| 9,882,767 B1 | 1/2018 | Foxhoven et al. | |
| 9,948,644 B2 | 4/2018 | Brouk et al. | |
| 10,033,766 B2 | 7/2018 | Gupta et al. | |
| 10,063,595 B1 | 8/2018 | Qureshi et al. | |
| 10,075,334 B1 | 9/2018 | Kozura et al. | |
| 10,089,476 B1 | 10/2018 | Roth et al. | |
| 10,104,185 B1 | 10/2018 | Sharifi et al. | |
| 10,110,593 B2 | 10/2018 | Karroumi et al. | |
| 10,116,679 B1 | 10/2018 | Wu et al. | |
| 10,117,098 B1 | 10/2018 | Naguthanawala et al. | |
| 10,154,065 B1 | 12/2018 | Buchler et al. | |
| 10,158,545 B1 | 12/2018 | Marrone et al. | |
| 10,205,743 B2 | 2/2019 | Cp et al. | |
| 10,292,033 B2 | 5/2019 | Beyer et al. | |
| 10,348,767 B1 | 7/2019 | Lee et al. | |
| 10,360,010 B1 | 7/2019 | Maehler et al. | |
| 10,361,859 B2 | 7/2019 | Clark et al. | |
| 10,382,401 B1 | 8/2019 | Lee et al. | |
| 10,395,042 B2 | 8/2019 | Agarwal et al. | |
| 10,409,579 B1 * | 9/2019 | Morris | G06F 11/3055 |
| 10,409,582 B1 | 9/2019 | Maehler et al. | |
| 10,454,975 B1 | 10/2019 | Sharifi Mehr | |
| 10,476,745 B1 | 11/2019 | McCormick et al. | |
| 10,505,989 B2 | 12/2019 | Hankins et al. | |
| 10,511,590 B1 | 12/2019 | Bosch et al. | |
| 10,511,614 B1 | 12/2019 | Aziz | |
| 10,516,667 B1 | 12/2019 | Roth et al. | |
| 10,579,362 B1 | 3/2020 | Maehler et al. | |
| 10,579,403 B2 | 3/2020 | Antony et al. | |
| 10,587,621 B2 | 3/2020 | Ponnuswamy et al. | |
| 10,587,644 B1 | 3/2020 | Stolte et al. | |
| 10,609,041 B1 | 3/2020 | Wilczynski et al. | |
| 10,645,115 B2 | 5/2020 | Cp et al. | |
| 10,645,562 B2 | 5/2020 | Beyer et al. | |
| 10,659,533 B1 | 5/2020 | Zhao et al. | |
| 10,728,117 B1 | 7/2020 | Sharma et al. | |
| 10,735,263 B1 | 8/2020 | Mcalary et al. | |
| 10,764,244 B1 | 9/2020 | Mestery et al. | |
| 10,827,020 B1 | 11/2020 | Cao et al. | |
| 10,917,438 B2 | 2/2021 | Gandham et al. | |
| 10,944,561 B1 | 3/2021 | Cahill et al. | |
| 10,944,691 B1 | 3/2021 | Raut et al. | |
| 10,958,649 B2 | 3/2021 | Delcourt et al. | |
| 10,999,326 B1 | 5/2021 | Pollitt et al. | |
| 11,038,861 B2 | 6/2021 | Agarwal et al. | |
| 11,070,594 B1 | 7/2021 | Marrone et al. | |
| 11,075,747 B1 | 7/2021 | Holsman | |
| 11,075,923 B1 | 7/2021 | Srinivasan et al. | |
| 11,089,047 B1 | 8/2021 | Kaushal et al. | |
| 11,102,076 B1 | 8/2021 | Pieczul et al. | |
| 11,102,147 B2 | 8/2021 | Mehta et al. | |
| 11,153,190 B1 | 10/2021 | Mahajan et al. | |
| 11,163,614 B1 | 11/2021 | Francisco | |
| 11,165,783 B1 | 11/2021 | Eiers et al. | |
| 11,171,984 B2 | 11/2021 | Cp et al. | |
| 11,228,945 B2 | 1/2022 | Yang et al. | |
| 11,233,872 B2 | 1/2022 | Shribman et al. | |
| 11,249,809 B1 | 2/2022 | Tang et al. | |
| 11,290,143 B1 | 3/2022 | Sternowski | |
| 11,303,643 B1 | 4/2022 | Li et al. | |
| 11,310,650 B2 | 4/2022 | Zhau | |
| 11,316,822 B1 | 4/2022 | Gawade et al. | |
| 11,323,919 B1 | 5/2022 | Parulkar et al. | |
| 11,375,300 B2 | 6/2022 | Sagie et al. | |
| 11,412,051 B1 | 8/2022 | Chiganmi et al. | |
| 11,424,946 B2 | 8/2022 | Shribman et al. | |
| 11,431,497 B1 | 8/2022 | Liguori et al. | |
| 11,483,308 B2 | 10/2022 | Kale et al. | |
| 11,502,908 B1 | 11/2022 | Singh | |
| 11,521,444 B1 | 12/2022 | Badik et al. | |
| 11,528,147 B2 | 12/2022 | Madisetti et al. | |
| 11,538,287 B2 | 12/2022 | Fang et al. | |
| 11,546,323 B1 | 1/2023 | Jones et al. | |
| 11,546,763 B1 | 1/2023 | Filho et al. | |
| 11,599,714 B2 | 3/2023 | Munro et al. | |
| 11,599,841 B2 | 3/2023 | Anisingaraju et al. | |
| 11,620,103 B2 | 4/2023 | Graham et al. | |
| 11,632,669 B2 | 4/2023 | Xu et al. | |
| 11,657,145 B2 | 5/2023 | Cristina et al. | |
| 11,729,620 B1 | 8/2023 | Filho et al. | |
| 11,736,531 B1 | 8/2023 | Filho et al. | |
| 11,765,159 B1 | 9/2023 | Crawford et al. | |
| 11,765,207 B1 | 9/2023 | McCarthy et al. | |
| 11,784,999 B1 | 10/2023 | Jones et al. | |
| 11,831,511 B1 | 11/2023 | Zhou et al. | |
| 11,861,221 B1 | 1/2024 | Richardson et al. | |
| 11,916,885 B1 | 2/2024 | Cirello Filho et al. | |
| 11,916,968 B1 | 2/2024 | Cirello Filho et al. | |
| 11,930,045 B1 | 3/2024 | Baker et al. | |
| 11,936,693 B2 | 3/2024 | Reznik et al. | |
| 11,954,219 B1 | 4/2024 | Makmal et al. | |
| 11,973,752 B2 | 4/2024 | Crawford et al. | |
| 12,028,321 B1 | 7/2024 | Cirello Filho et al. | |
| 12,063,148 B2 | 8/2024 | Dabell et al. | |
| 12,063,218 B2 | 8/2024 | Wilczynski et al. | |

(56) References Cited

U.S. PATENT DOCUMENTS

| | | |
|---|---|---|
| 12,063,550 B2 | 8/2024 | Qiao et al. |
| 12,132,735 B1 | 10/2024 | Razavi et al. |
| 12,177,097 B2 | 12/2024 | Gupta et al. |
| 12,184,667 B2 | 12/2024 | Chacko |
| 12,184,700 B2 | 12/2024 | Raleigh |
| 12,238,119 B1 | 2/2025 | Chivu et al. |
| 12,242,599 B1 | 3/2025 | Hassey et al. |
| 12,277,224 B1 | 4/2025 | Nazari et al. |
| 12,277,410 B1 | 4/2025 | Nazari et al. |
| 12,284,224 B1 | 4/2025 | Cirello Filho et al. |
| 12,307,291 B1 | 5/2025 | Nazari et al. |
| 12,348,519 B1 | 7/2025 | Hassey et al. |
| 12,355,770 B2 | 7/2025 | Cirello Filho et al. |
| 12,405,773 B1 | 9/2025 | Nazari et al. |
| 12,423,418 B1 | 9/2025 | Hassey et al. |
| 12,432,242 B1 | 9/2025 | McCarthy et al. |
| 2002/0099952 A1 | 7/2002 | Lambert et al. |
| 2002/0124144 A1 | 9/2002 | Gharachorloo et al. |
| 2002/0133534 A1 | 9/2002 | Forslow |
| 2002/0140738 A1 | 10/2002 | West et al. |
| 2002/0149623 A1 | 10/2002 | West et al. |
| 2003/0041141 A1 | 2/2003 | Abdelaziz et al. |
| 2003/0058286 A1 | 3/2003 | Dando |
| 2003/0093465 A1 | 5/2003 | Banerjee et al. |
| 2003/0145317 A1 | 7/2003 | Chamberlain |
| 2003/0177182 A1 | 9/2003 | Clark et al. |
| 2004/0019898 A1 | 1/2004 | Frey et al. |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0088348 A1 | 5/2004 | Yeager et al. |
| 2004/0133640 A1 | 7/2004 | Yeager et al. |
| 2004/0184070 A1 | 9/2004 | Kiraly et al. |
| 2005/0022185 A1 | 1/2005 | Romero |
| 2005/0132227 A1 | 6/2005 | Reasor et al. |
| 2005/0164650 A1 | 7/2005 | Johnson |
| 2005/0209876 A1 | 9/2005 | Kennis et al. |
| 2006/0074876 A1 | 4/2006 | Kakivaya et al. |
| 2006/0136928 A1 | 6/2006 | Crawford et al. |
| 2006/0177005 A1 | 8/2006 | Shaffer et al. |
| 2006/0177024 A1 | 8/2006 | Frifeldt et al. |
| 2006/0177025 A1 | 8/2006 | Frifeldt et al. |
| 2006/0190991 A1 | 8/2006 | Iyer |
| 2006/0200856 A1 | 9/2006 | Salowey et al. |
| 2006/0212487 A1 | 9/2006 | Kennis et al. |
| 2006/0233166 A1 | 10/2006 | Bou-Diab et al. |
| 2006/0233180 A1 | 10/2006 | Serghi et al. |
| 2006/0235973 A1 | 10/2006 | McBride et al. |
| 2006/0240824 A1 | 10/2006 | Henderson et al. |
| 2006/0265708 A1 | 11/2006 | Blanding et al. |
| 2006/0265758 A1 | 11/2006 | Khandelwal et al. |
| 2006/0288204 A1 | 12/2006 | Sood et al. |
| 2007/0009104 A1 | 1/2007 | Renkis |
| 2007/0014413 A1 | 1/2007 | Oliveira et al. |
| 2007/0033273 A1 | 2/2007 | White et al. |
| 2007/0124797 A1 | 5/2007 | Gupta et al. |
| 2007/0162359 A1 | 7/2007 | Gokhale et al. |
| 2007/0220009 A1 | 9/2007 | Morris et al. |
| 2007/0293210 A1 | 12/2007 | Strub et al. |
| 2007/0294209 A1 | 12/2007 | Strub et al. |
| 2007/0294253 A1 | 12/2007 | Strub et al. |
| 2008/0072281 A1 | 3/2008 | Willis et al. |
| 2008/0072282 A1 | 3/2008 | Willis et al. |
| 2008/0082823 A1 | 4/2008 | Starrett et al. |
| 2008/0144502 A1 | 6/2008 | Jackowski et al. |
| 2008/0184336 A1 | 7/2008 | Sarukkai et al. |
| 2008/0201454 A1 | 8/2008 | Soffer |
| 2008/0229383 A1 | 9/2008 | Buss et al. |
| 2008/0256357 A1 | 10/2008 | Iyengar et al. |
| 2008/0301755 A1* | 12/2008 | Sinha ...................... H04L 63/20 |
| | | 726/1 |
| 2008/0313699 A1 | 12/2008 | Starostin et al. |
| 2009/0037607 A1 | 2/2009 | Farinacci et al. |
| 2009/0049509 A1 | 2/2009 | Chan et al. |
| 2009/0063381 A1 | 3/2009 | Chan et al. |
| 2009/0083336 A1 | 3/2009 | Srinivasan |
| 2009/0164663 A1 | 6/2009 | Ransom et al. |
| 2009/0216910 A1 | 8/2009 | Duchesneau |
| 2009/0222559 A1 | 9/2009 | Anipko et al. |
| 2010/0037311 A1 | 2/2010 | He et al. |
| 2010/0053676 A1 | 3/2010 | Sugimoto |
| 2010/0131650 A1 | 5/2010 | Pok et al. |
| 2010/0132013 A1 | 5/2010 | Van et al. |
| 2010/0154025 A1 | 6/2010 | Esteve et al. |
| 2010/0161632 A1 | 6/2010 | Rosen |
| 2010/0192212 A1 | 7/2010 | Raleigh |
| 2010/0217853 A1 | 8/2010 | Alexander et al. |
| 2010/0250497 A1 | 9/2010 | Redlich et al. |
| 2010/0262717 A1 | 10/2010 | Critchley et al. |
| 2011/0002333 A1 | 1/2011 | Karuppiah et al. |
| 2011/0106757 A1 | 5/2011 | Pickney et al. |
| 2011/0106770 A1 | 5/2011 | McDonald et al. |
| 2011/0106771 A1 | 5/2011 | McDonald et al. |
| 2011/0106802 A1 | 5/2011 | Pickney et al. |
| 2011/0154027 A1 | 6/2011 | Liu et al. |
| 2011/0167474 A1 | 7/2011 | Sinha et al. |
| 2011/0225311 A1 | 9/2011 | Liu et al. |
| 2012/0084438 A1 | 4/2012 | Raleigh et al. |
| 2012/0102050 A1 | 4/2012 | Button et al. |
| 2012/0124640 A1* | 5/2012 | Bender ............... G06F 21/6218 |
| | | 726/1 |
| 2012/0124643 A1* | 5/2012 | Moriconi ............. H04L 63/102 |
| | | 726/1 |
| 2012/0131469 A1 | 5/2012 | Yamuna et al. |
| 2012/0185913 A1 | 7/2012 | Martinez et al. |
| 2012/0216240 A1 | 8/2012 | Gottumukkala et al. |
| 2012/0240183 A1 | 9/2012 | Sinha |
| 2012/0260307 A1 | 10/2012 | Sambamurthy et al. |
| 2012/0278293 A1 | 11/2012 | Bulkowski et al. |
| 2012/0304265 A1 | 11/2012 | Richter et al. |
| 2013/0031157 A1 | 1/2013 | Mckee et al. |
| 2013/0125112 A1 | 5/2013 | Mittal et al. |
| 2013/0173794 A1 | 7/2013 | Agerbak et al. |
| 2013/0198558 A1 | 8/2013 | Rao et al. |
| 2013/0227714 A1 | 8/2013 | Gula et al. |
| 2013/0239192 A1 | 9/2013 | Linga et al. |
| 2013/0254535 A1 | 9/2013 | Akehurst et al. |
| 2013/0268260 A1 | 10/2013 | Lundberg et al. |
| 2013/0268740 A1 | 10/2013 | Holt |
| 2013/0298183 A1 | 11/2013 | McGrath et al. |
| 2014/0044265 A1 | 2/2014 | Kocher et al. |
| 2014/0057676 A1 | 2/2014 | Lord et al. |
| 2014/0109178 A1* | 4/2014 | Barton .................. G06F 21/604 |
| | | 726/1 |
| 2014/0115693 A1 | 4/2014 | Schieman et al. |
| 2014/0130119 A1* | 5/2014 | Goldschlag ........... H04L 63/101 |
| | | 726/1 |
| 2014/0136970 A1 | 5/2014 | Xiao |
| 2014/0165134 A1* | 6/2014 | Goldschlag ............. G06F 21/62 |
| | | 726/1 |
| 2014/0183269 A1 | 7/2014 | Glaser |
| 2014/0195818 A1 | 7/2014 | Neumann et al. |
| 2014/0201520 A1 | 7/2014 | Yacobi |
| 2014/0248852 A1 | 9/2014 | Raleigh et al. |
| 2014/0282900 A1 | 9/2014 | Wang et al. |
| 2014/0289794 A1 | 9/2014 | Raleigh et al. |
| 2014/0373124 A1 | 12/2014 | Rubin et al. |
| 2014/0376378 A1 | 12/2014 | Rubin et al. |
| 2015/0063202 A1 | 3/2015 | Mazzarella et al. |
| 2015/0079945 A1 | 3/2015 | Rubin et al. |
| 2015/0082016 A1 | 3/2015 | Bonczkowski et al. |
| 2015/0082374 A1 | 3/2015 | Dobson et al. |
| 2015/0089566 A1 | 3/2015 | Chesla |
| 2015/0089575 A1 | 3/2015 | Vepa et al. |
| 2015/0121449 A1 | 4/2015 | Cp et al. |
| 2015/0127949 A1 | 5/2015 | Patil et al. |
| 2015/0128205 A1 | 5/2015 | Mahaffey et al. |
| 2015/0135277 A1 | 5/2015 | Vij et al. |
| 2015/0135300 A1 | 5/2015 | Ford |
| 2015/0143456 A1 | 5/2015 | Raleigh et al. |
| 2015/0143504 A1 | 5/2015 | Desai et al. |
| 2015/0156194 A1 | 6/2015 | Modi et al. |
| 2015/0169871 A1 | 6/2015 | Achutha et al. |
| 2015/0188949 A1 | 7/2015 | Mahaffey et al. |

(56) References Cited

U.S. PATENT DOCUMENTS

| | | |
|---|---|---|
| 2015/0208273 A1 | 7/2015 | Raleigh et al. |
| 2015/0281079 A1 | 10/2015 | Fan et al. |
| 2015/0281952 A1 | 10/2015 | Patil et al. |
| 2015/0282058 A1 | 10/2015 | Forssell |
| 2015/0301824 A1 | 10/2015 | Patton et al. |
| 2015/0309849 A1 | 10/2015 | Lau et al. |
| 2015/0310025 A1 | 10/2015 | Rathgeber et al. |
| 2015/0319182 A1 | 11/2015 | Natarajan et al. |
| 2015/0326613 A1 | 11/2015 | Devarajan et al. |
| 2015/0350912 A1 | 12/2015 | Head et al. |
| 2015/0370793 A1 | 12/2015 | Chen et al. |
| 2015/0370846 A1 | 12/2015 | Zhau |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0036816 A1 | 2/2016 | Srinivasan |
| 2016/0036855 A1 | 2/2016 | Gangadharappa et al. |
| 2016/0036861 A1 | 2/2016 | Mattes et al. |
| 2016/0057166 A1 | 2/2016 | Chesla |
| 2016/0065618 A1 | 3/2016 | Banerjee |
| 2016/0078236 A1 | 3/2016 | Chesla |
| 2016/0080128 A1 | 3/2016 | Hebron |
| 2016/0085841 A1 | 3/2016 | Dorfman et al. |
| 2016/0147529 A1 | 5/2016 | Coleman et al. |
| 2016/0173501 A1 | 6/2016 | Brown |
| 2016/0180102 A1 | 6/2016 | Kim et al. |
| 2016/0191545 A1 | 6/2016 | Nanda et al. |
| 2016/0212237 A1 | 7/2016 | Nishijima |
| 2016/0219024 A1 | 7/2016 | Verzun et al. |
| 2016/0224360 A1 | 8/2016 | Wagner et al. |
| 2016/0224785 A1 | 8/2016 | Wagner et al. |
| 2016/0255051 A1 | 9/2016 | Williams et al. |
| 2016/0262021 A1 | 9/2016 | Lee et al. |
| 2016/0277447 A1 | 9/2016 | Pope et al. |
| 2016/0294826 A1 | 10/2016 | Han et al. |
| 2016/0314310 A1* | 10/2016 | Bender ................... H04L 63/20 |
| 2016/0314355 A1 | 10/2016 | Laska et al. |
| 2016/0337474 A1 | 11/2016 | Rao |
| 2016/0359872 A1 | 12/2016 | Yadav et al. |
| 2016/0359914 A1 | 12/2016 | Deen et al. |
| 2016/0378846 A1 | 12/2016 | Luse et al. |
| 2016/0380909 A1 | 12/2016 | Antony et al. |
| 2016/0381699 A1 | 12/2016 | Rubin et al. |
| 2017/0005790 A1 | 1/2017 | Brockmann et al. |
| 2017/0010826 A1 | 1/2017 | Basham et al. |
| 2017/0011078 A1 | 1/2017 | Gerrard et al. |
| 2017/0061006 A1 | 3/2017 | Hildebrand et al. |
| 2017/0061956 A1 | 3/2017 | Sarikaya et al. |
| 2017/0075598 A1 | 3/2017 | Sofia et al. |
| 2017/0078721 A1 | 3/2017 | Brockmann et al. |
| 2017/0093923 A1 | 3/2017 | Duan |
| 2017/0099292 A1* | 4/2017 | Kelley ................... H04L 63/10 |
| 2017/0103440 A1 | 4/2017 | Xing et al. |
| 2017/0111368 A1 | 4/2017 | Hibbert et al. |
| 2017/0118228 A1 | 4/2017 | Cp et al. |
| 2017/0126734 A1 | 5/2017 | Harney |
| 2017/0134422 A1 | 5/2017 | Shieh |
| 2017/0142096 A1 | 5/2017 | Reddy et al. |
| 2017/0142810 A1 | 5/2017 | Cho |
| 2017/0149614 A1 | 5/2017 | Zheng et al. |
| 2017/0149843 A1 | 5/2017 | Amulothu et al. |
| 2017/0171154 A1 | 6/2017 | Brown et al. |
| 2017/0171245 A1 | 6/2017 | Lee et al. |
| 2017/0177222 A1 | 6/2017 | Singh et al. |
| 2017/0177892 A1 | 6/2017 | Tingstrom et al. |
| 2017/0206207 A1 | 7/2017 | Bondurant et al. |
| 2017/0212830 A1 | 7/2017 | Thomas et al. |
| 2017/0223024 A1 | 8/2017 | Desai et al. |
| 2017/0237747 A1 | 8/2017 | Quinn et al. |
| 2017/0244606 A1 | 8/2017 | Htay |
| 2017/0250953 A1 | 8/2017 | Jain et al. |
| 2017/0257357 A1 | 9/2017 | Wang et al. |
| 2017/0279803 A1 | 9/2017 | Desai et al. |
| 2017/0279971 A1 | 9/2017 | Raleigh et al. |
| 2017/0331859 A1 | 11/2017 | Bansal et al. |
| 2017/0332238 A1 | 11/2017 | Bansal et al. |
| 2017/0339561 A1 | 11/2017 | Wennemyr et al. |
| 2017/0353433 A1 | 12/2017 | Antony et al. |
| 2017/0353483 A1 | 12/2017 | Weith et al. |
| 2017/0353496 A1 | 12/2017 | Pai et al. |
| 2017/0359220 A1 | 12/2017 | Weith et al. |
| 2017/0364505 A1 | 12/2017 | Sarikaya et al. |
| 2017/0364748 A1 | 12/2017 | Maji et al. |
| 2017/0372087 A1 | 12/2017 | Lee |
| 2017/0374032 A1 | 12/2017 | Woolward et al. |
| 2017/0374090 A1 | 12/2017 | McGrew et al. |
| 2017/0374101 A1 | 12/2017 | Woolward |
| 2018/0027009 A1 | 1/2018 | Santos et al. |
| 2018/0032258 A1 | 2/2018 | Edwards et al. |
| 2018/0035126 A1 | 2/2018 | Lee et al. |
| 2018/0041467 A1 | 2/2018 | Vats et al. |
| 2018/0041598 A1 | 2/2018 | Vats et al. |
| 2018/0061158 A1 | 3/2018 | Greene |
| 2018/0069702 A1 | 3/2018 | Ayyadevara et al. |
| 2018/0083915 A1 | 3/2018 | Medam et al. |
| 2018/0083944 A1 | 3/2018 | Vats et al. |
| 2018/0091583 A1 | 3/2018 | Collins et al. |
| 2018/0101422 A1 | 4/2018 | Flanigan et al. |
| 2018/0109498 A1 | 4/2018 | Singh |
| 2018/0115520 A1 | 4/2018 | Neuman et al. |
| 2018/0115523 A1 | 4/2018 | Subbarayan et al. |
| 2018/0115585 A1 | 4/2018 | Rubakha |
| 2018/0121110 A1 | 5/2018 | Sawhney |
| 2018/0121129 A1 | 5/2018 | Sawhney et al. |
| 2018/0123957 A1 | 5/2018 | Chen et al. |
| 2018/0159701 A1 | 6/2018 | Krause et al. |
| 2018/0167373 A1 | 6/2018 | Anderson et al. |
| 2018/0167397 A1 | 6/2018 | Zhang |
| 2018/0167415 A1 | 6/2018 | Khan et al. |
| 2018/0176262 A1 | 6/2018 | Kavi |
| 2018/0196680 A1 | 7/2018 | Wang et al. |
| 2018/0210801 A1 | 7/2018 | Wu et al. |
| 2018/0218148 A1 | 8/2018 | D'errico et al. |
| 2018/0218149 A1 | 8/2018 | Jacobs et al. |
| 2018/0220472 A1 | 8/2018 | Schopp |
| 2018/0233141 A1 | 8/2018 | Solomon et al. |
| 2018/0255591 A1 | 9/2018 | Valicherla et al. |
| 2018/0270732 A1 | 9/2018 | Garcia et al. |
| 2018/0288026 A1 | 10/2018 | Callaghan |
| 2018/0293024 A1 | 10/2018 | Baptist et al. |
| 2018/0295036 A1 | 10/2018 | Krishnamurthy et al. |
| 2018/0309764 A1 | 10/2018 | Kras et al. |
| 2018/0314846 A1 | 11/2018 | Schultz et al. |
| 2018/0316725 A1 | 11/2018 | Mani et al. |
| 2018/0341519 A1 | 11/2018 | Vyas et al. |
| 2018/0343238 A1 | 11/2018 | Tola |
| 2018/0343256 A1 | 11/2018 | Boodaei |
| 2018/0349629 A1 | 12/2018 | Chenchev et al. |
| 2018/0359369 A1 | 12/2018 | Golshenas et al. |
| 2018/0367308 A1 | 12/2018 | Kacin et al. |
| 2018/0367396 A1 | 12/2018 | Kompella et al. |
| 2019/0020665 A1 | 1/2019 | Surcouf et al. |
| 2019/0039569 A1 | 2/2019 | Reed et al. |
| 2019/0052554 A1 | 2/2019 | Mukerji et al. |
| 2019/0058709 A1 | 2/2019 | Kempf et al. |
| 2019/0065278 A1 | 2/2019 | Jeuk et al. |
| 2019/0068449 A1 | 2/2019 | Sikand et al. |
| 2019/0073373 A1 | 3/2019 | Surale et al. |
| 2019/0075095 A1 | 3/2019 | Venable et al. |
| 2019/0081955 A1 | 3/2019 | Chugtu et al. |
| 2019/0095655 A1 | 3/2019 | Krawczewicz et al. |
| 2019/0104411 A1 | 4/2019 | Hotchkiss et al. |
| 2019/0109713 A1 | 4/2019 | Clark et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0149417 A1 | 5/2019 | Augusto et al. |
| 2019/0149429 A1 | 5/2019 | Stöcker |
| 2019/0156023 A1 | 5/2019 | Gerebe et al. |
| 2019/0158503 A1 | 5/2019 | Bansal et al. |
| 2019/0163406 A1 | 5/2019 | Kazi et al. |
| 2019/0173891 A1 | 6/2019 | Cp et al. |
| 2019/0174449 A1 | 6/2019 | Shan et al. |
| 2019/0213319 A1 | 7/2019 | Gerebe et al. |

(56) References Cited

U.S. PATENT DOCUMENTS

| | | |
|---|---|---|
| 2019/0215694 A1 | 7/2019 | Rubin et al. |
| 2019/0235605 A1 | 8/2019 | Chenchev et al. |
| 2019/0245862 A1 | 8/2019 | Kruse et al. |
| 2019/0253274 A1 | 8/2019 | Van Dussen |
| 2019/0254094 A1 | 8/2019 | Babu et al. |
| 2019/0258813 A1 | 8/2019 | Lewis et al. |
| 2019/0260753 A1 | 8/2019 | Lewis et al. |
| 2019/0261203 A1 | 8/2019 | Raleigh |
| 2019/0268167 A1 | 8/2019 | White et al. |
| 2019/0281073 A1 | 9/2019 | Weith et al. |
| 2019/0281127 A1 | 9/2019 | Schmidt et al. |
| 2019/0289459 A1 | 9/2019 | Shan et al. |
| 2019/0297161 A1 | 9/2019 | Ayyadevara et al. |
| 2019/0303345 A1 | 10/2019 | Zhu et al. |
| 2019/0306754 A1 | 10/2019 | Shan et al. |
| 2019/0313359 A1 | 10/2019 | Lee et al. |
| 2019/0317821 A1 | 10/2019 | O'neal et al. |
| 2019/0318240 A1 | 10/2019 | Kulkarni et al. |
| 2019/0319950 A1 | 10/2019 | Bowling |
| 2019/0327320 A1 | 10/2019 | Rubin et al. |
| 2019/0332777 A1 | 10/2019 | Edwards et al. |
| 2019/0334952 A1* | 10/2019 | Dhoble .................. H04L 63/10 |
| 2019/0340341 A1 | 11/2019 | Fleck et al. |
| 2019/0349742 A1 | 11/2019 | Kim et al. |
| 2019/0349758 A1 | 11/2019 | Zhu et al. |
| 2019/0386969 A1 | 12/2019 | Verzun et al. |
| 2020/0004451 A1 | 1/2020 | Prohofsky |
| 2020/0007540 A1 | 1/2020 | Kawaguchi et al. |
| 2020/0021615 A1 | 1/2020 | Wainner et al. |
| 2020/0026850 A1 | 1/2020 | Levin et al. |
| 2020/0034248 A1 | 1/2020 | Nara et al. |
| 2020/0067801 A1 | 2/2020 | McCormick et al. |
| 2020/0077265 A1 | 3/2020 | Singh et al. |
| 2020/0089516 A1 | 3/2020 | Vijayvargiya et al. |
| 2020/0097195 A1 | 3/2020 | Fritz et al. |
| 2020/0112850 A1 | 4/2020 | Lee et al. |
| 2020/0153911 A1 | 5/2020 | Chauhan |
| 2020/0177333 A1 | 6/2020 | Liu |
| 2020/0193016 A1 | 6/2020 | Zeng et al. |
| 2020/0204551 A1 | 6/2020 | Singh et al. |
| 2020/0205209 A1 | 6/2020 | Pan et al. |
| 2020/0214054 A1 | 7/2020 | Qiao et al. |
| 2020/0218798 A1 | 7/2020 | Kosaka et al. |
| 2020/0219023 A1 | 7/2020 | Duchastel |
| 2020/0220848 A1 | 7/2020 | Patwardhan |
| 2020/0220875 A1 | 7/2020 | Harguindeguy et al. |
| 2020/0228546 A1 | 7/2020 | Cp et al. |
| 2020/0228936 A1 | 7/2020 | Talebi et al. |
| 2020/0229069 A1 | 7/2020 | Chun |
| 2020/0242493 A1 | 7/2020 | Botea et al. |
| 2020/0257179 A1 | 8/2020 | Barnum et al. |
| 2020/0257810 A1 | 8/2020 | Vrabec et al. |
| 2020/0259831 A1 | 8/2020 | Pampati et al. |
| 2020/0260401 A1 | 8/2020 | So |
| 2020/0267552 A1 | 8/2020 | Lee et al. |
| 2020/0267554 A1 | 8/2020 | Faccin et al. |
| 2020/0267785 A1 | 8/2020 | Talebi et al. |
| 2020/0272911 A1 | 8/2020 | Quiros Araya et al. |
| 2020/0280592 A1 | 9/2020 | Ithal et al. |
| 2020/0296619 A1 | 9/2020 | Pan et al. |
| 2020/0296779 A1 | 9/2020 | Moghe et al. |
| 2020/0304474 A1 | 9/2020 | Kisko et al. |
| 2020/0314127 A1 | 10/2020 | Wilson et al. |
| 2020/0314613 A1 | 10/2020 | Lee et al. |
| 2020/0314701 A1 | 10/2020 | Talebi et al. |
| 2020/0320189 A1 | 10/2020 | Zhang et al. |
| 2020/0322262 A1 | 10/2020 | Maino et al. |
| 2020/0322286 A1 | 10/2020 | Mehta et al. |
| 2020/0323030 A1 | 10/2020 | Mehta et al. |
| 2020/0334084 A1 | 10/2020 | Jacobson |
| 2020/0336484 A1 | 10/2020 | Mahajan et al. |
| 2020/0344637 A1 | 10/2020 | Kim et al. |
| 2020/0351699 A1 | 11/2020 | Pan et al. |
| 2020/0351980 A1 | 11/2020 | Talebi et al. |
| 2020/0351984 A1 | 11/2020 | Talebi et al. |
| 2020/0367141 A1 | 11/2020 | Cakulev et al. |
| 2020/0382488 A1 | 12/2020 | Liu et al. |
| 2020/0389426 A1 | 12/2020 | Enguehard et al. |
| 2020/0396678 A1 | 12/2020 | Lee et al. |
| 2020/0401452 A1 | 12/2020 | Piercey et al. |
| 2020/0404107 A1 | 12/2020 | Cheng et al. |
| 2021/0011984 A1 | 1/2021 | Renke et al. |
| 2021/0021431 A1 | 1/2021 | Guim Bernat et al. |
| 2021/0026819 A1 | 1/2021 | Beard et al. |
| 2021/0029029 A1 | 1/2021 | Mehmedagic et al. |
| 2021/0029119 A1 | 1/2021 | Raman et al. |
| 2021/0029132 A1 | 1/2021 | Wilczynski et al. |
| 2021/0029168 A1 | 1/2021 | Jeong |
| 2021/0037380 A1 | 2/2021 | Lee et al. |
| 2021/0056524 A1 | 2/2021 | Isgar |
| 2021/0056536 A1 | 2/2021 | Carter et al. |
| 2021/0075631 A1 | 3/2021 | Liao |
| 2021/0076444 A1 | 3/2021 | Shu et al. |
| 2021/0091941 A1 | 3/2021 | Pancras et al. |
| 2021/0099490 A1 | 4/2021 | Crabtree et al. |
| 2021/0105275 A1 | 4/2021 | Bansal et al. |
| 2021/0105596 A1 | 4/2021 | Prabhakar et al. |
| 2021/0109900 A1 | 4/2021 | Mcilroy et al. |
| 2021/0117241 A1 | 4/2021 | Xia |
| 2021/0120408 A1 | 4/2021 | Pazhyannur et al. |
| 2021/0120473 A1 | 4/2021 | Yao et al. |
| 2021/0120596 A1 | 4/2021 | Youn et al. |
| 2021/0122261 A1 | 4/2021 | Qiao et al. |
| 2021/0133313 A1 | 5/2021 | Sakib et al. |
| 2021/0136041 A1 | 5/2021 | Foxhoven et al. |
| 2021/0141655 A1 | 5/2021 | Gamage et al. |
| 2021/0157655 A1 | 5/2021 | Foreman |
| 2021/0168125 A1 | 6/2021 | Vemulpali et al. |
| 2021/0168142 A1 | 6/2021 | Foxhoven et al. |
| 2021/0168613 A1 | 6/2021 | Suh et al. |
| 2021/0168661 A1 | 6/2021 | Wong et al. |
| 2021/0168751 A1 | 6/2021 | Stojanovski et al. |
| 2021/0194760 A1 | 6/2021 | Barton et al. |
| 2021/0211408 A1 | 7/2021 | Porras et al. |
| 2021/0211423 A1 | 7/2021 | Tan et al. |
| 2021/0211870 A1 | 7/2021 | Perras et al. |
| 2021/0218594 A1 | 7/2021 | Sundararajan et al. |
| 2021/0218652 A1 | 7/2021 | Raut et al. |
| 2021/0218801 A1 | 7/2021 | Zhang et al. |
| 2021/0223128 A1 | 7/2021 | Kirch |
| 2021/0224091 A1 | 7/2021 | Hayatnagarkar et al. |
| 2021/0226850 A1 | 7/2021 | Xu et al. |
| 2021/0226910 A1 | 7/2021 | Ranpise et al. |
| 2021/0226987 A1 | 7/2021 | Summers et al. |
| 2021/0227438 A1 | 7/2021 | Xu |
| 2021/0234860 A1 | 7/2021 | Bansal et al. |
| 2021/0234898 A1 | 7/2021 | Desai et al. |
| 2021/0243678 A1 | 8/2021 | Drevon et al. |
| 2021/0250333 A1 | 8/2021 | Negrea et al. |
| 2021/0250890 A1 | 8/2021 | Won |
| 2021/0258859 A1 | 8/2021 | Watfa |
| 2021/0274340 A1 | 9/2021 | Sun et al. |
| 2021/0281572 A1 | 9/2021 | Fernandez-Spadaro et al. |
| 2021/0286899 A1 | 9/2021 | Schroeder et al. |
| 2021/0294970 A1 | 9/2021 | Bender et al. |
| 2021/0306310 A1 | 9/2021 | Tan |
| 2021/0307101 A1 | 9/2021 | Kim et al. |
| 2021/0312400 A1 | 10/2021 | Irimie et al. |
| 2021/0314297 A1* | 10/2021 | Peterson ............. H04L 63/0236 |
| 2021/0314301 A1 | 10/2021 | Chanak et al. |
| 2021/0314338 A1 | 10/2021 | Howe |
| 2021/0314399 A1 | 10/2021 | Hyun et al. |
| 2021/0320897 A1 | 10/2021 | Stojanovski et al. |
| 2021/0336932 A1 | 10/2021 | Chanak et al. |
| 2021/0336933 A1 | 10/2021 | Shah et al. |
| 2021/0336934 A1 | 10/2021 | Deshmukh et al. |
| 2021/0336959 A1 | 10/2021 | Shah et al. |
| 2021/0344492 A1 | 11/2021 | Goodsitt et al. |
| 2021/0344722 A1 | 11/2021 | Goyal et al. |
| 2021/0360294 A1 | 11/2021 | Liao et al. |
| 2021/0360371 A1 | 11/2021 | Qiao et al. |
| 2021/0367920 A1 | 11/2021 | Devarajan et al. |
| 2021/0367944 A1 | 11/2021 | Gupta et al. |
| 2021/0368339 A1 | 11/2021 | Watfa et al. |

(56) References Cited

U.S. PATENT DOCUMENTS

| | | |
|---|---|---|
| 2021/0368581 A1 | 11/2021 | Shan |
| 2021/0377210 A1 | 12/2021 | Singh et al. |
| 2021/0377222 A1 | 12/2021 | Sharma et al. |
| 2021/0377223 A1 | 12/2021 | Chanak et al. |
| 2021/0377303 A1 | 12/2021 | Bui et al. |
| 2021/0382739 A1 | 12/2021 | Guo et al. |
| 2021/0385642 A1 | 12/2021 | Di et al. |
| 2021/0385742 A1 | 12/2021 | Liao |
| 2021/0397313 A1 | 12/2021 | Desai et al. |
| 2021/0397463 A1 | 12/2021 | Schimon et al. |
| 2021/0399954 A1 | 12/2021 | Dabell et al. |
| 2021/0400060 A1 | 12/2021 | Chacko |
| 2021/0406127 A1 | 12/2021 | Knierim et al. |
| 2021/0406902 A1 | 12/2021 | Bernert et al. |
| 2021/0409441 A1 | 12/2021 | Singh et al. |
| 2021/0409449 A1 | 12/2021 | Crabtree et al. |
| 2021/0410059 A1 | 12/2021 | Talebi et al. |
| 2022/0007161 A1 | 1/2022 | Shan |
| 2022/0007180 A1 | 1/2022 | Liao et al. |
| 2022/0007437 A1 | 1/2022 | Goenka et al. |
| 2022/0014466 A1 | 1/2022 | Doshi et al. |
| 2022/0014512 A1 | 1/2022 | Raleigh et al. |
| 2022/0029965 A1 | 1/2022 | Chanak et al. |
| 2022/0030495 A1 | 1/2022 | Qiao et al. |
| 2022/0038544 A1 | 2/2022 | Grinstein et al. |
| 2022/0038986 A1 | 2/2022 | Soliman et al. |
| 2022/0039004 A1 | 2/2022 | Soliman et al. |
| 2022/0043665 A1 | 2/2022 | Vidyadhara et al. |
| 2022/0046059 A1 | 2/2022 | Pandurangi et al. |
| 2022/0052850 A1 | 2/2022 | Fagan et al. |
| 2022/0052961 A1 | 2/2022 | Chauhan et al. |
| 2022/0053449 A1 | 2/2022 | Shan |
| 2022/0060398 A1 | 2/2022 | Shishir et al. |
| 2022/0060507 A1 | 2/2022 | Crabtree et al. |
| 2022/0060509 A1 | 2/2022 | Crabtree et al. |
| 2022/0060557 A1 | 2/2022 | Bathla et al. |
| 2022/0070183 A1 | 3/2022 | Goyal |
| 2022/0070967 A1 | 3/2022 | Li et al. |
| 2022/0086639 A1 | 3/2022 | Lu et al. |
| 2022/0092024 A1 | 3/2022 | Kavaipatti et al. |
| 2022/0094706 A1 | 3/2022 | Higgins et al. |
| 2022/0095260 A1 | 3/2022 | Shan |
| 2022/0103525 A1 | 3/2022 | Shribman et al. |
| 2022/0103987 A1 | 3/2022 | Shan |
| 2022/0104164 A1 | 3/2022 | Kedalagudde et al. |
| 2022/0104296 A1 | 3/2022 | Mary et al. |
| 2022/0109696 A1 | 4/2022 | Deshmukh et al. |
| 2022/0110023 A1 | 4/2022 | Wu et al. |
| 2022/0116397 A1 | 4/2022 | Deshmukh et al. |
| 2022/0116814 A1 | 4/2022 | Di et al. |
| 2022/0117036 A1 | 4/2022 | Moustafa et al. |
| 2022/0124521 A1 | 4/2022 | Xu et al. |
| 2022/0124595 A1 | 4/2022 | Xu et al. |
| 2022/0129583 A1 | 4/2022 | Balasubramanian et al. |
| 2022/0141662 A1 | 5/2022 | Liao |
| 2022/0150280 A1 | 5/2022 | Azulay et al. |
| 2022/0150312 A1 | 5/2022 | Ranpise et al. |
| 2022/0159003 A1 | 5/2022 | Butcher et al. |
| 2022/0159029 A1 | 5/2022 | Bendersky et al. |
| 2022/0159527 A1 | 5/2022 | Lee et al. |
| 2022/0159605 A1 | 5/2022 | Li et al. |
| 2022/0164186 A1 | 5/2022 | Pamidala et al. |
| 2022/0167299 A1 | 5/2022 | Xu et al. |
| 2022/0174580 A1 | 6/2022 | You et al. |
| 2022/0182412 A1 | 6/2022 | Borak |
| 2022/0191052 A1 | 6/2022 | Garcia et al. |
| 2022/0191100 A1 | 6/2022 | Kim et al. |
| 2022/0191736 A1 | 6/2022 | Barton et al. |
| 2022/0191765 A1 | 6/2022 | Ding |
| 2022/0200924 A1 | 6/2022 | Lu et al. |
| 2022/0200972 A1 | 6/2022 | Potlapally et al. |
| 2022/0200993 A1 | 6/2022 | Smith |
| 2022/0201041 A1 | 6/2022 | Keiser et al. |
| 2022/0201638 A1 | 6/2022 | Arrobo et al. |
| 2022/0210698 A1 | 6/2022 | Ly et al. |
| 2022/0217084 A1 | 7/2022 | Arora et al. |
| 2022/0224703 A1 | 7/2022 | Devarajan |
| 2022/0225448 A1 | 7/2022 | Li et al. |
| 2022/0232020 A1 | 7/2022 | Kandachar et al. |
| 2022/0232045 A1* | 7/2022 | Phan .................... H04L 9/0891 |
| 2022/0232363 A1 | 7/2022 | Watfa et al. |
| 2022/0239698 A1 | 7/2022 | Anantharaju |
| 2022/0247771 A1 | 8/2022 | Higgins et al. |
| 2022/0255966 A1 | 8/2022 | Sienicki et al. |
| 2022/0263835 A1 | 8/2022 | Pieczul et al. |
| 2022/0263913 A1 | 8/2022 | Zhang et al. |
| 2022/0264370 A1 | 8/2022 | Qiao et al. |
| 2022/0264403 A1 | 8/2022 | Watfa et al. |
| 2022/0264444 A1 | 8/2022 | Ryu et al. |
| 2022/0264503 A1 | 8/2022 | Starsinic et al. |
| 2022/0266451 A1 | 8/2022 | Cristache |
| 2022/0272614 A1 | 8/2022 | Lu et al. |
| 2022/0272620 A1 | 8/2022 | Ninglekhu et al. |
| 2022/0278900 A1 | 9/2022 | Pieczul et al. |
| 2022/0279075 A1 | 9/2022 | Fan et al. |
| 2022/0286428 A1 | 9/2022 | Howe et al. |
| 2022/0286429 A1 | 9/2022 | Howe et al. |
| 2022/0286480 A1 | 9/2022 | Jadhav et al. |
| 2022/0286911 A1 | 9/2022 | Howe et al. |
| 2022/0294540 A1 | 9/2022 | Black et al. |
| 2022/0295440 A1 | 9/2022 | Kumar et al. |
| 2022/0309152 A1 | 9/2022 | Araujo et al. |
| 2022/0311767 A1 | 9/2022 | Ouellet |
| 2022/0312176 A1 | 9/2022 | Matolia et al. |
| 2022/0312299 A1 | 9/2022 | Mochizuki et al. |
| 2022/0312517 A1 | 9/2022 | Xu et al. |
| 2022/0329442 A1 | 10/2022 | Bulusu et al. |
| 2022/0329477 A1 | 10/2022 | Chiganmi et al. |
| 2022/0329495 A1 | 10/2022 | Xie et al. |
| 2022/0329585 A1 | 10/2022 | Chhabra et al. |
| 2022/0330138 A1 | 10/2022 | Shan |
| 2022/0330193 A1 | 10/2022 | Shan |
| 2022/0334864 A1 | 10/2022 | Kn et al. |
| 2022/0338000 A1 | 10/2022 | Lee et al. |
| 2022/0345875 A1 | 10/2022 | Kumar |
| 2022/0353244 A1 | 11/2022 | Kahn et al. |
| 2022/0353799 A1 | 11/2022 | Talebi et al. |
| 2022/0360670 A1 | 11/2022 | Singh et al. |
| 2022/0361136 A1 | 11/2022 | Watfa et al. |
| 2022/0368726 A1 | 11/2022 | Balasubramanian et al. |
| 2022/0369408 A1 | 11/2022 | Shariat et al. |
| 2022/0377529 A1 | 11/2022 | Kim et al. |
| 2022/0377617 A1 | 11/2022 | Deng et al. |
| 2022/0377654 A1 | 11/2022 | Soliman et al. |
| 2022/0386100 A1 | 12/2022 | Lee et al. |
| 2022/0391867 A1 | 12/2022 | Glaser |
| 2022/0393943 A1 | 12/2022 | Pangeni et al. |
| 2022/0394566 A1 | 12/2022 | Liu et al. |
| 2022/0400378 A1 | 12/2022 | Wang et al. |
| 2022/0408396 A1 | 12/2022 | Youn et al. |
| 2022/0413883 A1 | 12/2022 | Clebsch et al. |
| 2022/0417252 A1 | 12/2022 | Moon et al. |
| 2022/0417264 A1 | 12/2022 | Moon |
| 2022/0417286 A1 | 12/2022 | Moon et al. |
| 2023/0007439 A1 | 1/2023 | Williams et al. |
| 2023/0007464 A1 | 1/2023 | Lee et al. |
| 2023/0007611 A1 | 1/2023 | Karampatsis et al. |
| 2023/0011468 A1 | 1/2023 | Giri et al. |
| 2023/0015603 A1 | 1/2023 | Smith |
| 2023/0018809 A1 | 1/2023 | Deshmukh |
| 2023/0019448 A1 | 1/2023 | Deshmukh et al. |
| 2023/0022134 A1 | 1/2023 | Talwar et al. |
| 2023/0023571 A1 | 1/2023 | Xing et al. |
| 2023/0024999 A1 | 1/2023 | Wu et al. |
| 2023/0027290 A1 | 1/2023 | Chen et al. |
| 2023/0027507 A1 | 1/2023 | He et al. |
| 2023/0029714 A1 | 2/2023 | Xu et al. |
| 2023/0032313 A1 | 2/2023 | Curtis et al. |
| 2023/0032790 A1 | 2/2023 | Mahajan et al. |
| 2023/0040365 A1 | 2/2023 | Raleigh |
| 2023/0040747 A1 | 2/2023 | Watfa et al. |
| 2023/0042646 A1 | 2/2023 | Mahadevan et al. |
| 2023/0044346 A1 | 2/2023 | Nuggehalli et al. |
| 2023/0052699 A1 | 2/2023 | Ninglekhu et al. |

(56) References Cited

U.S. PATENT DOCUMENTS

| | | |
|---|---|---|
| 2023/0052827 A1 | 2/2023 | Araujo et al. |
| 2023/0056442 A1 | 2/2023 | Ly et al. |
| 2023/0058336 A1 | 2/2023 | Kim et al. |
| 2023/0059173 A1 | 2/2023 | Moon |
| 2023/0059726 A1 | 2/2023 | Osipov et al. |
| 2023/0067223 A1 | 3/2023 | Freed et al. |
| 2023/0073757 A1 | 3/2023 | Chandramouli et al. |
| 2023/0078317 A1 | 3/2023 | Xing et al. |
| 2023/0083175 A1 | 3/2023 | Xiong |
| 2023/0094062 A1 | 3/2023 | Kim et al. |
| 2023/0098558 A1 | 3/2023 | Savir et al. |
| 2023/0109272 A1 | 4/2023 | Ryu et al. |
| 2023/0113180 A1 | 4/2023 | Srinivasan et al. |
| 2023/0113519 A1 | 4/2023 | Fernandez et al. |
| 2023/0115982 A1 | 4/2023 | Lin et al. |
| 2023/0116463 A1 | 4/2023 | Rath et al. |
| 2023/0118271 A1 | 4/2023 | Punathil |
| 2023/0129117 A1 | 4/2023 | Ding et al. |
| 2023/0130746 A1 | 4/2023 | Binder et al. |
| 2023/0133444 A1 | 5/2023 | Dimitrovski et al. |
| 2023/0135699 A1 | 5/2023 | Liao et al. |
| 2023/0136984 A1 | 5/2023 | Lee et al. |
| 2023/0138033 A1 | 5/2023 | Rajadurai et al. |
| 2023/0147538 A1 | 5/2023 | Lee et al. |
| 2023/0153447 A1 | 5/2023 | Kapadia |
| 2023/0156513 A1 | 5/2023 | Xing et al. |
| 2023/0156514 A1 | 5/2023 | Eriksson et al. |
| 2023/0163984 A1 | 5/2023 | Shan |
| 2023/0164523 A1 | 5/2023 | Wu et al. |
| 2023/0171280 A1 | 6/2023 | Bansal |
| 2023/0171824 A1 | 6/2023 | Purkayastha et al. |
| 2023/0179632 A1 | 6/2023 | Duraisamy et al. |
| 2023/0188525 A1 | 6/2023 | Singh et al. |
| 2023/0189192 A1 | 6/2023 | Talebi et al. |
| 2023/0195884 A1 | 6/2023 | Belair et al. |
| 2023/0198946 A1 | 6/2023 | Zacks et al. |
| 2023/0199006 A1 | 6/2023 | Gurnov et al. |
| 2023/0199017 A1 | 6/2023 | Peter |
| 2023/0199632 A1 | 6/2023 | Talebi et al. |
| 2023/0205505 A1 | 6/2023 | Chen et al. |
| 2023/0206329 A1 | 6/2023 | Cella et al. |
| 2023/0206348 A1 | 6/2023 | Reddy et al. |
| 2023/0208810 A1 | 6/2023 | Dhanasekar et al. |
| 2023/0209329 A1 | 6/2023 | Guo et al. |
| 2023/0224304 A1 | 7/2023 | Lukanov et al. |
| 2023/0231884 A1 | 7/2023 | Deshmukh et al. |
| 2023/0239270 A1 | 7/2023 | Nahas et al. |
| 2023/0239325 A1 | 7/2023 | Keiser, Jr. |
| 2023/0247003 A1 | 8/2023 | Chanak et al. |
| 2023/0247027 A1 | 8/2023 | Brar et al. |
| 2023/0247087 A1 | 8/2023 | Nagaraja et al. |
| 2023/0254318 A1 | 8/2023 | Hu et al. |
| 2023/0262030 A1 | 8/2023 | Bansal et al. |
| 2023/0262818 A1 | 8/2023 | Kim et al. |
| 2023/0269137 A1 | 8/2023 | Fehring et al. |
| 2023/0283639 A1 | 9/2023 | Melson et al. |
| 2023/0284077 A1 | 9/2023 | Pateromichelakis |
| 2023/0290485 A1 | 9/2023 | Fairuz et al. |
| 2023/0291735 A1 | 9/2023 | Cheethirala et al. |
| 2023/0300651 A1 | 9/2023 | Kim et al. |
| 2023/0300702 A1 | 9/2023 | You et al. |
| 2023/0309158 A1 | 9/2023 | Qiao et al. |
| 2023/0319047 A1 | 10/2023 | Wu et al. |
| 2023/0319112 A1 | 10/2023 | Kaimal et al. |
| 2023/0319679 A1 | 10/2023 | Sung et al. |
| 2023/0319685 A1 | 10/2023 | Talebi et al. |
| 2023/0319915 A1 | 10/2023 | Paladugu et al. |
| 2023/0328821 A1 | 10/2023 | Talebi et al. |
| 2023/0336471 A1 | 10/2023 | Dhody |
| 2023/0336977 A1 | 10/2023 | Henry et al. |
| 2023/0344917 A1 | 10/2023 | Chanak et al. |
| 2023/0362198 A1 | 11/2023 | Jung et al. |
| 2023/0362623 A1 | 11/2023 | Lee et al. |
| 2023/0362632 A1 | 11/2023 | Hu et al. |
| 2023/0362640 A1 | 11/2023 | Edge |
| 2023/0362704 A1 | 11/2023 | Edge et al. |
| 2023/0367833 A1 | 11/2023 | Kol et al. |
| 2023/0368193 A1 | 11/2023 | Russinovich et al. |
| 2023/0370992 A1 | 11/2023 | You et al. |
| 2023/0371111 A1 | 11/2023 | Xu et al. |
| 2023/0388785 A1 | 11/2023 | Ferdi et al. |
| 2023/0397086 A1 | 12/2023 | Kim et al. |
| 2023/0403272 A1 | 12/2023 | Cheethirala et al. |
| 2023/0403305 A1 | 12/2023 | Dementyev et al. |
| 2023/0412638 A1 | 12/2023 | Dogaru et al. |
| 2023/0421478 A1 | 12/2023 | Chhabra |
| 2023/0422149 A1 | 12/2023 | Kim et al. |
| 2024/0007983 A1 | 1/2024 | Liu et al. |
| 2024/0008130 A1 | 1/2024 | Kim et al. |
| 2024/0012674 A1 | 1/2024 | Xie et al. |
| 2024/0015567 A1 | 1/2024 | Mladin et al. |
| 2024/0022469 A1 | 1/2024 | Hu et al. |
| 2024/0022593 A1 | 1/2024 | Costa et al. |
| 2024/0048229 A1 | 2/2024 | Kumar et al. |
| 2024/0048966 A1 | 2/2024 | Suh |
| 2024/0049171 A1 | 2/2024 | Khirallah et al. |
| 2024/0056904 A1 | 2/2024 | Watfa et al. |
| 2024/0056947 A1 | 2/2024 | Watfa et al. |
| 2024/0056957 A1 | 2/2024 | Wang |
| 2024/0073249 A1 | 2/2024 | Cirello Filho et al. |
| 2024/0073252 A1 | 2/2024 | Kathpal et al. |
| 2024/0073772 A1 | 2/2024 | Gupta et al. |
| 2024/0080340 A1 | 3/2024 | Ben et al. |
| 2024/0080342 A1 | 3/2024 | Mishra et al. |
| 2024/0080730 A1 | 3/2024 | Zhang et al. |
| 2024/0080791 A1 | 3/2024 | Aghili et al. |
| 2024/0086558 A1 | 3/2024 | Jadhav et al. |
| 2024/0089291 A1 | 3/2024 | Shpilyuck et al. |
| 2024/0098089 A1 | 3/2024 | Adogla et al. |
| 2024/0104553 A1 | 3/2024 | Thorpe |
| 2024/0106821 A1 | 3/2024 | Crawford et al. |
| 2024/0106833 A1 | 3/2024 | Ravichandran et al. |
| 2024/0106855 A1 | 3/2024 | Sundararajan et al. |
| 2024/0107481 A1 | 3/2024 | Tiwari et al. |
| 2024/0111821 A1 | 4/2024 | Dogaru et al. |
| 2024/0114057 A1 | 4/2024 | Bjerrum et al. |
| 2024/0129321 A1 | 4/2024 | Howe et al. |
| 2024/0129338 A1 | 4/2024 | Azad et al. |
| 2024/0146689 A1 | 5/2024 | Bansal et al. |
| 2024/0147207 A1 | 5/2024 | Watfa et al. |
| 2024/0152602 A1 | 5/2024 | Belair et al. |
| 2024/0154970 A1 | 5/2024 | Cheethirala et al. |
| 2024/0163308 A1 | 5/2024 | Kahn et al. |
| 2024/0163312 A1 | 5/2024 | Azad et al. |
| 2024/0168793 A1 | 5/2024 | Pyka et al. |
| 2024/0169062 A1 | 5/2024 | Lee et al. |
| 2024/0171969 A1 | 5/2024 | Kumar et al. |
| 2024/0179066 A1 | 5/2024 | Shen et al. |
| 2024/0179070 A1 | 5/2024 | Zhou et al. |
| 2024/0179071 A1 | 5/2024 | Zhou et al. |
| 2024/0179168 A1 | 5/2024 | Manthiramoorthy et al. |
| 2024/0179182 A1 | 5/2024 | Hicks et al. |
| 2024/0179188 A1 | 5/2024 | Torlak et al. |
| 2024/0179509 A1 | 5/2024 | Fu et al. |
| 2024/0187968 A1 | 6/2024 | Tiwari et al. |
| 2024/0187990 A1 | 6/2024 | Chen et al. |
| 2024/0205191 A1 | 6/2024 | Vijayvargiya et al. |
| 2024/0205863 A1 | 6/2024 | Nassar et al. |
| 2024/0236047 A1 | 7/2024 | Filho et al. |
| 2024/0241978 A1 | 7/2024 | Chopra et al. |
| 2024/0244014 A1 | 7/2024 | De et al. |
| 2024/0273211 A1 | 8/2024 | Singh |
| 2024/0275680 A1 | 8/2024 | Palnati et al. |
| 2024/0275803 A1 | 8/2024 | Varanasi et al. |
| 2024/0283826 A1 | 8/2024 | Ganguli et al. |
| 2024/0291846 A1 | 8/2024 | Saraf et al. |
| 2024/0297881 A1 | 9/2024 | Bansal |
| 2024/0303336 A1 | 9/2024 | Tammireddy et al. |
| 2024/0314140 A1 | 9/2024 | Beevor |
| 2024/0314176 A1 | 9/2024 | Varanasi et al. |
| 2024/0323189 A1 | 9/2024 | Mihajlovic et al. |
| 2024/0334190 A1 | 10/2024 | Cheethirala et al. |
| 2024/0356918 A1 | 10/2024 | Darbarwar et al. |
| 2024/0364704 A1 | 10/2024 | Darbarwar et al. |

(56) References Cited

U.S. PATENT DOCUMENTS

| | | |
|---|---|---|
| 2024/0388606 A1 | 11/2024 | Mihajlovic et al. |
| 2024/0422198 A1 | 12/2024 | Pampati et al. |
| 2025/0112923 A1 | 4/2025 | Cirello Filho et al. |
| 2025/0112930 A1 | 4/2025 | Kozin et al. |
| 2025/0112962 A1 | 4/2025 | Cirello Filho et al. |
| 2025/0117486 A1 | 4/2025 | Pickman et al. |
| 2025/0150573 A1 | 5/2025 | Pantapalli et al. |

OTHER PUBLICATIONS

Office Communication for U.S. Appl. No. 17/900,121 mailed Apr. 4, 2023, 13 Pages.

Office Communication for U.S. Appl. No. 18/091,006 mailed Apr. 19, 2023, 9 Pages.

Office Communication for U.S. Appl. No. 17/954,697 mailed May 12, 2023, 5 Pages.

Office Communication for U.S. Appl. No. 18/131,151 mailed Jun. 8, 2023, 9 Pages.

Office Communication for U.S. Appl. No. 17/954,697 mailed Jan. 20, 2023, 13 Pages.

Office Communication for U.S. Appl. No. 18/094,858 mailed Mar. 16, 2023, 10 Pages.

Office Communication for U.S. Appl. No. 18/091,006 mailed Mar. 31, 2023, 12 Pages.

Office Communication for U.S. Appl. No. 17/733,735 mailed Jul. 12, 2022, 38 Pages.

Office Communication for U.S. Appl. No. 17/733,735 mailed Nov. 1, 2022, 7 Pages.

Office Communication for U.S. Appl. No. 17/889,788 mailed Nov. 7, 2022, 12 Pages.

Office Communication for U.S. Appl. No. 18/091,895 mailed Apr. 5, 2023, 12 Pages.

Office Communication for U.S. Appl. No. 18/094,858 mailed Jul. 7, 2023, 12 Pages.

Office Communication for U.S. Appl. No. 18/131,151 mailed Jul. 10, 2023, 7 Pages.

Office Communication for U.S. Appl. No. 18/094,858 mailed Sep. 19, 2023, 4 Pages.

Office Communication for U.S. Appl. No. 18/091,895 mailed Jul. 11, 2023, 9 pages.

Office Communication for U.S. Appl. No. 18/236,360 mailed Oct. 25, 2023, 12 pages.

Office Communication for U.S. Appl. No. 18/236,360 mailed Nov. 13, 2023, 2 pages.

Office Communication for U.S. Appl. No. 18/238,649 mailed Nov. 1, 2023, 13 pages.

Office Communication for U.S. Appl. No. 18/094,858 mailed Oct. 25, 2023, 7 pages.

Office Communication for U.S. Appl. No. 18/238,649 mailed Jan. 26, 2024, 11 pages.

Office Communication for U.S. Appl. No. 18/238,649 mailed Feb. 26, 2024, 4 pages.

Office Communication for U.S. Appl. No. 18/238,649 mailed Mar. 14, 2024, 5 pages.

Office Communication for U.S. Appl. No. 18/587,821 mailed May 3, 2024, 12 pages.

Office Communication for U.S. Appl. No. 18/740,622 mailed Sep. 5, 2024, 54 pages.

Jennings et al REsource Location and Discoveryu (RELOAD) Base Protocol, Internet Engineering Task Force (IETF), Request for Comments:RFC 6940, pp. 1-176 (Year: 2014).

Uriarte et al."Expressive Policy-Based Access Control for Resource-Constrained Devices," Special Section on Security and Privacy in Applications and Services for Future Internet of Things, IEEE Access, pp. 15-46 (Year: 2017).

Office Communication for U.S. Appl. No. 18/740,667 mailed Sep. 19, 2024, 8 pages.

Office Communication for U.S. Appl. No. 18/740,622 mailed Jan. 10, 2025, 39 pages.

Soltani et al "A New Approach to Client Onboarding using Self-Soverign Identity and Distributed Ledger," IEEE, 2018, pp. 1129-1136.

Seleznyov et al "An Access Control Model Based on Distributed Knowledge Management," IEEE Computer Society, 2004, pp. 1-4.

Office Communication for U.S. Appl. No. 18/740,667 mailed Jan. 23, 2025, 11 pages.

Office Communication for U.S. Appl. No. 18/899,488 mailed Jan. 16, 2025, 9 pages.

Office Communication for U.S. Appl. No. 19/048,457 mailed Apr. 2, 2025, 14 pages.

Office Communication for U.S. Appl. No. 18/740,622 mailed Apr. 7, 2025, 3 pages.

Office Communication for U.S. Appl. No. 18/740,622 mailed May 5, 2025, 34 pages.

Northern et al., "Building Secure Environments for Microservices" SRMC, Year: 2022, pp. 27-31.

Al Qassem et al., "Optimal Resource Allocation for Containerized Cloud Microservices", ICECTA, Year: 2022, pp. 271-274.

Office Communication for U.S. Appl. No. 19/063,742 mailed Apr. 24, 2025, 9 pages.

Office Communication for U.S. Appl. No. 19/063,742 mailed Aug. 12, 2025, 7 pages.

Office Communication for U.S. Appl. No. 19/094,182 mailed May 22, 2025, 24 pages.

Office Communication for U.S. Appl. No. 19/094,182 mailed Aug. 21, 2025, 10 pages.

Office Communication for U.S. Appl. No. 19/094,182 mailed Sep. 2, 2025, 6 pages.

Zhang et al., "Time Series Anomaly Detection via Reinforcement Learning-Based Model Selection," 2022 IEEE (CCECE), pp. 193-199.

An et al., "GPT-LAD: Leveraging Large Multimodal Models for Logical Anomaly Detection," ICASSP 2025, Apr. 2025, pp. 1-5.

Office Communication for U.S. Appl. No. 19/394,145 mailed Jan. 27, 2026, 14 pages.

* cited by examiner

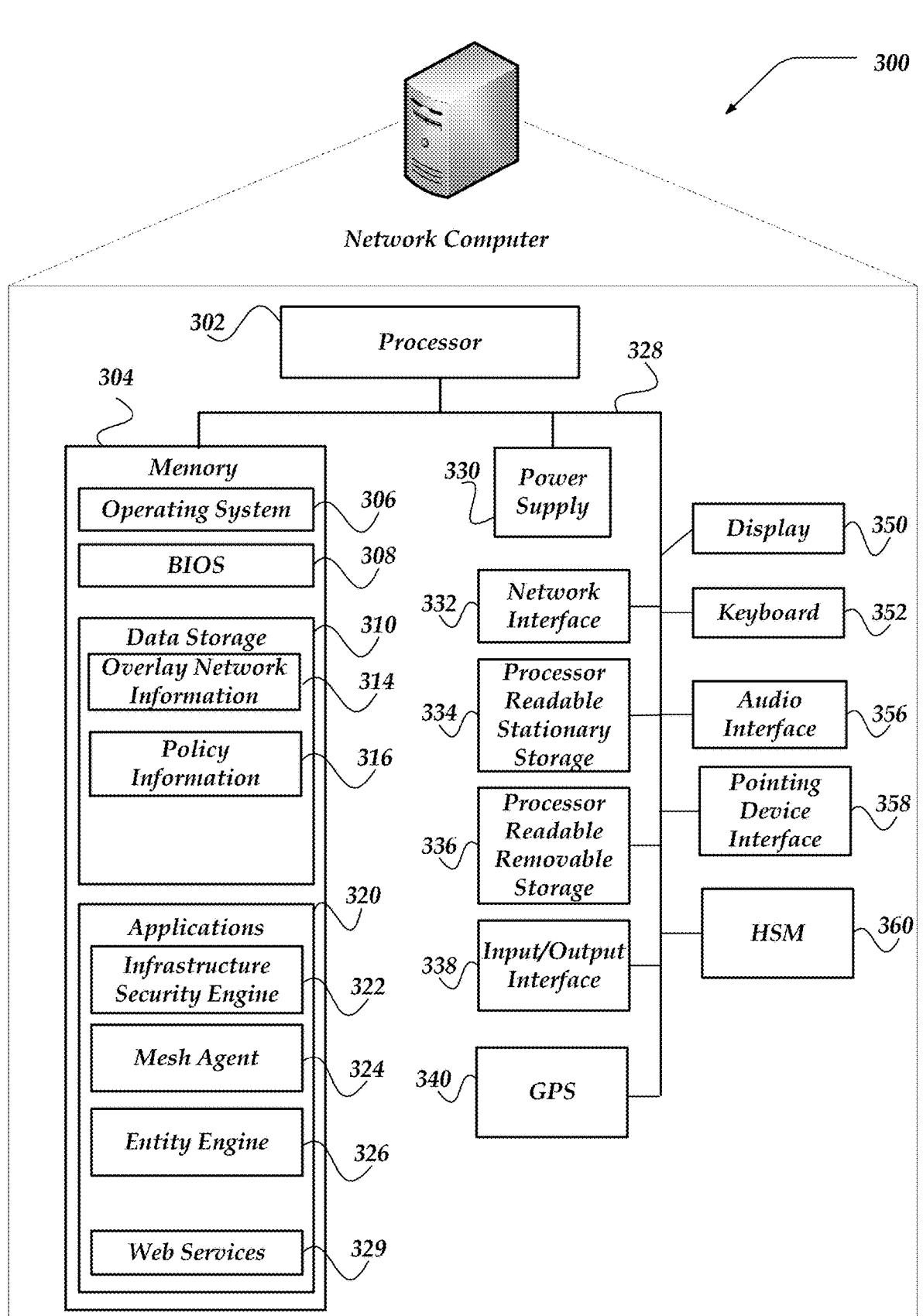

*300*

Network Computer

302 Processor

328

304

330

Memory

Operating System — 306

BIOS — 308

Data Storage — 310

Overlay Network Information — 314

Policy Information — 316

Applications — 320

Infrastructure Security Engine — 322

Mesh Agent — 324

Entity Engine — 326

Web Services — 329

Power Supply — 330

Network Interface — 332

Processor Readable Stationary Storage — 334

Processor Readable Removable Storage — 336

Input/Output Interface — 338

GPS — 340

Display — 350

Keyboard — 352

Audio Interface — 356

Pointing Device Interface — 358

HSM — 360

*Fig. 3*

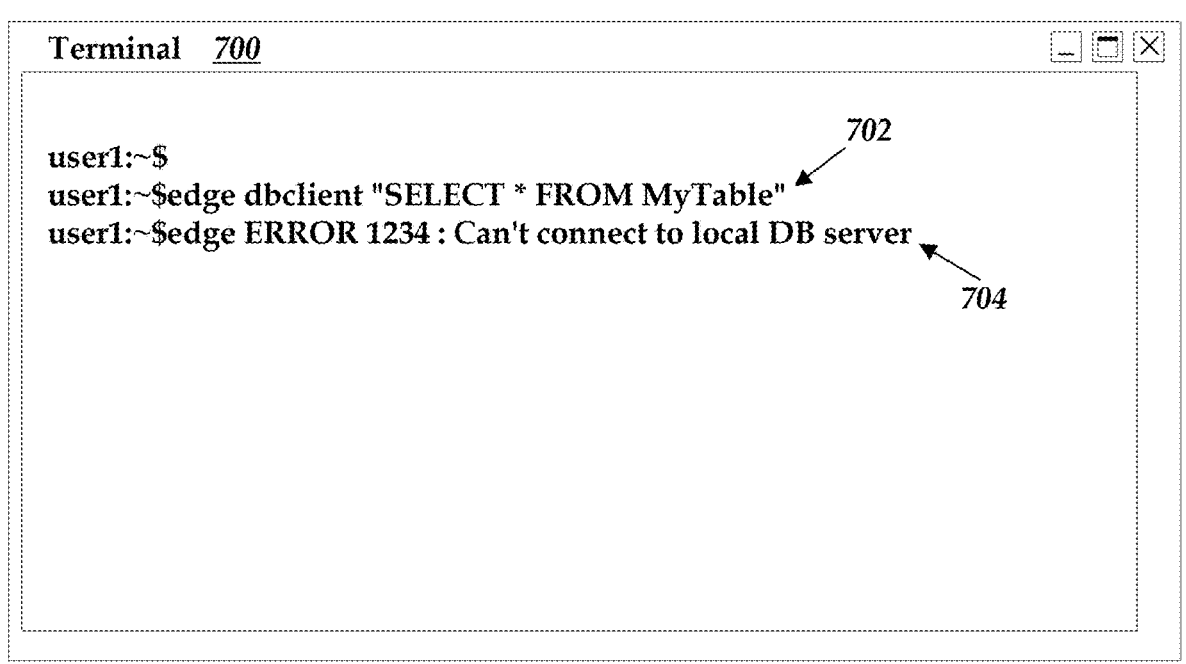
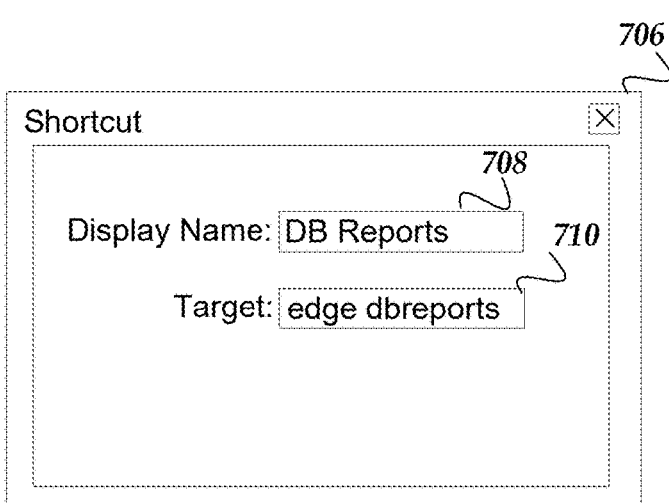
Fig. 7

900
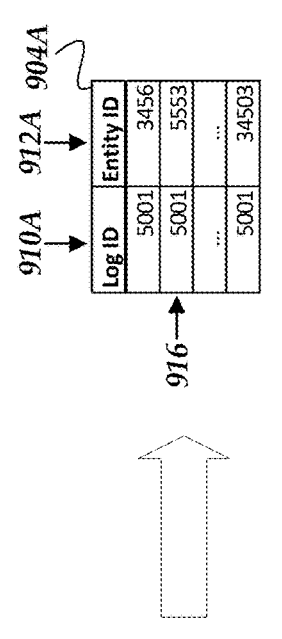
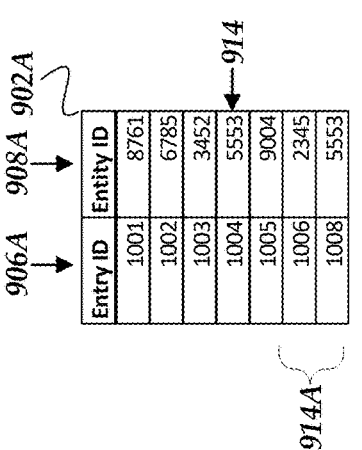
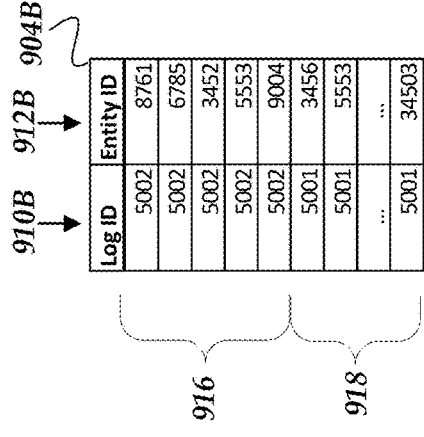
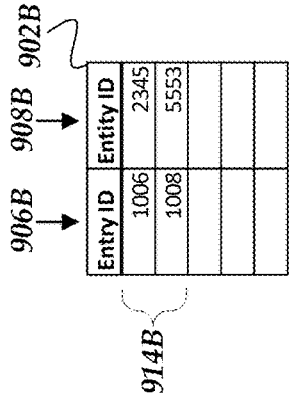
*FIG. 9*

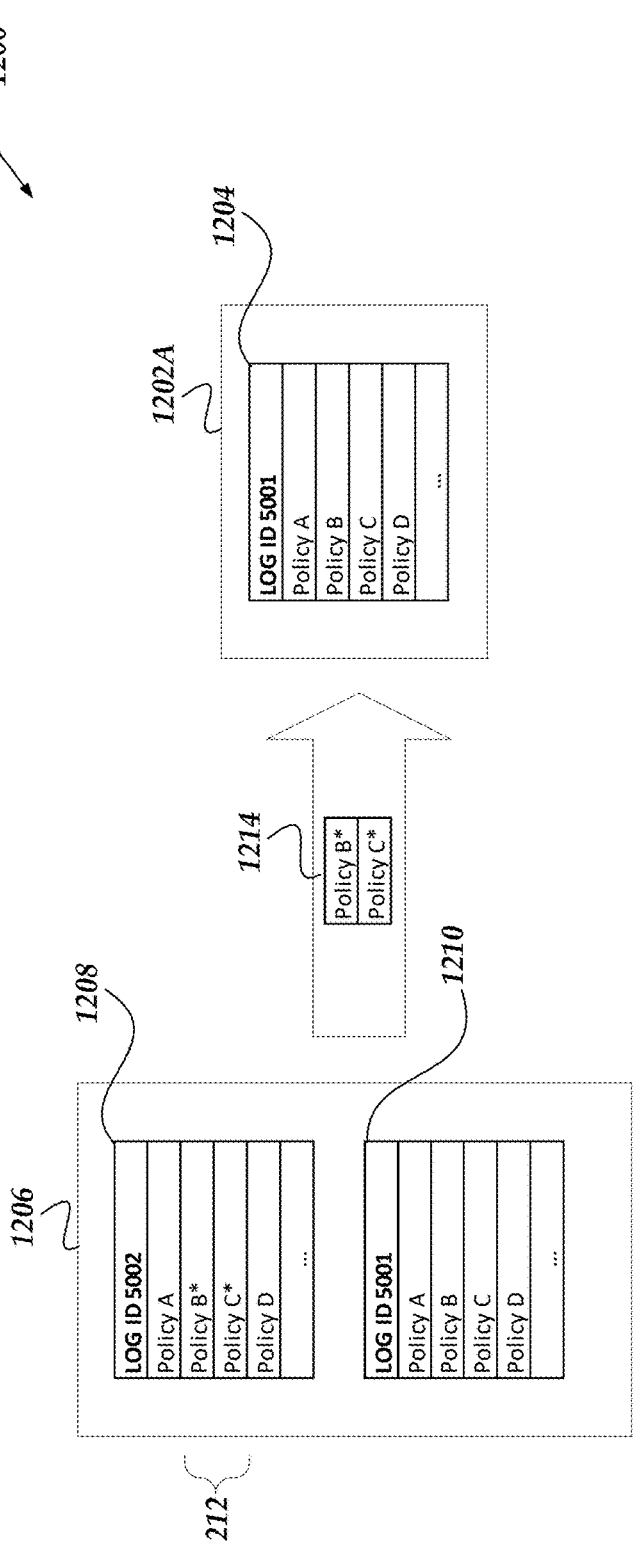
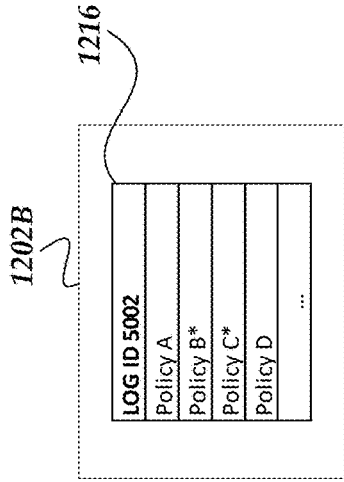
FIG. 12

DISTRIBUTING SECURITY POLICIES

TECHNICAL FIELD

The present invention relates generally to network security, and more particularly, but not exclusively, to distributing security policies.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, the regulatory environment has been adapting to the increase in computer-based services. Accordingly, organizations may be required to comply with regulatory regimes from multiple jurisdictions related to various critical subjects, such as finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Organizations have adapted to these requirements or conventions by deploy policy management tools that enable detailed or explicit security policies to be expressed or enforced using various policy description languages. In these security environments it is important to provide a consistent security state for diverse entities or participants. However, the diverse or distributed nature of modern network environments may make it challenging or impossible to ensure consistent application of security policy across managed networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 7 illustrates a logical schematic of a terminal and shortcut for distributing security policies in managed networks in accordance with one or more of the various embodiments;

FIG. 9 illustrates a logical schematic of a system for migrating entity change entries from change buckets to change logs for distributing security policies in managed networks in accordance with one or more of the various embodiments;

FIG. 12 illustrates a logical schematic of a system for updating mesh agent security state views with incremental policy changes in accordance with one or more of the various embodiments;

DETAILED DESCRIPTION OF VARIOUS EMBODIMENTS

Figure 1:
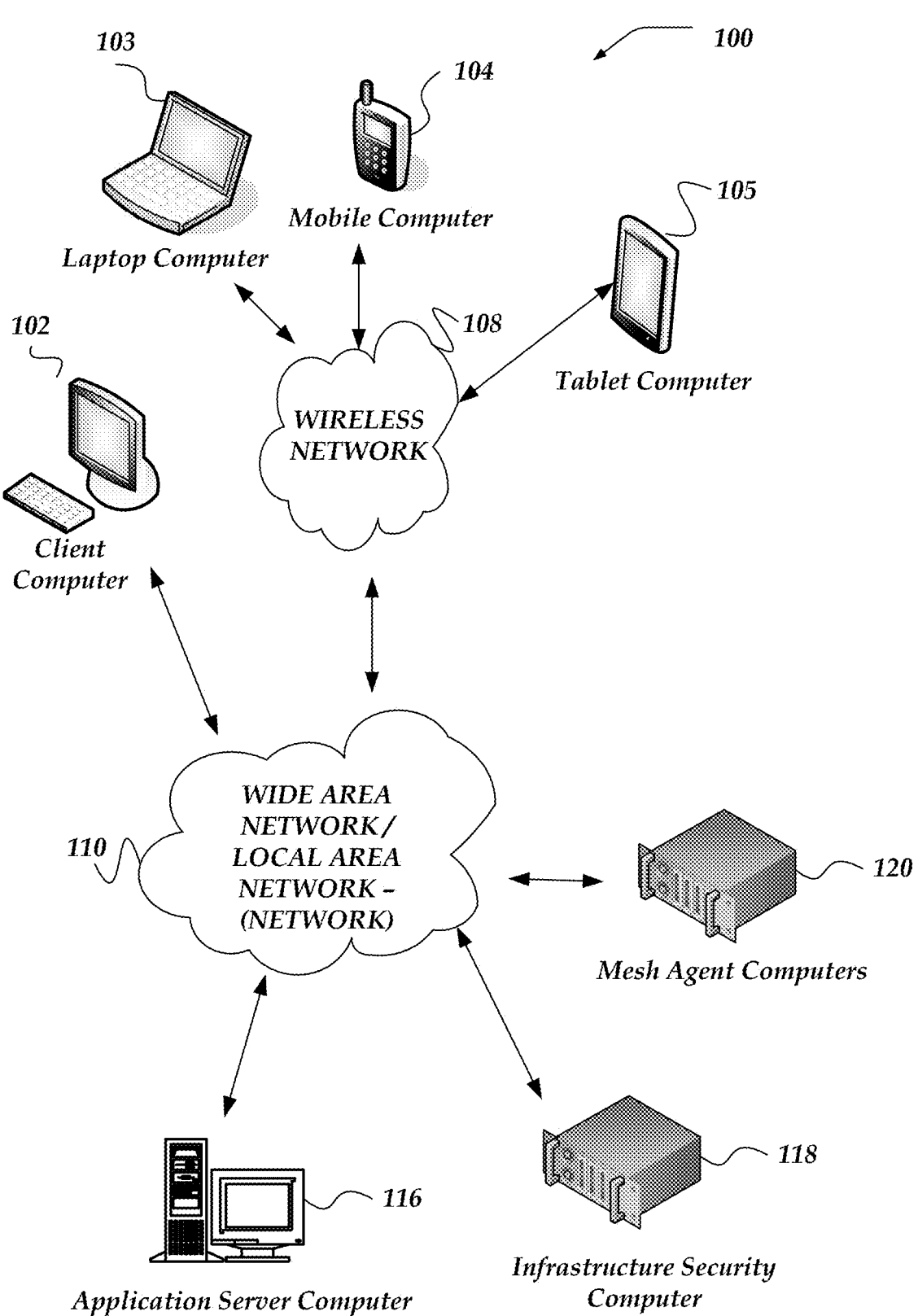
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, *Julia*, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage devices and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to an interactive packet interchange between two or more communicating endpoints, such as network devices. Connections may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, a virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term "transport protocol" refers generally to communication protocols that may often or primarily used for carrying data for other protocols. Describing a protocol as a transport protocol may be relative to the one or more protocols that it may be carrying. For example, some conventional transport protocols such as Transmission Control Protocol (TCP) or User Datagram Protocol (UDP) may be themselves be carried in low level transport protocols, such as Internet Protocol (IP), or the like.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "repeatable read isolation level" refers to a database transaction isolation mechanism that is designed to ensure that a transaction can read the same set of data consistently throughout the duration of the transaction, even if concurrent transactions may be modifying related data. In the context of distributing security policies, repeatable read isolation level transactions enable migration operations to move entity change entries from change buckets to change logs without interference from concurrent entity modification activities. This isolation level helps prevent race conditions between multiple infrastructure security engines to help ensure that entity change entries remain stable during migration transactions.

As used herein, the term "credential information" refers to data or data structures that include credential secrets that enable access to protected resource servers. For example, credential information may include usernames, passwords, pass-phrases, security certificates, or the like.

As used herein, "activity" refers to behaviors, messages, communications, or the like, that may be observed occurring in a network or communicated to or via the network. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare which activities may be relevant.

As used herein, the term "policy, or" "security policy" refers to data or data structures that include particular instructions or declarations that may be evaluated to determine if a resource may be accessed by a client in an overlay network. Further, in some cases, policies may define one or more actions, conditions, constraints, or the like, that may be applied to interacting with resources in a network.

As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the term "entity information" refers to data or data structures that include attributes, characteristics, or properties associated with entities in a managed network environment. Entity information may include information about users, resources, applications, endpoints, roles, permissions, credentials, organizational relationships, geographic locations, other attributes, or the like that may be relevant for security policy evaluation or enforcement. In some cases, entity information may be collected from various entity information sources, such as configuration databases, LDAP services, identity providers, cloud-based administration services, SCIM endpoints, credential services, or the like.

As used herein, the term "entity datastore" refers to one or more databases, data repositories, or data storage systems that maintain entity information for entities in a managed network environment. Entity datastores may include relational databases, NoSQL databases, directory services, or other data storage mechanisms that provide persistent storage for entity information and support repeatable read isolation level transactions, or the like. In some cases, entity datastores may be updated with entity information from various entity information sources and may serve as the authoritative source of current entity states for security policy enforcement.

As used herein, the term "entity change entry" refers to a data structure or record that indicates that an entity in an entity datastore has been modified, added, or removed. Entity change entries may include an entity identifier that identifies the affected entity and may be generated when entity information is updated in the entity datastore. Entity change entries may be temporarily stored in change buckets before being migrated to change logs for distribution to infrastructure security computers and mesh agents.

As used herein, the term "log change entry" refers to a data structure or record in a change log that includes an entity identifier and an associated log identifier. Log change entries may be generated by migrating entity change entries from change buckets during repeatable read isolation level transactions. Log change entries enable infrastructure security computers to determine which entities have been modified since their last security state view update based on log identifier ranges.

As used herein, the term "change bucket" refers to a temporary storage mechanism or data structure that accumulates entity change entries representing pending entity modifications before they are migrated to a change log. Change buckets may serve as intermediate storage that collects entity change entries from multiple entity update operations to enable efficient batch processing during subsequent migration operations. Change buckets may be emptied during migration transactions that move entity change entries to change logs with associated log identifiers.

As used herein, the term "change log" refers to a persistent, ordered data structure or database table that stores log change entries with monotonically increasing log identifiers. Change logs may enable infrastructure security computers and mesh agents to determine incremental updates to security state views by identifying which entities have been modified between different log identifier values. Change logs may be populated by migrating entity change entries from change buckets during repeatable read isolation level transactions that assign consistent log identifiers to related entity changes.

As used herein, the term "security state views" refers to data structures that represent the current security policies as applied to entities in a managed network environment at a particular point in time. Security state views may include active security policies, entity information, and policy enforcement rules associated with a specific log identifier that indicates the consistency point of the view. Security state views may be maintained by infrastructure security computers and distributed to mesh agents to enable consistent policy enforcement across distributed managed network environments.

As used herein, the term "adapters" refers to software components, modules, or interfaces that transform or translate entity information from entity datastores into formats suitable for security state views or policy evaluation. Adapters may include instructions, APIs, filters, transformers, or other processing logic for collecting, formatting, or structuring entity information. Adapters may be configured to determine which entity attributes are relevant for security policy enforcement and may format entity information to conform to specific policy description languages or security state view requirements.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to distributing security policies. in one or more of the various embodiments, one or more entity change entries associated with updating, adding or removing a plurality of entities from an entity datastore may be obtained.

In one or more of the various embodiments, a request to obtain a security state view may be employed to perform additional actions, including: obtaining a new log identifier based on a current log identifier associated with the request; obtaining one or more log change entries associated with the new log identifier and the plurality of entities based on the one or more entity change entries; collecting one or more entities based on one or more other log change entries that may be associated with one or more log identifiers that may be associated with the request; obtaining the security state view based on the one or more entities such that the security state view may be associated with the new log identifier and such that the security state view enforces one or more security policies for the one or more entities in the computing environment.

In one or more of the various embodiments, a user interface may be obtained, the user interface may include one or more display panels for content that includes a report associated with the security state view that may be dynamically transformed and arranged for display to a user based on one or more of user interaction telemetry, user feedback or telemetry metrics.

In one or more of the various embodiments, one or more entity information sources that include one or more of a configuration database, an identity provider, a credential service, or a directory system may be monitored. In one or more of the various embodiments, one or more entity modifications may be obtained from the one or more entity information sources. In one or more of the various embodiments, one or more entity attribute changes that are associated with policy enforcement may be collected. In one or more of the various embodiments, an entity change entry for each entity associated with the one or more entity attribute changes may be obtained.

In one or more of the various embodiments, obtaining the one or more entity change entries may include: collecting one or more entity identifiers that correspond to one or more updated entities; associating each of the one or more entity identifiers with an entity change entry; or the like.

In one or more of the various embodiments, the one or more entities may include one or more of a user account, a resource endpoint, an application service, a network segment, a policy rule that is referenced by the one or more security policies, or the like.

In one or more of the various embodiments, one or more mesh agents that are associated with another log identifier and another security state view may be collected. In one or more of the various embodiments, information associated with one or more differences between the security state view and the other security state views may be obtained based on the security state view, the other log identifier, and the other security state view such that the information may be communicated to the one or more mesh agents.

In one or more of the various embodiments, one or more active sessions that are associated with one or more security state views may be obtained such that the one or more active sessions may be associated with separate log identifiers such that the one or more security state views may be associated with the one or more active sessions. In one or more of the various embodiments, one or more session completion events associated with the one or more active sessions may be collected. In one or more of the various embodiments, the one or more security state views that are associated with the one or more session completion events may be discarded.

In one or more of the various embodiments, obtaining the security state view may include: obtaining one or more partial security state views based on the one or more security policies that reference the one or more entities; updating the security state view to include the one or more partial security state views; or the like.

In one or more of the various embodiments, one or more adapters configured to transform entity information from one or more entity datastore formats into one or more security state formats maybe obtained such that the one or more adapters include one or more of an instruction set, a data transformation rule, a format converter, an entity attribute filter, or the like. In one or more of the various embodiments, the one or more entities may be converted from the one or more entity datastore formats into one or more security state view formats for inclusion in the security state view to enforce the one or more security policies.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
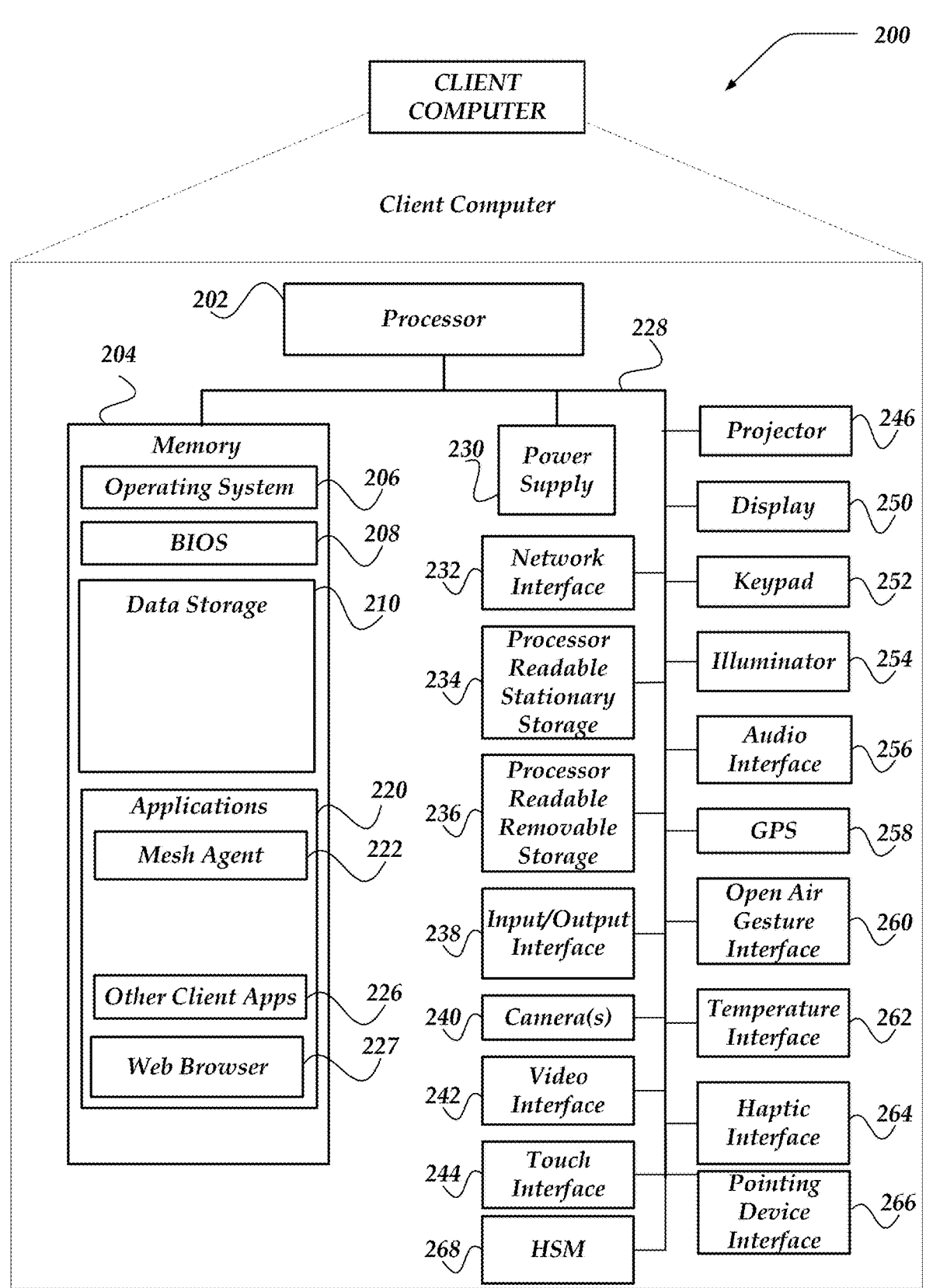
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 226, web browser 227, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for managing interactions with applications in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, entity engine 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, policy information 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, entity engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, entity engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, entity engine 326, web services 329, or the like, may be provisioned and de-commissioned automatically.

Also, in one or more of the various embodiments, infrastructure security 322, mesh agent 324, entity engine 326, web services 329, or the like, may be located in virtual servers running in a cloud-based computing environment rather than being tied to one or more specific physical network computers. Likewise, in some embodiments, one or more of infrastructure security engine 322, mesh agent 324, entity engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
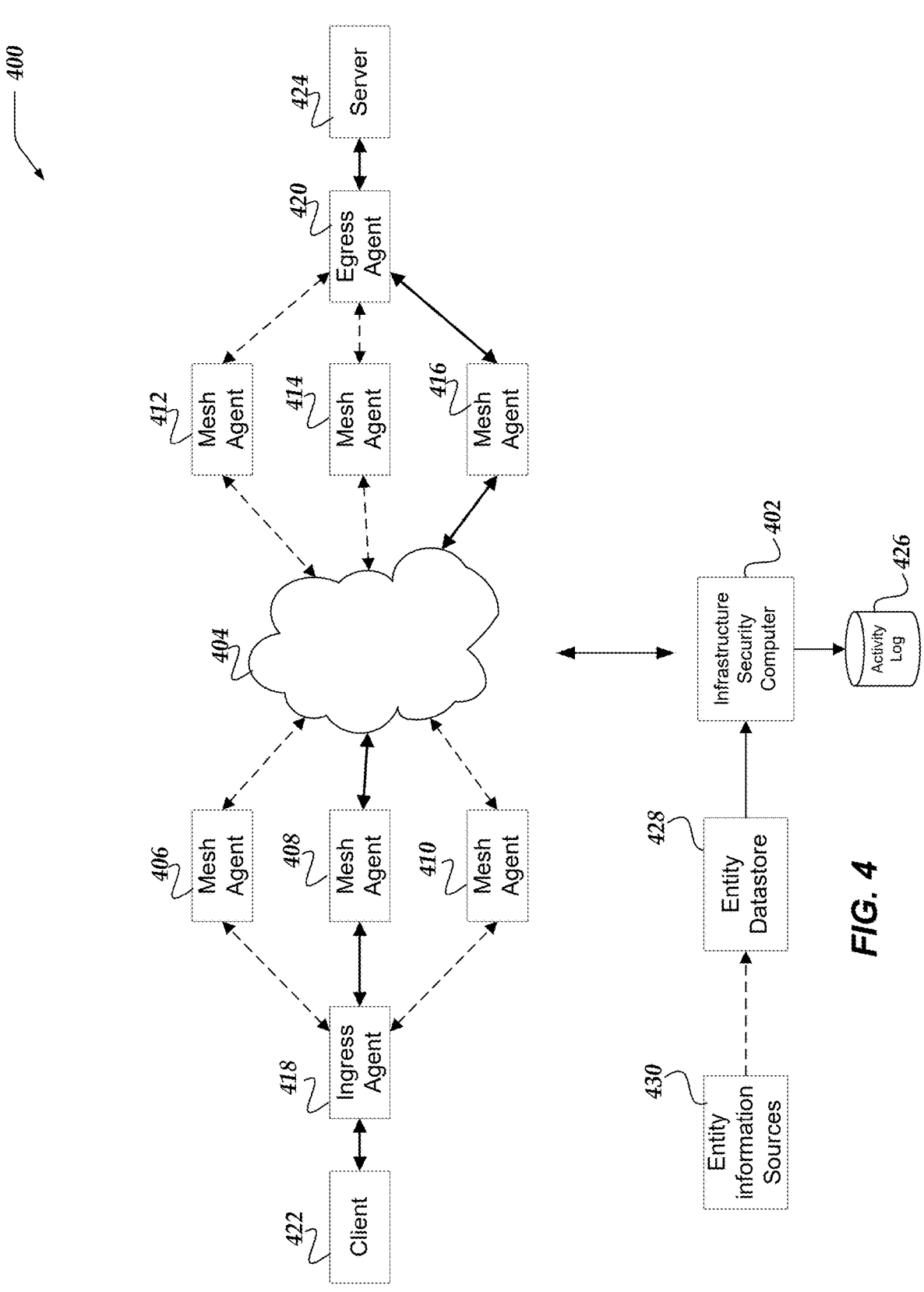
FIG. 4 illustrates a logical architecture of a system for distributing security policies in managed networks in accordance with one or more of the various embodiments.

FIG. 4 illustrates a logical architecture of system 400 for distributing security policies in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce policies for a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In some embodiments, infrastructure security computers may be arranged to authorize or enable requests based on one or more policies (e.g., security policies) that may be defined for various resources or activities in the managed network. Accordingly, in some embodiments, infrastructure security computers or other services may provide one or more tools or applications for defining or managing policies.

In one or more of the various embodiments, mesh agents may be arranged to determine a next 'hop' to a next mesh agent. Accordingly, the next mesh agent, as well as other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered as overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may be associated with the communication through the secure tunnel. In this example, for some embodiments, activity log data store 426 represents a data store for storing logged or recorded activity for managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Further, in some embodiments, actualizing or implementing security policies in managed networks may depend on the particular entities (e.g., users, endpoints, applications, services, locations, networks, or the like) that may be included in a managed networking environment. In some embodiments, infrastructure security computers may maintain a security state which may represent the current security policies as applied to current/known entities in the managed network. Accordingly, in some embodiments, if one or more attributes or characteristics associated with known entities that contribute to a security state may be modified, it may result in the security state becoming stale. Likewise, in some embodiments, the security state may become stale if one or more new entities may be added or one or more known entities may be removed from the managed network.

Accordingly, in some embodiments, infrastructure security engines hosted in infrastructure security computers, such as infrastructure security computer 402 may be arranged to integrate with one or more entity datastores, such as entity datastore 428 for obtaining up to date information regarding the entities in the managed environment. In some embodiments, infrastructure security engines may be arranged to interact with entity datastores to keep a consistent view of the entities or the entity attributes which may impact one or more security policies. For example, for some embodiments, if a security policy restricts user access to certain resources based on user roles, changes to user roles or the addition or removal of users from the managed environment, may affect the current security state by altering which users may access those protected resources. Likewise, in some embodiments, various changes associated with other entities in the managed environment may impact the security state.

In some embodiments, entity engines (not shown) may be arranged to collect or obtain entity information updates from one or more entity information sources, such as entity information sources 430. In some embodiments, entity information sources may include various services or systems, such as configuration databases, LDAP services, identity providers, cloud-based administration services, System for Cross-domain Identity Management (SCIM) endpoints, credential services, or the like. In some embodiments, entity engines may be arranged to use one or more specialized interfaces, APIs, message queues, or the like to obtain entity information from various entity information sources. Further, in some embodiments, entity engines may be arranged to provide one or more user interfaces that enable users or administrators submit entity information that may be included in entity datastores. For example, in some embodiments, one or more administrators may manually assign attributes to entities that may impact the security state for the managed environment.

In some embodiments, infrastructure security engines may be arranged to periodically or occasionally to update the security state if there may be changes to entities in the managed environment. In some embodiments, there may be more than infrastructure security engine or infrastructure security computer used to manage a managed environment. For example, for some embodiments, overlay networks may be configured to span two or more different physical networks that each have a local infrastructure security computer enforcing the security policies. In this example, while the overlay network may appear as a single logical network, its underlying network implementation may include several WANs, geographic regions, cloud computing providers, availability zones, or the like that host the resources in the managed environment. Accordingly, in some embodiments, it may be advantageous if the security state across that entire overlay network may be consistent. Thus, in some embodiments, entity engines or infrastructure security engines may be arranged to perform actions detailed below to obtain a consistent view of the security state across multiple infrastructure security computers to ensure consistent application of security policies.

Also, in some embodiments, infrastructure security engines may be arranged to push some or all of the security state to mesh agents, such that mesh agents may be enabled to enforce policies based on the current security state. Accordingly, in some embodiments, if infrastructure security engines update their security state view based on changes to entity information, those infrastructure security engines may be responsible for updating the security state view of their associated mesh agents.

Figure 5:
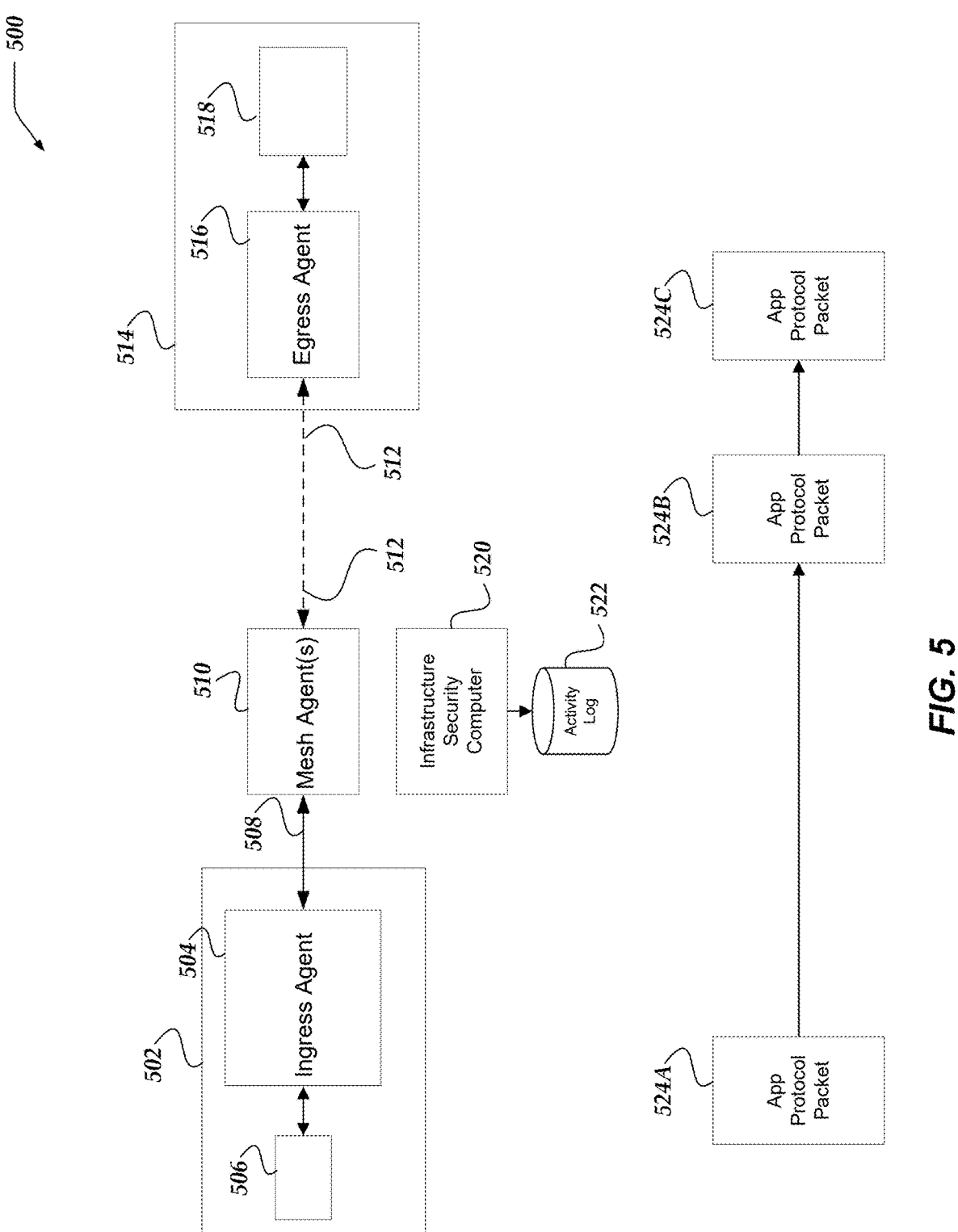
FIG. 5 illustrates a logical schematic of a system for distributing security policies in managed networks in accordance with one or more of the various embodiments.

FIG. 5 illustrates a logical schematic of system 500 for distributing security policies in accordance with one or more of the various embodiments, in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as client application 506 may employ one or more application protocols to communicate with resource servers, such as resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/propri-etary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to function as an endpoint to the connection from the client application.

In this example, for some embodiments, application protocol packet 524A represents one or more packets of network traffic that may be sent from a client application, such as client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet 524 (A, B, C) represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represents a modified packet that includes credential information as well as other packet modifications that may be required for a particular application protocol or credential mechanism.

Figure 6:
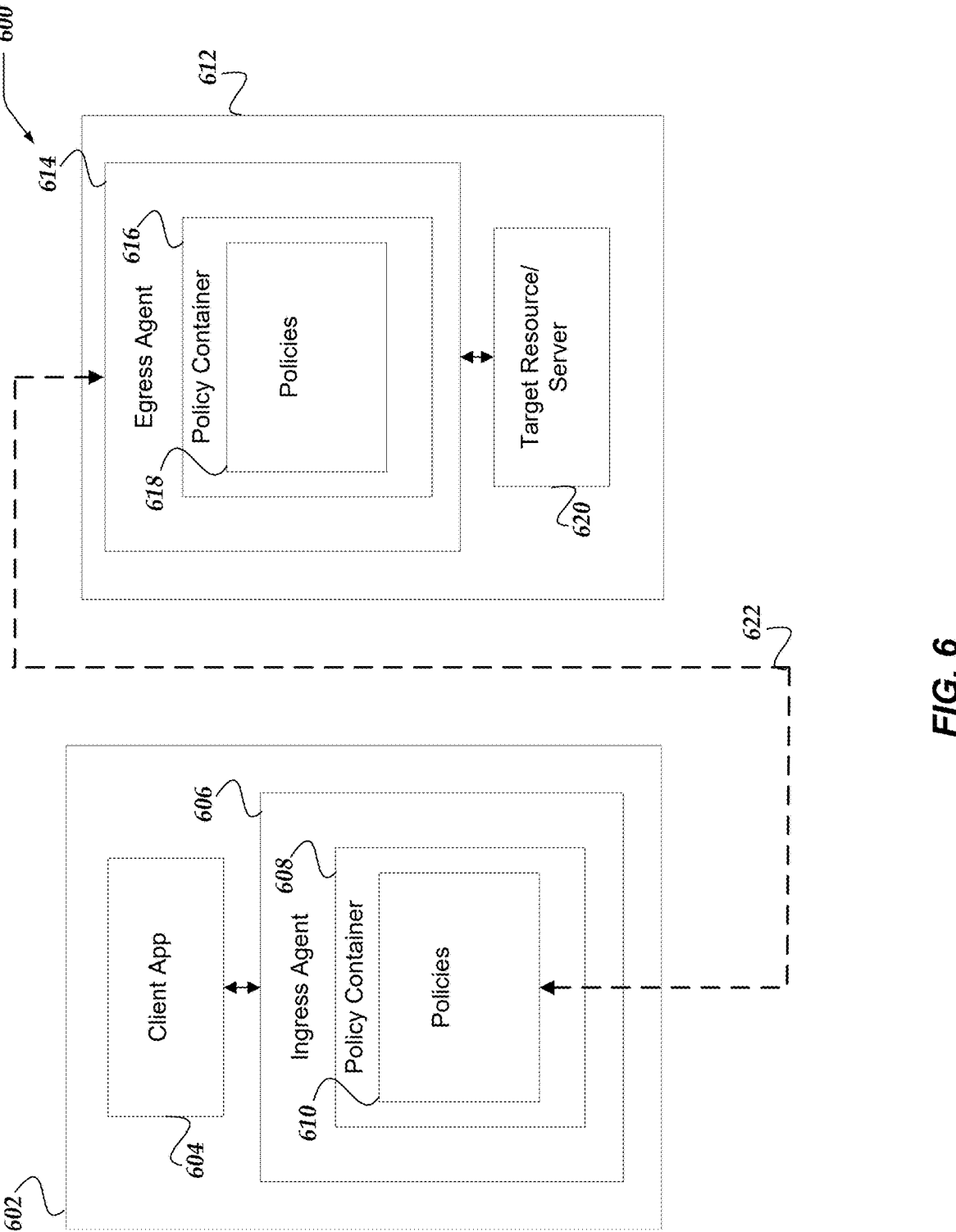
FIG. 6 illustrates a logical schematic of system for distributing security policies in managed networks in accordance with one or more of the various embodiments.

FIG. 6 illustrates a logical schematic of system 600 for distributing security policies in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

FIG. 7 illustrates a logical schematic of terminal 700 and shortcut 706 for distributing security policies in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
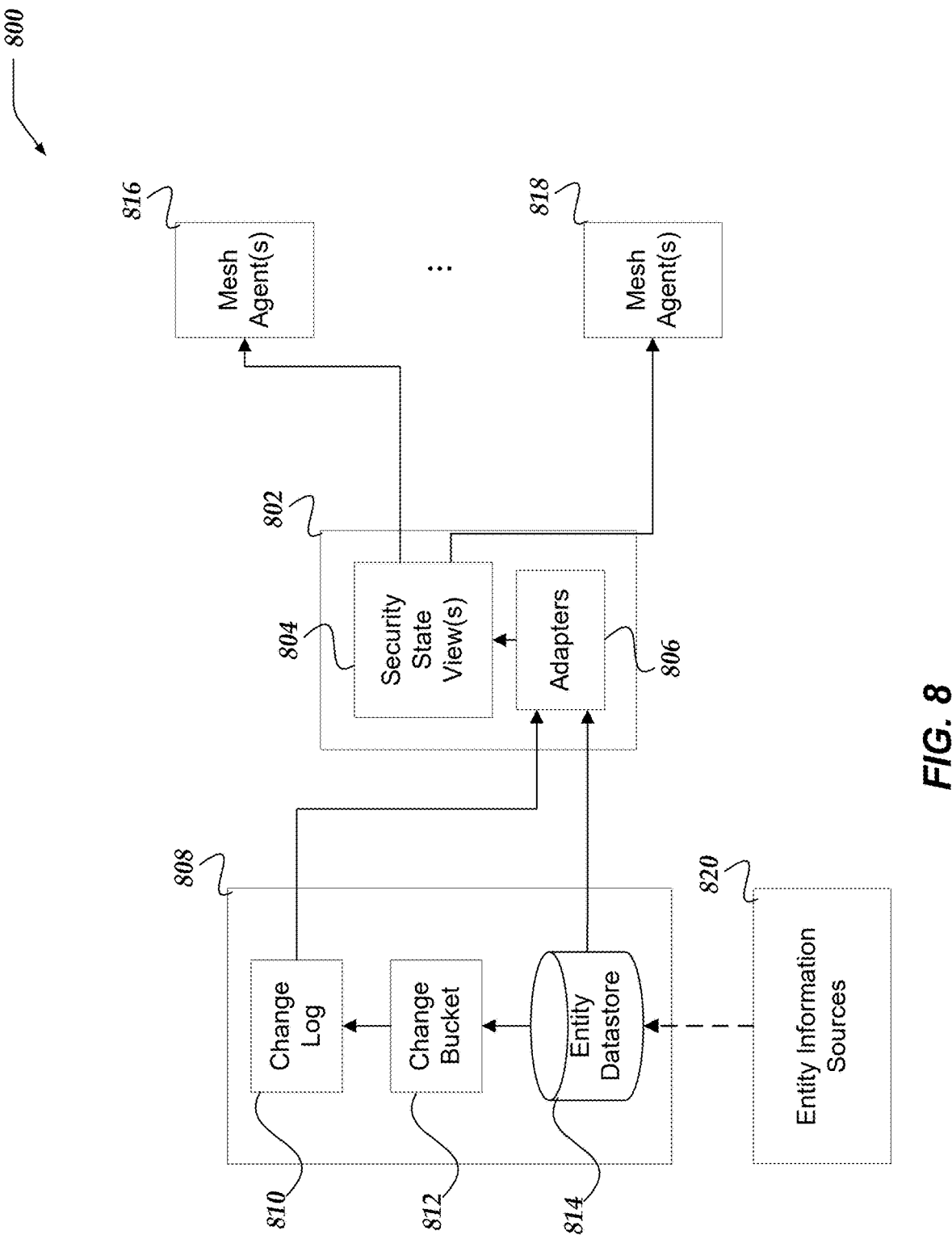
FIG. 8 illustrates a logical schematic of a system for distributing security policies in managed networks in accordance with one or more of the various embodiments.

FIG. 8 illustrates a logical schematic for system 800 for distributing security policies in accordance with one or more of the various embodiments.

As described above, for some embodiments, infrastructure security computers may be arranged and configured to enforce or manage the security policies for managed networks. In some cases, for some embodiments, a single logical managed network (which may include various subnetworks, span one or more WANs, span one or more regional cloud computing environments, or the like) may employ more than one infrastructure security computer for resilancy or performance reasons. Likewise, in some embodiments, in some cases, an organization's security policies may be applied across more than one physical network using multiple infrastructure security computers.

In some embodiments, each infrastructure security computer may be arranged to obtain security policies applied to various entities associated with the managed networks. In some embodiments, entities may be considered to be objects in the managed environment that may be relevant for policies or policy decisions such as include users, computers, applications, endpoints, files, file system directories, or the like. In some embodiments, entities may include a type and an identifier.

In some embodiments, security policies may be associated with various participants, targets, constraints, actions, or the like. Accordingly, in some embodiments, entities may be used in different parts of a security policy declaration. Thus, in some embodiments, entities may be considered to represent the object model components or data model components that infrastructure security computers may use apply/enforce security policy within the managed networks.

Accordingly, in some embodiments, it may be imperative for infrastructure security engines, such as infrastructure security engine 802 to maintain a consistent, accurate, and update-to-date representation of the security state that includes accurate and current representations of the entities comprising or referenced by enforced security policies. Accordingly, in some embodiments, infrastructure security engines may be arranged to maintain a security state view, security state view 804 that represents the security state at a known point in time. For example, as described above, mesh agents may enable users in one portion of a managed network to interact with resources in another portion of the managed network, where each portion may be overlaid on different physical networks. Accordingly, in this example, infrastructure security computers and mesh agents in the different physical networks need to have a consistent security state view.

In some embodiments, a security state view may be one or more data structures that represent active security policies as applied to the entities in the managed network environment. Accordingly, in some embodiments, infrastructure security engine may be arranged to reference its local security state views to enforce security policies in the managed environment across different logical or physical networks.

Accordingly, in some embodiments, as entity information changes (e.g., changes to known entities, adding new entities, removing entities, or the like) may be collected from entity information sources, such as entity information sources 820, entity datastore 814 may be updated. However, in some cases, for some embodiments, changes to entity datastore 814 may need to be reflected in the current security state by updating the security state views of each dependent or associated infrastructure security engine, such as infrastructure security engine 802. Further, in some embodiments, updated security state views need to be provided to infrastructure security computers and mesh agents.

In some embodiments, an entity change entry for each entity that may be impacted by changes to entity information may be obtained and stored in a change bucket, such as change bucket 812. In some embodiments, each entity change entry may include the entity identifier (entity ID) of the affected entity. For example, for some embodiments, if ten new users are added to the entity datastore, ten entity change entries may be added to the change bucket with each entry including the entity ID for the affected entity.

In some embodiments, infrastructure security engines may be arranged to periodically update their security state views. Accordingly, in some embodiments, if the security state view for an infrastructure security engine needs to be updated/refreshed, infrastructure security engines may be arranged to test if the change bucket, such as change bucket 812 includes entity change entries. In some embodiments, if the change bucket includes entity change entries, the infrastructure security engine may initiate migration of the entity change entries in the change bucket to a change log, such as change log 810.

In some embodiments, migrating entity change entries from a change bucket to a change log includes creating log change entries in the change log. In some embodiments, log entries may be data structures that include a log ID and an entity ID. If a log entry is generated or stored in the change log, the corresponding entity change entry may be discarded or otherwise removed from the change bucket.

In some embodiments, log IDs may be considered to be monotonically increasing values. In some embodiments, each migration transaction that moves entity change entries from change buckets to change logs may be associated with a log ID where each log entry for the same transaction is associated with the same log ID. For example, for some embodiments, if there may be ten entity change entries in change bucket 812, one log ID and ten log entries may be generated as a result of the migration such that each log entry may be associated with one log ID. Accordingly, in some embodiments, if a subsequent migration occurs, a new log ID may be generated and associated with the log entries resulting from the subsequent migration.

In some embodiments, the migration may be performed using repeatable read isolation level transactions that enable the migration to occur unimpeded by entity change entries being added to the change bucket while a migration operation may be pending. Accordingly, in some embodiments, entity change entries that may be in the change bucket may be moved to the change log and associated with the same log ID. Note, in some embodiments, if entity change entries are obtained because of updated event information, they may be stored in the change bucket as usual, until they may be migrated during another migration operation.

In some embodiments, if an infrastructure security engine needs to acquire an updated security state view, it may check if the change bucket has entity change entries. If the change bucket includes one or more entity change entries, the infrastructure security engine may perform the migration producing a new log ID and one or more log entries associated with the new log ID. If the migration of entries in the change bucket to the change log may be complete, the infrastructure security engine may compare the log ID associated with its current security state view with the latest log ID in the change log. Accordingly, in some embodiments, infrastructure security engine may determine which entities need to be added, updated, or removed from its security state view.

For example, in some embodiments, if the current/last log ID associated with security state view 804 may be 3001 and the latest log ID in the change log may be 3008, the infrastructure security engine may be arranged to update its security state view to reflect the log entries associated with log ID 3002-3008. In some embodiments, this may include employing adapters 806 to retrieve the entities associated with log change entries from the entity datastore. In some embodiments, if an entity ID is included in log entries for more than one log ID, the entity may be retrieved from the entity datastore one time rather than for each log entry. For example, if an entity ID is associated with two or more log IDs, the current entity may be retrieved from the datastore one time to satisfy each log entry because the infrastructure security computer is seeking the latest version of the entity.

In some embodiments, infrastructure security engines may be arranged to employ one or more adapters, such as adapters 806 to retrieve, format, or structure the updated event information to update the security state views of infrastructure security engines. In some embodiments, adapters may include one or more instructions or data structures tailored for conforming event information into security state information. In some embodiments, adapters may be arranged to employ instructions, APIs, interfaces, filters, transformers, or the like for collecting entity information from entity engines. Also, in some embodiments, adapters may be configured to determine which entity attributes should be applied to security state views or may otherwise be relevant to security policy. For example, for some embodiments, if users have attributes that may be irrelevant to security policy, such as eye color or hair color, adapters may be configured to ignore or disregard changes to those attributes.

In some embodiments, infrastructure security computers may be arranged to keep more than version of security state views onboard or otherwise active at the same time. Accordingly, in some embodiments, sessions in the mesh network that a relying on a prior security state view may continue to operate if the updated/newer security state views are irrelevant to their pending session. For example, if a user is running a long running operation based on a prior security state view, it may continue that operation unless the policies changes reflected in the updated/newer security state views directly affect the particular session. For example, if Bob gains access to a resource based on a security state views associated with log ID 111, changes such as adding new users or new resources would be irrelevant to Bob and his session. Accordingly, in some embodiments, infrastructure security computers or mesh agents associated with Bob's session may rely on the old security state view to enable Bob's session to continue operating without interruption. Note, in some embodiments, if the security state view update would cancel Bob's access the resources used in his session, infrastructure security computers may interrupt that session.

In some embodiments, infrastructure security computers may be configured enforce various rules or conditions that may determine if older security state view information may be maintained. For example, in some embodiments, infrastructure security computers may be configured to disable/discard security state views based on conditions or rules, such as staleness/lifetime limits, buffer/cache size constraints, manual/direct intervention, or the like.

Further, as detailed below, security state view data structure may be configured use overlay/memory sharing to reduce the amount of duplicated information in security state views.

Similar to keeping security state views on infrastructure security computers up to date, mesh agents may depend on local copies of the security state views. This enables mesh agents to make policy decisions without having to communicate every authorization request to an infrastructure security computer. Accordingly, in some embodiments, infrastructure security computers may be arranged to periodically or occasionally provide mesh agents portions of the current security state view (deltas) that have changed since the mesh agent security state view was last updated. In some embodiments, mesh agents may maintain a record of its last log ID. In some embodiments, if a mesh agent's log ID is not the same value as the log ID associated with the current security state view of its associated infrastructure security computer, the associated infrastructure security computer may determine which security state changes occurred since the mesh agents last were updated. These changes may be communicated to the mesh agents to update their security state view to the current security state view of their associated infrastructure security computer. In some embodiments, if a mesh agent is updated, it may store the log ID associated with the last update.

Further, in some embodiments, as mentioned there may be more than one infrastructure security computer relying on the same entity engine. Accordingly, in some embodiments, the infrastructure security computers or infrastructure security engines may race to the change bucket such that the "first" infrastructure security engine that discovers entity change entries in the change bucket may be responsible for migrating entity change entries to the change log in exclusion of other infrastructure security computers. In some embodiments, subsequent infrastructure security computers may be blocked or delayed until the pending transfer of entity change entries to the change log has completed.

Also, in some embodiments, if the security state views of mesh agents (such as mesh agent 816 or mesh agent 818) or infrastructure security computers become stale or otherwise so out of date that it may be difficult to compute deltas, reconcile different/older log IDs, or the like. For example, if a mesh agent reconnects to a infrastructure security computer after a long enough time has passed, the infrastructure security computer may have been pruned or otherwise discarded security state view information associated with the mesh agent's older log ID such that it may not be possible to reliably compute the deltas needed to bring the mesh agent to the current security state view. Accordingly, in some embodiments, infrastructure security computers may be configured to initiate a reset of its security state views such that an entire new current security state view may be provided if needed.

Further, in some embodiments, in some cases, infrastructure security computers may temporarily lose connectivity with the entity engine, change log, change bucket, entity datastore, or the like. Accordingly, in some embodiments, infrastructure security engine may immediately look to the change log to obtain the latest log ID and then synchronize with the entity information to obtain a current security state view. Note, in these circumstances, the infrastructure security engine may omit checking the change bucket for entity change entries to migrate to the change log.

FIG. 9 illustrates a logical schematic of system 900 for migrating entity change entries from change buckets to change logs for distributing security policies in managed networks in accordance with one or more of the various embodiments.

In some embodiments, as described above in conjunction with FIG. 8, infrastructure security engines may be arranged to migrate entity change entries from change buckets to change logs to maintain consistent security state views across distributed infrastructure security computers or mesh agents. In some embodiments, FIG. 9 may be considered to represent a before and after view of a migration operation that moves entity change entries from change bucket 902A to change log 904A, resulting in the updated states shown in change bucket 902B or change log 904B. In this example, for some embodiments, it may be assumed that the migration operation is initiated by an infrastructure security engine hosted on an infrastructure security computer that is not shown in this illustration.

In this example for some embodiments, change bucket 902A may include one or more entity change entries prior to a migration operation. In some embodiments, change bucket entries may include entry identifiers stored in column 906A or entity identifiers stored in column 908A that indicate which entities have been modified in the underlying entity datastores. Accordingly, in some embodiments, change bucket 902A may accumulate entity change entries as entity modifying actions occur in the managed network environment. For example, entity change entries may be obtained if a new user may be added to a resource access list, new endpoints or resources may be added to the managed network, new policies may be added, existing entities may be modified or removed, or the like.

In this example, for some embodiments, change log 904A may represent the state of the change log prior to the migration operation. In some embodiments, change log 904A may include existing log entries with log identifiers stored in column 910A or corresponding entity identifiers stored in column 912A. Accordingly, in some embodiments, each log entry in change log 904A may be associated with a particular log identifier that represents a previous migration operation.

In some embodiments, during the migration operation, infrastructure security engines may be arranged to start a repeatable read transaction that moves entity change entries from change bucket 902A to change log 904B. In some embodiments, the migration operation may assign a new monotonically increasing log identifier to all entity change entries that are migrated during the same transaction. Accordingly, in some embodiments, multiple entity identifiers may be associated with the same log identifier if they are migrated together, indicating they represent a consistent version of entity changes at a particular point in time.

In some embodiments, change log 904B may represent the updated state of the change log after the migration operation. In some embodiments, the new log entries added to change log 904B may include the log identifiers stored in column 910B or the entity identifiers stored in column 912B that were migrated from change bucket 902A. Thus, in some embodiments, change log 904B may contain both the previous log entries from change log 904A plus the newly migrated entries from change bucket 902A with each set of entries associated with its relevant log ID.

In some embodiments, change bucket 902B may represent the state of the change bucket after the migration operation. Accordingly, in some embodiments, change bucket 902B may be empty or substantially empty if all pending entity change entries were successfully migrated to change log 904B during the transaction. In some embodiments, if additional entity modifications occur during the migration transaction, those new entity change entries may remain in change bucket 902B to be processed during a subsequent migration operation.

Thus, in some embodiments, the migration process ensures that entity changes are captured in an ordered, consistent manner that enables infrastructure security engines to determine incremental updates to their security state views based on log identifier ranges in change log 904B.

Figure 10:
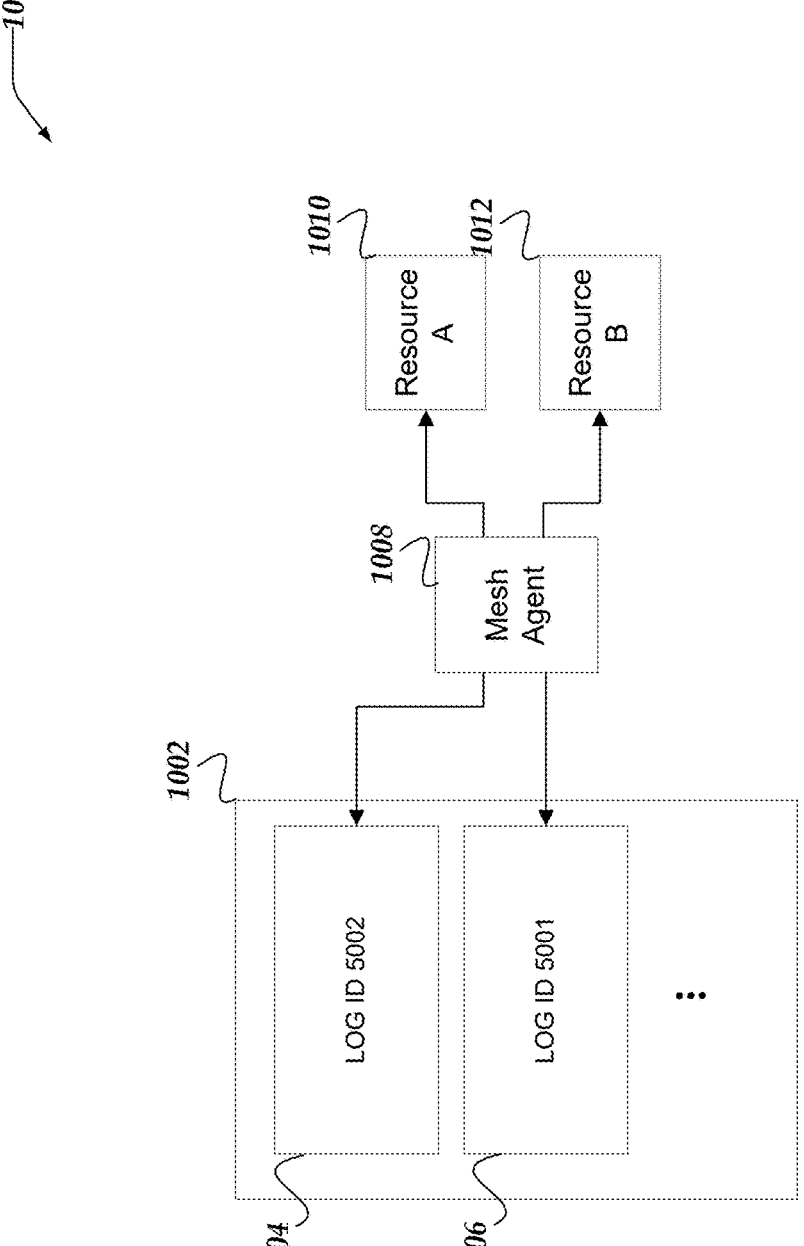
FIG. 10 illustrates a logical schematic of a system for distributing security policies in managed networks in accordance with one or more of the various embodiments.

FIG. 10 illustrates a logical schematic of system 1000 for distributing security policies in managed networks in accordance with one or more of the various embodiments. In some embodiments, system 1000 may include infrastructure security computer 1002 that may be arranged to host one or more infrastructure security engines. In some embodiments, infrastructure security engines may be arranged to maintain multiple security state views concurrently to support ongoing sessions in managed networks. Accordingly, in some embodiments, infrastructure security computer 1002 may include security state view 1004 that may be associated with log ID 5002, or security state view 1006 that may be associated with log ID 5001, or the like.

In some embodiments, mesh agents, such as mesh agent 1008 may be arranged to provide secure access to one or more protected resources in the managed network. Accordingly, in some embodiments, mesh agent 1008 may be arranged to enable clients to securely access resource 1010 or resource 1012, or the like, based on security policies enforced by infrastructure security computer 1002.

In some embodiments, infrastructure security engines may be arranged to associate active sessions with particular security state views based on the log ID that was current when the session was initiated. Accordingly, in some embodiments, resource 1012 may be associated with security state view 1006 because the session for resource 1012 may have been initialized before security state view 1004 was generated or loaded into infrastructure security computer 1002. In some embodiments, resource 1010 may be associated with security state view 1004 because the session for resource 1010 may have been initialized after security state view 1004 became available.

In some embodiments, infrastructure security engines may be arranged to maintain multiple security state views simultaneously to ensure that ongoing sessions continue to operate with consistent policy enforcement. Accordingly, in some embodiments, infrastructure security computer 1002 may retain both security state view 1004, security state view 1006, or the like as long as there may be active sessions that depend on those particular security state views. Thus, in some embodiments, infrastructure security engines may avoid disrupting active sessions by ensuring that the security state view used to authorize a session remains available throughout the duration of that session. Note, in some embodiments, administrative actions may result in disconnection/reset command being sent to mesh agents or infrastructure security engines that are executed immediately. For example, for some embodiments, if one or more resources need to be isolated or restricted to mitigate exigent security incidents, active policies may be changed in real-time and the associated mesh agents may be updated via control plan messaging that may be unassociated with entity information changes, or the like. Similarly, in some embodiments, some entity information changes may be determined to be critical or high priority, such that connections may be rapidly reset. Accordingly, in some embodiments, mesh agents may re-establish one or more of the closed/reset connection using updated security state views Note, in some embodiments, in production environments, security state views may be updated several times a minute to dynamically react to changes to policies, entity information changes, or the like.

Accordingly, in some embodiments, if the session associated with resource 1012 may be completed or terminated, infrastructure security computer 1002 may determine that security state view 1006 is no longer required. Thus, in some embodiments, infrastructure security engines may discard security state view 1006 to free memory resources if no other active sessions depend on that particular security state view.

In some embodiments, this approach enables infrastructure security engines to balance memory efficiency with session consistency by maintaining only the security state views that may be required for active sessions while ensuring that policy enforcement remains consistent throughout the lifecycle of each session.

In some embodiments, infrastructure security engines may be arranged to perform pruning (garbage collection) of security state views based on one or more session lifecycle management criteria. For example, for some embodiments, infrastructure security engines may be arranged to discard out-of-date security state views if no active connections/session may be pending. Likewise, for example, infrastructure security engines may be configured store a defined number of security state views, such as three or more depending on memory capacity. In some embodiments, keeping more than version of security state views enables infrastructure security engines to locally determine the deltas for updating mesh agents. For example, in some embodiments, if a mesh agent reconnects to an infrastructure security engine after a short absence (e.g., short term network disruption), the mesh agent will provide its latest log ID. Thus, in some embodiments, the infrastructure security engines may be arranged to determine the differences between the mesh agent's security state view associated with log ID and current the current security state view. In contrast, if the infrastructure security engine may be configured to only keep the current security state view, mesh agents that reconnect will require entire security state view updates, since the infrastructure security engine may be unable to determine the differences between the mesh agent's security state view and the current up-to-date security state view.

Figure 11:
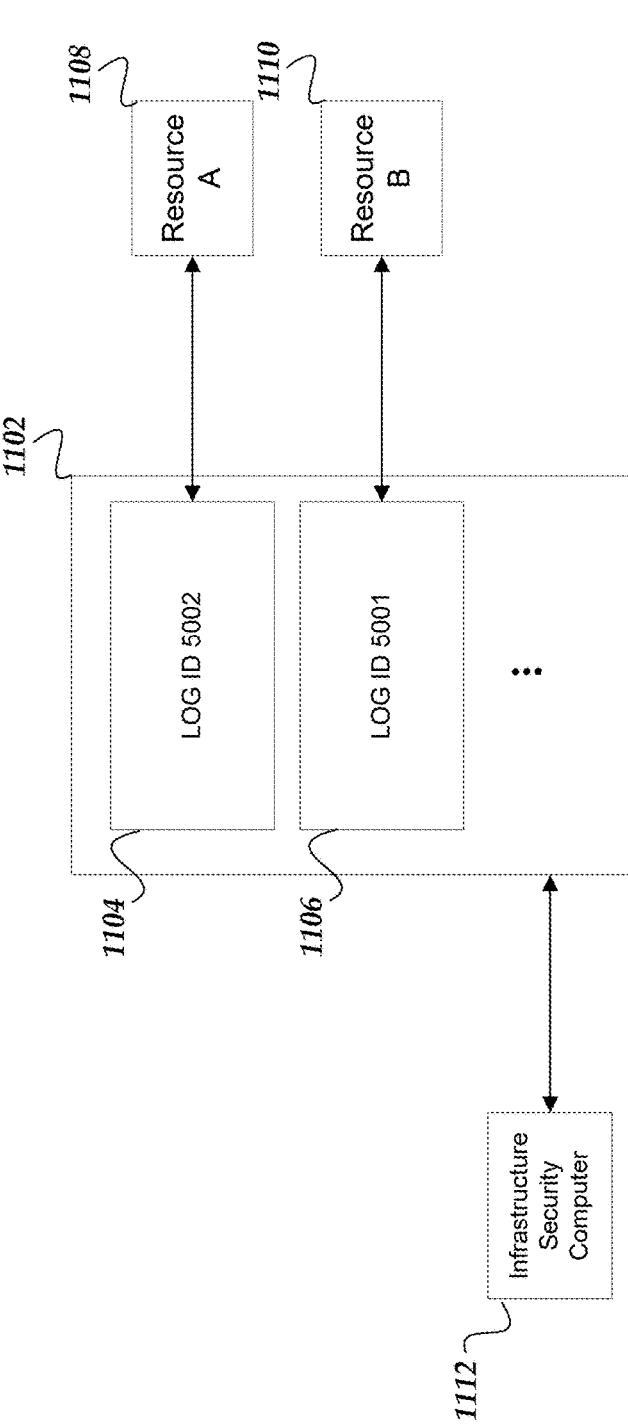
FIG. 11 illustrates a logical schematic of a system for distributing security policies in managed networks in accordance with one or more of the various embodiments.

FIG. 11 illustrates a logical schematic of system 1100 for distributing security policies in managed networks in accordance with one or more of the various embodiments.

In some embodiments, system 1100 may include mesh agent 1102 that may be arranged to maintain local security state views to enable efficient policy enforcement for protected resources. In some embodiments, mesh agent 1102 may be arranged to obtain security state views from infrastructure security computer 1112 to avoid latency associated with communicating authorization requests to the infrastructure security computer for each policy decision.

In some embodiments, mesh agent 1102 may include security state view 1104 that may be associated with log ID 5002 or security state view 1106 that may be associated with log ID 5001, or the like. Accordingly, in some embodiments, mesh agent 1102 may maintain multiple security state views concurrently to support ongoing sessions with different resources based on the security state view that was current if each session was initiated.

In some embodiments, mesh agent 1102 may be arranged to provide secure access to one or more protected resources in the managed network. Accordingly, in some embodiments, resource 1108 may be associated with security state view 1104 because the session for resource 1108 may have been initialized after security state view 1104 became available from infrastructure security computer 1112. In some embodiments, resource 1110 may be associated with security state view 1106 because the session for resource 1110 may have been initialized before security state view 1104 was obtained from infrastructure security computer 1112.

In some embodiments, infrastructure security computer 1112 may be arranged to provide updated security state views to mesh agent 1102 based on changes to entity information or security policies in the managed network. Accordingly, in some embodiments, mesh agent 1102 may be arranged to receive incremental updates or deltas from infrastructure security computer 1112 to maintain current security state views without requiring complete synchronization operations.

In some embodiments, mesh agent 1102 may be arranged to maintain multiple security state views simultaneously to ensure consistent policy enforcement throughout the duration of active sessions. Thus, in some embodiments, mesh agent 1102 may retain both security state view 1104 or security state view 1106 as long as there may be active sessions that depend on those particular security state views, enabling local authorization decisions without introducing network latency or requiring communication with infrastructure security computer 1112 for each policy enforcement action.

FIG. 12 illustrates a logical schematic of system 1200 for updating mesh agent security state views with incremental policy changes in accordance with one or more of the various embodiments.

In some embodiments, system 1200 may include infrastructure security computer 1206 that may be arranged to maintain current security state views for distribution to mesh agents in managed networks. In some embodiments, infrastructure security computer 1206 may include security state view 1208 that may be associated with log ID 5002, security state view 1210 that may be associated with log ID 5001, or the like.

In some embodiments, mesh agent 1202A may represent a mesh agent that includes a local security state view 1204 that may be associated with log ID 5001. Accordingly, in some embodiments, security state view 1204 may represent a prior version of the security state that was obtained from infrastructure security computer 1206 during a previous synchronization operation.

In some embodiments, infrastructure security computer 1206 may be arranged to determine incremental changes between security state view 1204 on mesh agent 1202A or the current security state view 1208 based on the difference in log IDs. Accordingly, in some embodiments, infrastructure security computer 1206 may identify policies that have been modified, added, or removed between log ID 5001 or log ID 5002.

In some embodiments, policies 1212 may represent the incremental policy changes that need to be communicated to mesh agent 1202A to update its security state view. In this example, for some embodiments, policies marked with asterisks, such as Policy B, Policy C, or the like, may be considered policies that have been modified since log ID 5001. Accordingly, in some embodiments, infrastructure security computer 1206 may be arranged to provide only the changed policies rather than transmitting the entire security state view 1208.

In some embodiments, mesh agent 1202B may represent the updated state of the mesh agent after receiving or applying the incremental policy changes from infrastructure security computer 1206. Accordingly, in some embodiments, security state view 1214 may represent the updated local security state view that includes the policy changes from policies 1212, resulting in a security state view associated with log ID 5002.

In some embodiments, this incremental update approach may enable efficient synchronization between infrastructure security computers or mesh agents by minimizing network traffic or reducing the computational overhead associated with security state view updates. Thus, in some embodiments, mesh agents may maintain current security state views without requiring complete retransmission of entire security state data structures for each update operation.

In some embodiments, the log ID values associated with security state views enable infrastructure security computers to determine which incremental changes are required for particular mesh agents based on the difference between the mesh agent's current log ID or the latest log ID maintained by the infrastructure security computer. Thus, in some embodiments, this approach ensures consistent policy enforcement across distributed mesh agents while optimizing synchronization efficiency in managed network environments.

Note, Policy items, such as Policy A, or the like, represent data structures the store values or instructions that implement a policy for a particular policy description language or scheme. The particular details of policy data structures, or the like may vary depending the approach selected for policy implementation. In some embodiments, adapters (e.g., See, FIG. 8) may include instructions of rules for compiling entity information, policy descriptions, or the like, into policy data structures that conform to one or more policy description or policy enforcement regimes.

In some embodiments, infrastructure security engines may be configured to employ various policy enforcement regimes, policy description languages, or the like. In some cases, different policy description languages may be supported with specialized policy evaluation engines that determine if a particular authorization request may be permitted or denied. Typically, standards based, or industry supported policy description languages include a reference implementation of a corresponding evaluation engine that may be used to develop local evaluation engines. In some cases, depending on the policy description language, there may be a production quality software library that may be readily embedded into infrastructure security engines, mesh agents, or the like. Further, in some embodiments, policy description languages or their corresponding evaluation engines may be customized to account for local circumstances or local requirements. For example, open source or standards based policy description languages (or systems) may include Cedar, XACML (extensible Access Control Markup Language), Pundit/Casbin, Open Policy Agent, or the like. One of ordinary skill in the art will appreciate that the innovations disclosed herein are not limited to a single policy description language or scheme. Accordingly, in some embodiments, infrastructure security engines, mesh agents, or the like may be arranged to be readily adaptable to using different policy description languages depending on local requirements or local circumstances. In some embodiments, infrastructure security engines or mesh agents may be arranged to use particular libraries, instructions, rules, or the like for working with one or more policy description languages or schemes as provided or determined based on configuration information. Accordingly, for brevity and clarity further details of any particular policy description language or its associated data structures are omitted.

Figure 13:
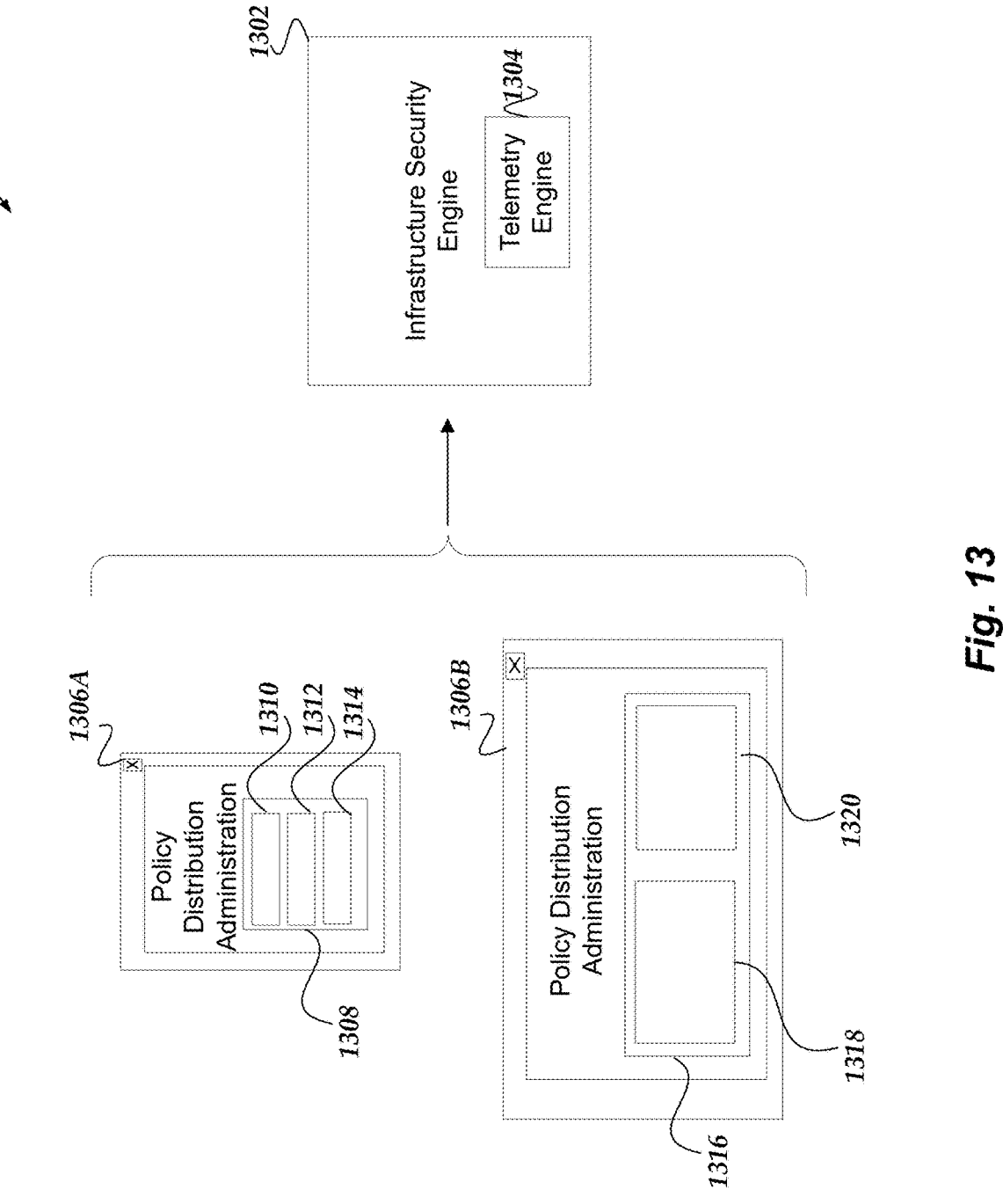
FIG. 13 illustrates a logical schematic of a system for collecting and applying telemetry information and telemetry metrics for policy distribution management in accordance with one or more of the various embodiments.

FIG. 13 illustrates a logical schematic of system 1300 for collecting and applying telemetry information and telemetry metrics for policy distribution management in accordance with one or more of the various embodiments. System 1300 may comprise various constituents, including: infrastructure security engine 1302; telemetry engine 1304; one or more client user interfaces, such as user interface 1306A or user interface 1306B; or the like.

In some embodiments, infrastructure security engines, such as infrastructure security engine 1302 may be arranged to perform actions to support the operation, organization, or management of security policy distribution in managed networks.

In some embodiments, systems, such as system 1300 may include one or more telemetry engines, such as telemetry engine 1304. In some embodiments, telemetry engines may be arranged to monitor or evaluate interactions with applications or user interfaces such as user interface 1306A, user interface 1306B, or the like. In some embodiments, this may include monitoring how users or other applications may interact with user interfaces, interactive reports, various applications, or one or more system features. In some embodiments, user interface 1306A may represent the presentation or display of a user interface in a first adapted arrangement while user interface 1306B may represent the present of display of the same user interface having a second adapted arrangement. In some embodiments, user interface 1306A may be the user interface displayed in portrait mode while the user interface 1306B may be considered to be the user interface in landscape mode after a hardware display has been rotated.

In some embodiments, user interfaces, such as user interface 1306A or user interface 1306B may include various windows, controls, or other user interface features. In some embodiments, user interfaces may include various user interface panels, such as panel 1308, panel 1316, or the like. In some embodiments, panel 1308, or the like may represent a user interface that enables users, such as security administrators, to review policy distribution information or perform policy distribution administration displayed in a portrait (vertical) orientation while user interface 1306B may represent policy distribution information displayed in a landscape (horizontal) orientation. In some embodiments, element 1310, element 1312, element 1314, element 1318, element 1320, or the like may be considered to represent various user interface elements, controls, buttons, list items, report features, user interface components, displayed content, formatted content, or the like that may be included in user interfaces.

In some embodiments, user interface 1306A or 1306B may be considered a user interface that enables administrative users to work with security policies, mesh agent configurations, or the like. In some embodiments, panel 1308 may be used to select, generate, or modify security policies, entity datastores, change logs, distribution parameters, or the like. In some embodiments, display panel 1308 may be used to display quality or effectiveness rankings for one or more security policies sorted based on inferred importance, value, or the like. In some embodiments, panels such as panel 1308 may be used to display entity information, security state views, candidate policy items, display reports regarding policy distribution records and their relevance to mesh agent synchronization or security policy enforcement, or the like.

In some embodiments, infrastructure security engines, such as infrastructure security engine 1302 (as well as entity engines, telemetry engines, mesh agents, or the like) may be arranged to generate or display user interfaces, such as user interface 1306A or user interface 1306B to users using one or more of video interface 242, projector 246, display 250, or the like, of a client computer, such as client computer 200. In some embodiments, infrastructure security engine 1302, entity engines, or mesh agents may be arranged to generate or display user interface 1306A, user interface 1306B, or the like to users using a one or more of input/output interface 338, display 350, audio interface 356, or the like, of a network computer, such as network computer 300.

In some embodiments, infrastructure security engines, such as infrastructure security engine 1302 (as well as entity engines, telemetry engines, mesh agents, or the like) may be arranged to collect various telemetry or other metrics associated with user interactions with user interfaces. In some embodiments, telemetry may include tracking or monitoring if users may be in agreement with policy items, security policy configurations, report arrangement/organization, or the like. In some embodiments, infrastructure security engines, or the like may be enabled to employ telemetry information or telemetry metrics collected or determined by telemetry engines, such as telemetry engine 1304. In some embodiments, telemetry engines may be separate from entity engines, infrastructure security engines, mesh agents, or the like as shown in FIG. 13. In some embodiments, telemetry engines may be part of or otherwise embedded in entity engines, infrastructure security engines, mesh agents, or the like.

In one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, entity engines, infrastructure security engines, mesh agents, or the like may be arranged to monitor telemetry information associated with one or more users.

Accordingly, in some embodiments, entity engines, infrastructure security engines, mesh agents, or the like may be arranged to provide one or more user interface facilities to collect direct feedback from one or more of the users that may interact with information displayed in the one or more user interfaces. In some embodiments, user interfaces may include controls that enable authorized users to grade one or more policy reports, candidate policy sets, security policy profiles, policy distribution schedules, or the like.

In some embodiments, grades or scores may be binary (e.g., like/dislike), discrete (e.g., one-four stars, letter grades), continuous values, or the like.

In one or more of the various embodiments, entity engines, infrastructure security engines, mesh agents, or the like may be arranged to provide user interfaces that monitor how users interact with security policy distribution results, distribution configuration recommendations, or the like. In some embodiments, telemetry information employed to monitor user preferences may be based on monitoring user interactions as well as direct feedback. Accordingly, in some embodiments, security policy distribution recommendations, or the like, that may appear valid or reasonable but are ignored or discarded by users may be inferred to be poorly received. In some embodiments, if the top ranked results provided in response to user actions, user queries, distribution results, or the like, are ignored or lower ranked results are favored by users, it may be inferred that there may be a problem with the data or the display of the data.

In some embodiments, infrastructure security engines, or the like may be arranged to receive telemetry information from other services or applications. Accordingly, in one or more of the various embodiments, infrastructure security engines, or the like may not be required to directly monitor activity associated with the security policies, security policy distribution, policy reports, or the like. In some embodiments, user interfaces, such as user interface 1306A or user interface 1306B may be displayed to users via desktop computer applications, mobile applications, web-based applications, or the like. In some embodiments, such applications may collect the telemetry information and provide some or all it to entity engines, infrastructure security engines, mesh agents, or the like rather than requiring the entity engines, infrastructure security engines, mesh agents, or the like to include monitoring facilities on user-facing applications.

Accordingly, in some embodiments, infrastructure security engine 1302, or the like may be arranged to collect metrics or telemetry associated with user interactions with user interface 1306A or user interface 1306B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. In some embodiments, infrastructure security engine 1302, or the like may be arranged to collect metrics or telemetry associated with user interactions with user interface 1306A, or user interface 1306B using a one or more of input/output interface 338, GPS 340, keyboard 352, audio interface 356, pointing device interface 358, or the like, of a network computer, such as network computer 300.

In some embodiments, infrastructure security engines, or the like may be arranged to track mouse movement, eye movement, keystrokes, or the like, to determine how users may interact with information (e.g., policy distribution results, policy distribution configurations, entity information management, change logs, change buckets, y items, policy items, recommended, or the like) displayed in user interfaces. Accordingly, in some embodiments, infrastructure security engines, or the like may be arranged to evaluate at least the quality of various policy distribution recommendations, policy selection, distribution report characteristics, or the like based on how users interact with them via the user interfaces. In some embodiments, if users consistently select or otherwise favor interacting with displayed items, distribution results, or policy distribution recommendations ranked or listed lower than others, it may indicate that one or more system performing the ranking or distribution reporting may be experiencing diminished or diminishing effectiveness. In some embodiments, users may reject or ignore report results, policy distribution conclusions, or the like which may indicate that one or more associated systems may be experiencing diminished or diminishing effectiveness.

In some embodiments, infrastructure security engines, or the like may be arranged to associate a performance score with user interfaces used in the system based on the user interaction metrics or telemetry. Accordingly, in some embodiments, if the performance score associated with a user interface or user interface element falls below a defined threshold value, infrastructure security engines, or the like may be arranged to suspend those user interfaces (or portions thereof) from operation. In some embodiments, infrastructure security engines, or the like may be arranged to automatically modify the deficient user interfaces.

In some embodiments, telemetry engines may be arranged to collect or determine telemetry information that includes user telemetry, user feedback, or telemetry metrics that may be used to dynamically transform user interfaces, display panels, and the like. In some embodiments, the dynamic transformation may include arrangement, re-arrangement, elimination, addition, or adaptation of content and visual elements in user interfaces and display panels based on at least the collected telemetry information.

In some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, entity engines, infrastructure security engines, mesh agents, or the like may dynamically change the visual appearance of the user interfaces to improve the efficiency and effectiveness of the system or its user interfaces for the user.

In some embodiments, entity engines, infrastructure security engines, or mesh agents may be arranged to dynamically select, position, size, shape, remove, hide, inactivate, disable, highlight, or style one or more visual user interface components such as display panels, controls, elements or content based on one or more of user telemetry metrics and user feedback. In some embodiments, if user interactions with the user interface are tracked focusing on or navigating to particular user interface views, components or user interface panels, system components, such as entity engines, infrastructure security engines, or mesh agents may be arranged to dynamically highlight or size the preferred user interface elements and/or display panels. In some embodiments, if users are determined to rarely interact with a user interface element, such as element 1314, infrastructure security engines, or the like may be arranged to dynamically reduce the size, diminish the shape, disable its controls, or re-position element 1314 by displaying a smaller sized greyed out version of element 1314 in its display panel.

In some embodiments, infrastructure security engines, or the like may be arranged to adapt user interfaces based on the size/type of display, input methods, user status, or the like. In some embodiments, if a user is determined to be operating using a mobile device, one or more user interface elements may be dynamically positioned differently. In some cases, depending on the display type or display size, one or more user interface elements may be hidden from view. In some embodiments, an infrastructure security engine may be arranged to dynamically modify or re-arrange user interface 1306A to obtain user interface 1306B based on telemetry associated with the display or associated user interactions. Accordingly, in this example, display panel 1316 may be considered to be dynamically modified or rearranged to accommodate the modified physical orientation of the display. In this example, user interface 1306B now may be considered to display two elements (element 1318 and element 1320) rather than three elements as were displayed in user interface 1306A. Thus, in this example, infrastructure security engine 1302 may display two elements for the landscape (horizontal) orientation instead of the three elements displayed in the portrait (vertical) orientation based on one or more telemetry metrics.

Thus, in some embodiments, infrastructure security engines, or the like may be arranged to tangibly modify user interfaces, display panels, interactive reports, input collection, input selection, input data represent, policy items, security policies, policy profiles, or the like, based on the efficient and effective performance of processes and/or activities associated with various types input information, security policies, policy distribution results, or the like as determined by telemetry information, or the like.

Generalized Operations

FIGS. 14-19 represent generalized operations for distributing security policies in accordance with one or more of the various embodiments. In one or more of the various embodiments, processes 1400, 1500, 1600, 1700, 1800, and 1900 described in conjunction with FIGS. 14-19 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 14-19 may be used for distributing security policies in accordance with at least one of the various embodiments or architectures such as those described in conjunction with FIGS. 4-13 Further, in one or more of the various embodiments, some or all of the actions performed by processes 1400, 1500, 1600, 1700, 1800, and 1900 may be executed in part by infrastructure security engine 322, one or more mesh agents, such as, mesh agent 324, entity engine 326, or the like, running on one or more processors of one or more network computers.

Figure 14:
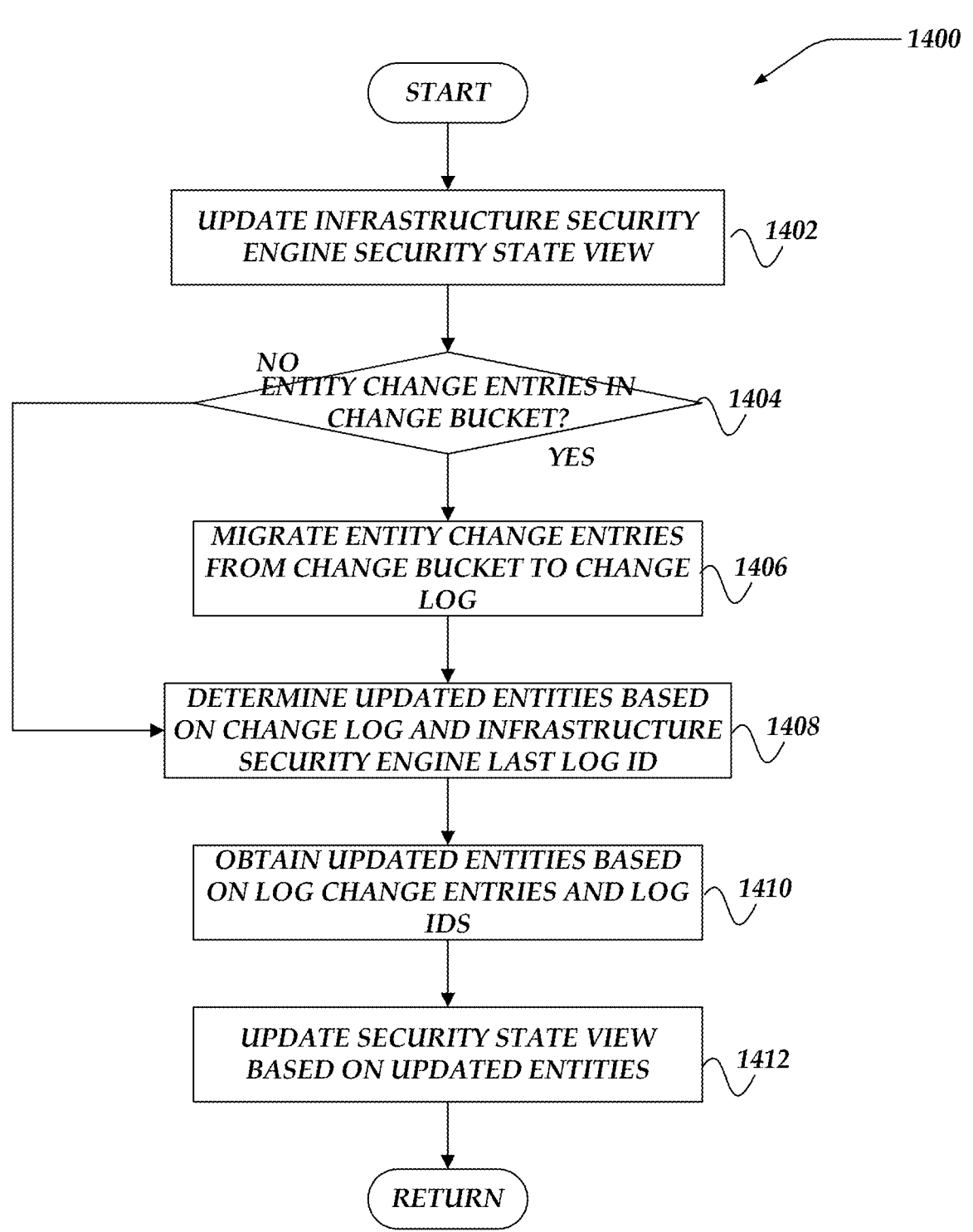
FIG. 14 illustrates an overview flowchart of a process for distributing security policies in accordance with one or more of the various embodiments.

FIG. 14 illustrates an overview flowchart of process 1400 for distributing security policies in accordance with one or more of the various embodiments. After a start block, at block 1402, in one or more of the various embodiments, infrastructure security engines may be arranged to update one or more security state views. In some embodiments, infrastructure security engines may be arranged to initiate periodic or event-driven updates to their security state views to maintain consistency with current entity information or policy changes in managed networks. In some embodiments, security state views may represent the current authorization state that includes active security policies as applied to entities in the managed environment, such as, users, resources, endpoints, applications, or the like. Accordingly, in some embodiments, infrastructure security engines may be arranged to determine if their current security state view requires updating based on changes to underlying entity information that may impact security policy enforcement. In some embodiments, infrastructure security engines may be arranged to compare their current log identifier with the latest log identifier available in change logs to determine if updates may be required.

At decision block 1404, in one or more of the various embodiments, if there may be entity change entries in a change bucket associated with the infrastructure security engines, control may flow to block 1406; otherwise, control may flow to block 1408. In some embodiments, infrastructure security engines may be arranged to examine change buckets to determine if entity modifications have occurred that may require migration to change logs before updating security state views. In some embodiments, change buckets may contain entity change entries that represent pending entity modifications, additions, or removals that may not have been processed into the change log. Accordingly, in some embodiments, if entity change entries are present in the change bucket, infrastructure security engines may need to perform migration operations to ensure consistent log identifier sequencing before proceeding with security state view updates. In some embodiments, if the change bucket does not include entity change entries, infrastructure security engines may determine which entities require updating based on existing log change entries.

At block 1406, in one or more of the various embodiments, infrastructure security engines or entity engines may be arranged to migrate the one or more entity change entries to an associated change log. In some embodiments, migration operations may involve moving entity change entries from change buckets to change logs using repeatable read isolation level database transactions to ensure consistency. In some embodiments, infrastructure security engines may be arranged to generate a new monotonically increasing log identifier that will be associated with all entity change entries migrated during the same transaction operation. Accordingly, in some embodiments, each entity change entry may be transformed into a log change entry that includes the entity identifier of the affected entity associated with the newly assigned log identifier. In some embodiments, more than one infrastructure security engines may race to perform migration operations, such that the first infrastructure security engine to acquire the transaction lock may complete the migration while subsequent engines wait for the operation to finish. Thus, in some embodiments, migration operations ensure that entity changes are captured in an ordered, consistent manner that enables infrastructure security engines to determine incremental updates to their security state views.

At block 1408, in one or more of the various embodiments, infrastructure security engines may be arranged to obtain one or more updated entities based on the change log and the last log identifier associated with the infrastructure security engine. In some embodiments, infrastructure security engines may be arranged to compare their current log identifier with the latest log identifier in the change log to determine which entities have been modified since their last security state view update. In some embodiments, infrastructure security engines may be arranged to query log change entries for log identifiers that may be greater than their current log identifier to identify affected entities based on the entity identifiers included in the log change entries. Accordingly, in some embodiments, if an entity identifier appears in multiple log change entries with different log identifiers, the infrastructure security engine may process that entity identifier once to obtain the current state rather than processing each individual change. In some embodiments, infrastructure security engines may be arranged to collect unique entity identifiers from the relevant log change entries to minimize redundant entity retrieval operations from entity datastores.

At block 1410, in one or more of the various embodiments, infrastructure security engines may be arranged to obtain one or more updated entities based on log change entries associated with the log IDs. In some embodiments, infrastructure security engines may be arranged to retrieve current entity information from entity datastores based on the entity identifiers determined from log change entries. In some embodiments, infrastructure security engines may be arranged to employ one or more adapters that provide one or more specialized interfaces for collecting entity information from one or more various entity information sources, such as configuration databases, identity providers, or credential services. Accordingly, in some embodiments, the one or more adapters may be configured to format or transform entity information into one or more data structures suitable for security state view updates or policy evaluation. In some embodiments, infrastructure security engines may be arranged to handle circumstances where one or more entities may have been deleted by detecting missing entities during retrieval operations from entity datastores. Thus, in some embodiments, the retrieval process ensures that infrastructure security engines obtain the most current entity information required for accurate security state view updates.

Figure 15:
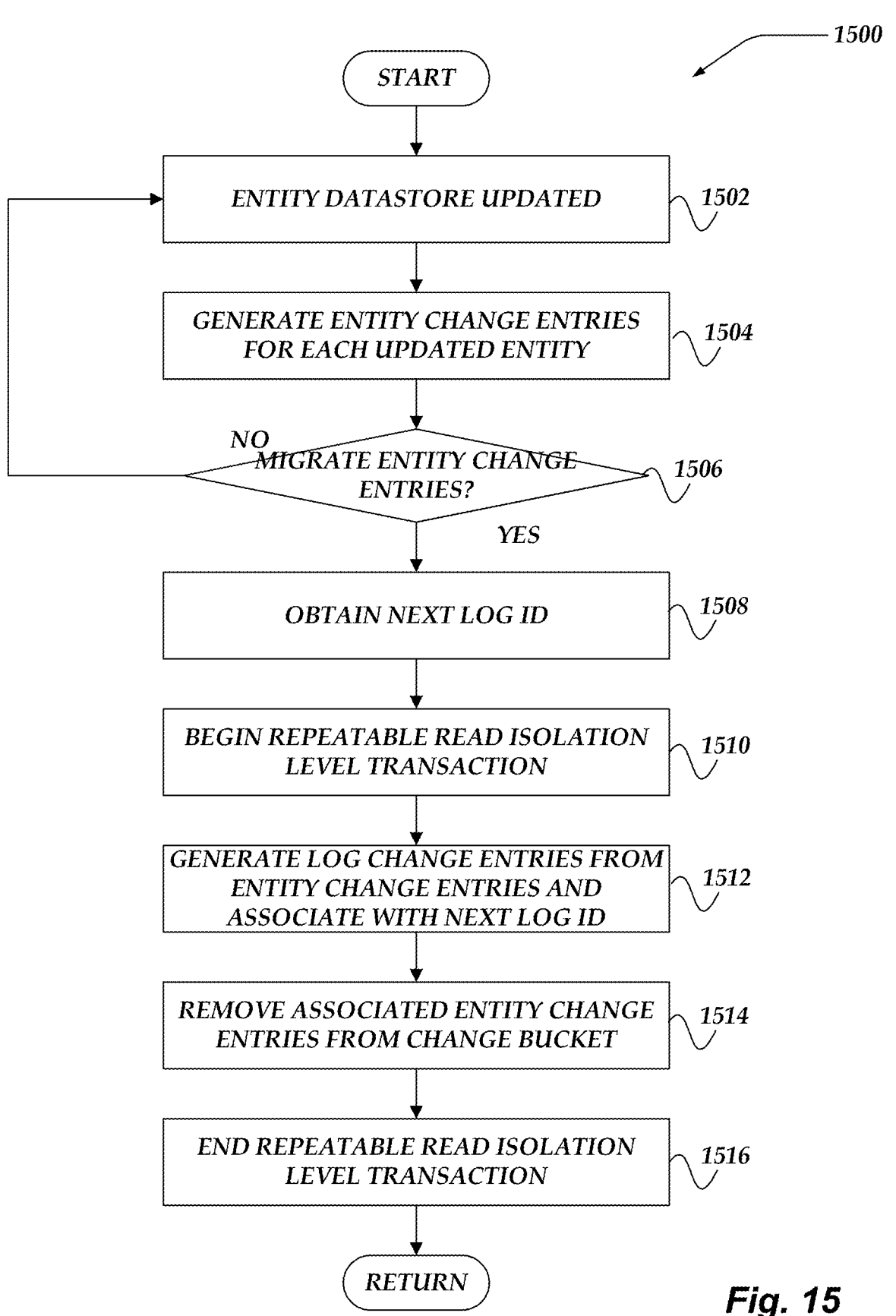
FIG. 15 illustrates a flowchart of a process for distributing security policies in accordance with one or more of the various embodiments.

At block 1412, in one or more of the various embodiments, infrastructure security engines may be arranged to update their one or more security state views based on the one or more updated entities. In some embodiments, infrastructure security engines may be arranged to incorporate updated entity information into their local security state views by adding one or more new entities, modifying existing entities, or removing deleted entities as indicated by the retrieved entity information. In some embodiments, security state view updates may involve recompiling one or more security policies that reference the affected entities to ensure that policy enforcement reflects current entity attributes or relationships. Accordingly, in some embodiments, infrastructure security engines may be arranged to update their associated log identifiers to reflect the latest log identifier from the change log, indicating that their most current security state view has been synchronized to that point in the entity change history. In some embodiments, infrastructure security engines may be arranged to maintain one or more versions of security state views concurrently to support ongoing sessions that may depend on prior security state versions. In some embodiments, infrastructure security engines may be arranged to distribute updated security state views to one or more associated mesh agents to ensure consistent policy enforcement across the distributed managed network environment. Next, in one or more of the various embodiments, control may be returned to a calling process FIG. 15 illustrates a flowchart of process 1500 for distributing security policies in accordance with one or more of the various embodiments. After a start block, at block 1502, in one or more of the various embodiments, an entity datastore may be updated with entity information. In some embodiments, entity engines may be arranged to receive entity information updates from one or more entity information sources that may include configuration databases, LDAP services, identity providers, cloud-based administration services, System for Cross-domain Identity Management (SCIM) endpoints, credential services, or the like. In some embodiments, entity information may include modifications to existing entities, additions of one or more new entities, removal of one or more existing entities, changes to entity attributes that may impact security policy enforcement, or the like. Accordingly, in some embodiments, entity engines may be arranged to employ one or more specialized interfaces, APIs, message queues, or the like, to collect entity information updates from various entity information sources in real-time or batch processing modes. In some embodiments, entity engines may be arranged to validate or transform entity information to ensure consistency with entity datastore schema requirements before storing the updated entity information in the entity datastore.

At block 1504, in one or more of the various embodiments, entity engines may be arranged to generate entity change entries for each updated entity. In some embodiments, entity change entries may be data structures that include entity identifiers corresponding to entities that have been modified, added, or removed from the entity datastore during entity information update operations. In some embodiments, entity engines may be arranged to create one entity change entry for each affected entity rather than tracking individual attribute modifications within entities to simplify change tracking operations. Accordingly, in some embodiments, entity change entries may be stored in one or more change buckets that serve as temporary storage for pending entity modifications before they are migrated to change logs for distribution to one or more infrastructure security computers. In some embodiments, change buckets may be arranged to accumulate entity change entries from multiple entity update operations to enable efficient batch processing during subsequent migration operations to change logs.

At decision block 1506, in one or more of the various embodiments, if a migration event may be initiated, control may flow to block 1508; otherwise, control may loop back to block 1502. In some embodiments, migration events may be triggered by one or more infrastructure security engines that need to update their security state views or by periodic scheduling mechanisms that ensure regular synchronization of entity changes. In some embodiments, infrastructure security engines may be arranged to initiate migration events if they determine that their current security state views require updating based on pending entity change entries in change buckets. Accordingly, in some embodiments, migration events may be triggered by time-based schedules, threshold-based conditions such as change bucket size limits, explicit administrative commands, or infrastructure security engine requests for current entity information. In some embodiments, if no migration event is initiated, the process may continue monitoring for additional entity information updates or entity change entry generation activities.

At block 1508, in one or more of the various embodiments, infrastructure security engines or entity engines may be arranged to obtain a next log ID. In some embodiments, log identifiers may be monotonically increasing values that provide ordering for log change entries to enable consistent sequencing of entity modifications across one or more distributed infrastructure security computers. In some embodiments, infrastructure security engines or entity engines may be arranged to generate the next log identifier by incrementing the highest existing log identifier in the change log or by employing distributed identifier generation mechanisms to ensure uniqueness across multiple infrastructure security computers. Accordingly, in some embodiments, the next log identifier may be reserved or locked during migration operations to prevent concurrent migration processes from obtaining the same log identifier value. Thus, in some embodiments, log identifiers enable infrastructure security engines to determine incremental changes between different versions of security state views based on log identifier ranges.

At block 1510, in one or more of the various embodiments, infrastructure security engine or entity engines may be arranged to begin a repeatable read isolation level transaction. In some embodiments, repeatable read isolation level transactions may provide consistency guarantees that enable migration operations to complete without interference from concurrent entity change entry additions or other entity modification activities. In some embodiments, infrastructure security engines may be arranged to employ database transaction mechanisms that ensure entity change entries in change buckets remain stable during migration operations to prevent partial or inconsistent migrations. Accordingly, in some embodiments, repeatable read isolation level transactions may enable infrastructure security engines to read the same set of entity change entries throughout the transaction duration even if additional entity modifications occur during the migration process. In some embodiments, transaction isolation may prevent race conditions between multiple infrastructure security engines that may attempt to perform migration operations simultaneously.

At block 1512, in one or more of the various embodiments, infrastructure security engines or entity engines may be arranged to generate one or more log change entries from the one or more entity change entries such that each log change entry may be associated with the next log ID. In some embodiments, log change entries may be data structures that include entity identifiers from corresponding entity change entries along with the log identifier assigned during the current migration operation. In some embodiments, infrastructure security engines may be arranged to transform each entity change entry from the change bucket into a log change entry by copying the entity identifier or associating it with the current transaction's log identifier. Accordingly, in some embodiments, multiple log change entries may share the same log identifier if they are generated during the same migration transaction, enabling infrastructure security engines to identify groups of related entity changes that occurred simultaneously. In some embodiments, log change entries may be stored in change logs using database operations that ensure atomicity or consistency with the overall migration transaction.

At block 1514, in one or more of the various embodiments, infrastructure security engines or entity engines may be arranged to remove the one or more associated entity change entries from the change bucket. In some embodiments, entity change entry removal from change buckets may be performed as part of the same transaction that generates log change entries to ensure that entity change entries are not lost or duplicated during migration operations. In some embodiments, infrastructure security engines may be arranged to delete entity change entries from change buckets only after successfully creating corresponding log change entries to maintain data integrity throughout the migration process. Accordingly, in some embodiments, entity change entry removal operations may be coordinated with log change entry creation to ensure that each entity modification is represented exactly once in the change log regardless of migration timing or concurrent operations. Thus, in some embodiments, successful entity change entry removal indicates that entity modifications have been successfully captured in the change log for distribution to infrastructure security computers.

At block 1516, in one or more of the various embodiments, infrastructure security engines or entity engines may be arranged to end the repeatable read isolation level transaction. In some embodiments, transaction completion may commit all migration operations performed during the transaction, including log change entry creation or entity change entry removal from change buckets, to ensure atomicity of the migration process. In some embodiments, infrastructure security engines may be arranged to handle transaction rollback scenarios if migration operations encounter errors, ensuring that change buckets retain entity change entries for subsequent migration attempts. Accordingly, in some embodiments, successful transaction completion may make log change entries available for infrastructure security engines to use for updating their security state views or distributing incremental changes to one or more mesh agents. In some embodiments, transaction completion may release locks or reservations on log identifiers, enabling subsequent migration operations to proceed with new log identifier assignments for future entity modifications.

Figure 16:
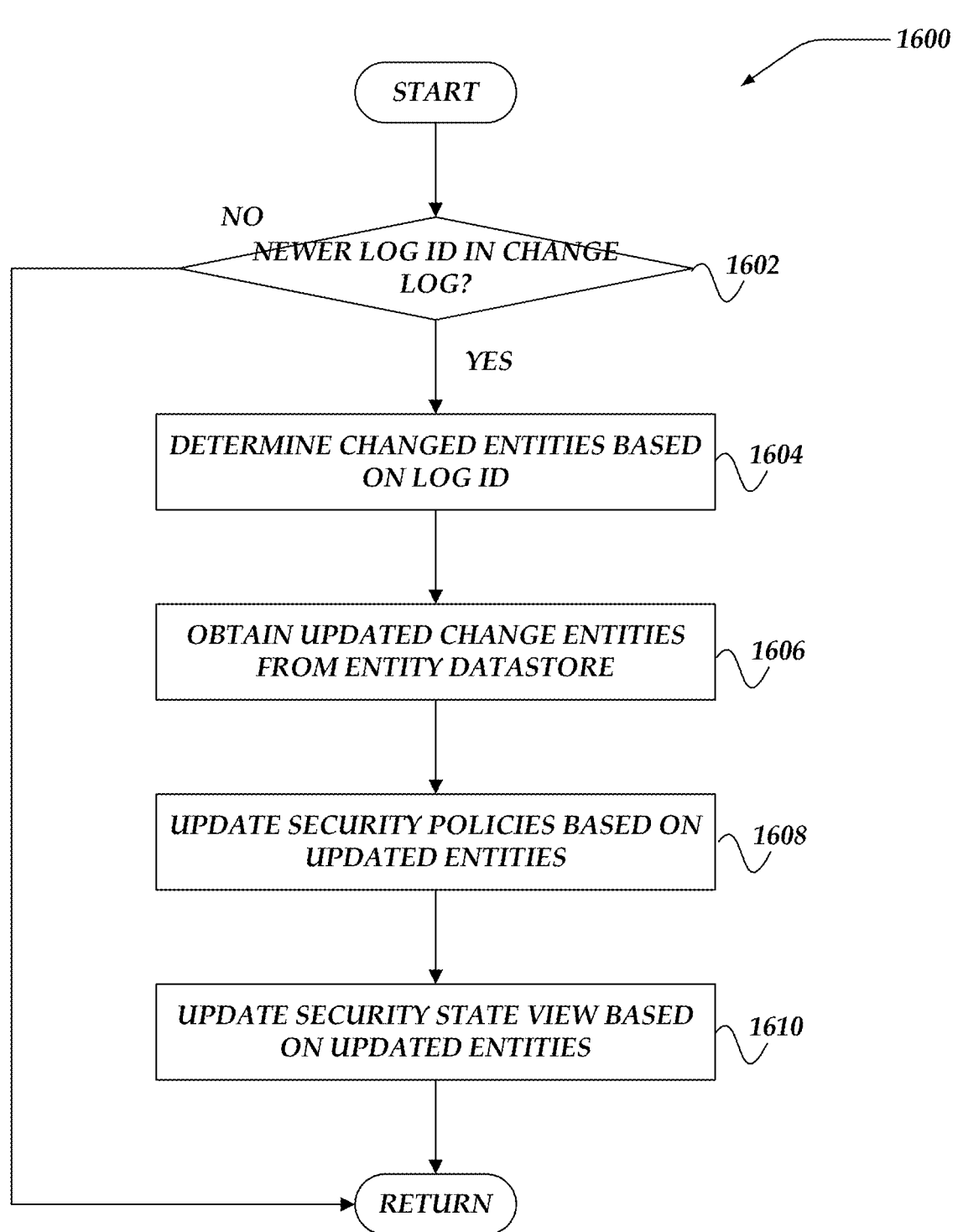
FIG. 16 illustrates a flowchart of a process for distributing security policies in accordance with one or more of the various embodiments.

Next, in one or more of the various embodiments, control may be returned to a calling process FIG. 16 illustrates a flowchart of process 1600 for distributing security policies in accordance with one or more of the various embodiments. After a start block, at decision block 1602, in one or more of the various embodiments, if there may be a newer log ID in the change log, control may flow to block 1604; otherwise, control may loop back to decision block 1602.

In some embodiments, infrastructure security engines may be arranged to periodically monitor change logs to determine if newer log identifiers are available that indicate pending entity modifications that may be available for security state view updates. In some embodiments, infrastructure security engines may be arranged to compare their current log identifier with the latest log identifier in the change log to detect if entity changes have occurred since their last security state view update. Accordingly, in some embodiments, infrastructure security engines may be arranged to employ polling mechanisms, event notifications, scheduled checks to monitor for newer log identifiers in change logs, or the like. In some embodiments, if no newer log identifiers are detected, infrastructure security engines may continue monitoring activities until entity modifications occur that generate updated log change entries with incremented log identifier values.

At block 1604, in one or more of the various embodiments, infrastructure security engines may be arranged to determine one or more updated entities based on the log change entries and their associated log ID. In some embodiments, infrastructure security engines may be arranged to query log change entries for log identifiers that are greater than their current log identifier to identify entity identifiers that may be associated with entities that may have been modified since their last security state view update. In some embodiments, infrastructure security engines may be arranged to collect entity identifiers from log change entries to avoid processing duplicate entity modifications that may appear in multiple log change entries across different log identifier values. Accordingly, in some embodiments, infrastructure security engines may be arranged to optimize entity retrieval operations by consolidating entity identifiers from multiple log change entries to minimize redundant database access operations. In some embodiments, infrastructure security engines may be arranged to handle circumstances where entities may have been deleted by detecting missing entities during subsequent retrieval operations from entity datastores.

At block 1606, in one or more of the various embodiments, infrastructure security engines may be arranged to obtain the one or more updated entities from the entity datastore. In some embodiments, infrastructure security engines may be arranged to retrieve current entity information from entity datastores using the entity identifiers determined from log change entries to ensure that security state views reflect the most recent entity attributes or relationships. In some embodiments, infrastructure security engines may be arranged to employ one or more adapters that provide specialized interfaces for accessing entity information from various entity information sources, such as configuration databases, identity providers, credential services, or the like. Accordingly, in some embodiments, adapters may be arranged to transform entity information into data structures suitable for security state view updates or policy evaluation operations. In some embodiments, infrastructure security engines may be arranged to handle entity retrieval failures or missing entities by logging error conditions or removing deleted entities from their security state views during update operations.

At block 1608, in one or more of the various embodiments, infrastructure security engines may be arranged to update one or more security policies based on the updated entities. In some embodiments, infrastructure security engines may be arranged to recompile security policies that reference updated entities to ensure that policy enforcement reflects current entity attributes, relationships, or access permissions. In some embodiments, infrastructure security engines may be arranged to identify security policies that depend on modified entities by analyzing policy dependencies or entity references within policy data structures. Accordingly, in some embodiments, infrastructure security engines may be arranged to employ policy compilation engines that transform entity information or policy rules into executable policy enforcement instructions suitable for mesh agent distribution. Thus, in some embodiments, policy updates ensure that authorization decisions reflect current entity states rather than stale or outdated entity information that may compromise security enforcement accuracy.

At block 1610, in one or more of the various embodiments, infrastructure security engines may be arranged to update their security state views based on the updated entities. In some embodiments, infrastructure security engines may be arranged to incorporate updated entity information into their local security state views by adding new entities, modifying existing entity attributes, or removing deleted entities as indicated by the retrieved entity information. In some embodiments, infrastructure security engines may be arranged to update their associated log identifiers to reflect the latest log identifier from the change log, indicating that their security state views have been synchronized to that point in the entity change history. Accordingly, in some embodiments, infrastructure security engines may be arranged to maintain multiple versions of security state views concurrently to support ongoing sessions that may depend on prior security state versions for consistent policy enforcement. In some embodiments, infrastructure security engines may be arranged to prepare updated security state view information for distribution to one or more associated mesh agents to ensure consistent policy enforcement across the distributed managed network environment.

Figure 17:
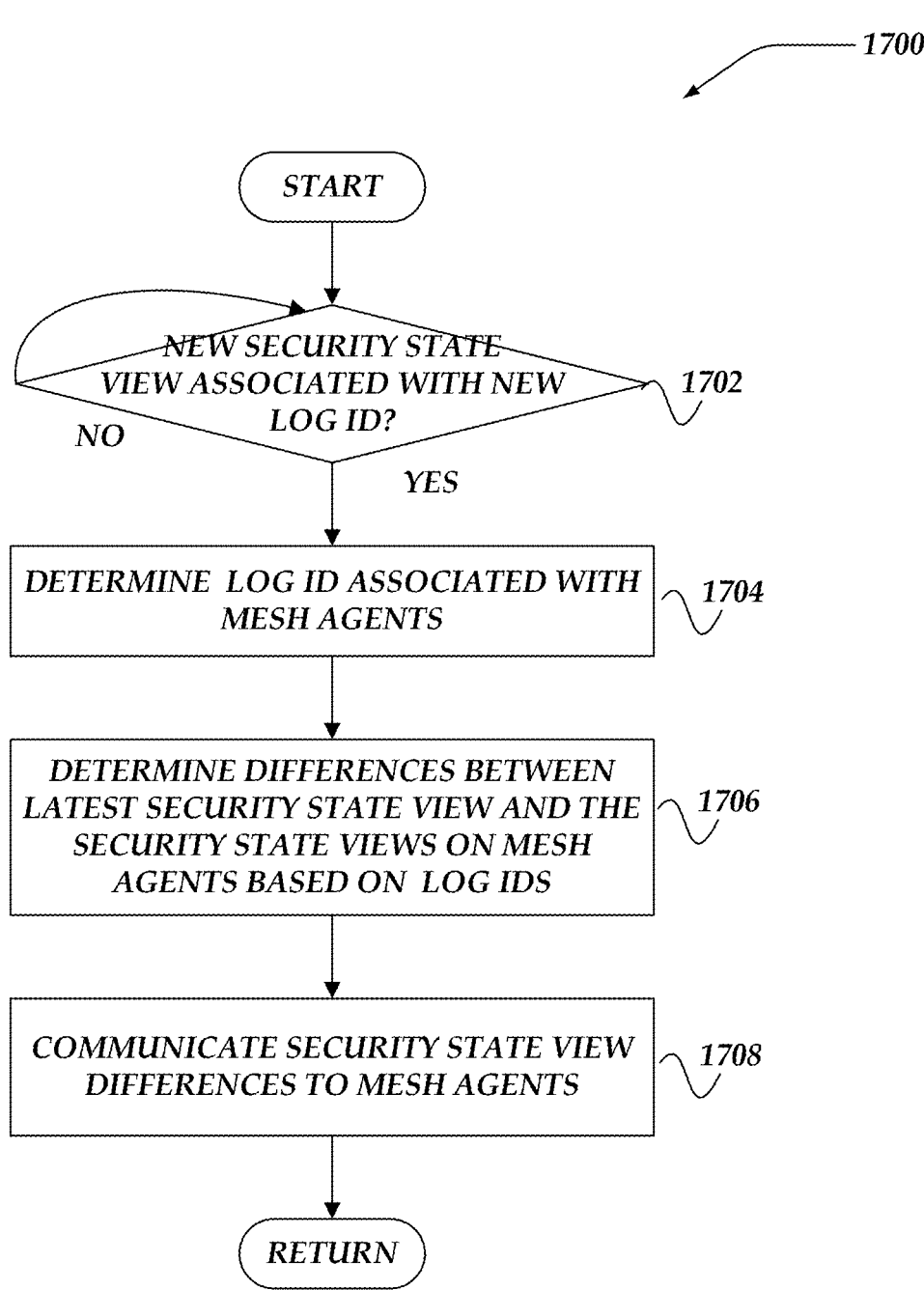
FIG. 17 illustrates a flowchart of a process for distributing security policies in accordance with one or more of the various embodiments.

Next, in one or more of the various embodiments, control may be returned to a calling process FIG. 17 illustrates a flowchart of process 1700 for distributing security policies in accordance with one or more of the various embodiments. After a start block, at decision block 1702, in one or more of the various embodiments, if there may be a new security state view associated with a new log ID, control may flow to block 1704; otherwise, control may loop back to decision block 1702.

In some embodiments, infrastructure security engines may be arranged to monitor for updated security state views that result from entity information changes or policy modifications that may require distribution to one or more associated mesh agents. In some embodiments, infrastructure security engines may be arranged to detect new security state views by comparing their current log identifier with previously distributed log identifiers to determine if mesh agent synchronization may be required. Accordingly, in some embodiments, infrastructure security engines may be arranged to employ event-driven mechanisms, periodic checks, notification systems, or the like to identify if new security state views have been generated that differ from security state views currently deployed on mesh agents. In some embodiments, if no new security state view may be available, infrastructure security engines may continue monitoring activities until entity modifications or policy changes generate updated security state views requiring mesh agent distribution.

At block 1704, in one or more of the various embodiments, infrastructure security engines may be arranged to determine one or more log IDs associated with one or more mesh agents. In some embodiments, infrastructure security engines may be arranged to query mesh agents or maintain mesh agent state information that includes the log identifiers corresponding to security state views currently deployed on each mesh agent. In some embodiments, infrastructure security engines may be arranged to track log identifiers for multiple mesh agents simultaneously to enable efficient batch processing of security state view updates across distributed mesh agent deployments. Accordingly, in some embodiments, infrastructure security engines may be arranged to maintain mesh agent information that includes mesh agent identifiers, network addresses, capability information, or current security state view log identifiers to facilitate targeted update operations.

At block 1706, in one or more of the various embodiments, infrastructure security engines may be arranged to determine differences between the latest security state view on the infrastructure security engines, and the security state views on the mesh agents based on log IDs. In some embodiments, infrastructure security engines may be arranged to calculate incremental changes or deltas between log identifier ranges to identify specific security policies, entity modifications, or policy updates that need to be communicated to mesh agents. In some embodiments, infrastructure security engines may be arranged to optimize update operations by computing minimal change sets that include only modified policies or entities rather than transmitting entire security state views to mesh agents. Accordingly, in some embodiments, infrastructure security engines may be arranged to employ change detection algorithms that analyze log identifier sequences to determine which security policies have been added, modified, or removed since the mesh agent's last synchronization operation. Thus, in some embodiments, difference calculation enables efficient mesh agent updates by minimizing network bandwidth utilization or reducing computational overhead that may be associated with security state view synchronization.

At block 1708, in one or more of the various embodiments, infrastructure security engines may be arranged to communicate the one or more security state view differences to the one or more mesh agents. In some embodiments, infrastructure security engines may be arranged to transmit incremental security state view updates to mesh agents using secure communication channels that ensure confidentiality or integrity of policy distribution operations. In some embodiments, infrastructure security engines may be arranged to employ compression algorithms, batching mechanisms, prioritization schemes, or the like to optimize security state view distribution across multiple mesh agents in distributed network environments. Accordingly, in some embodiments, infrastructure security engines may be arranged to validate successful mesh agent updates by receiving acknowledgment messages that include updated log identifiers confirming successful security state view synchronization. In some embodiments, infrastructure security engines may be arranged to handle mesh agent update failures by implementing retry mechanisms, error logging, or fallback procedures to ensure consistent policy enforcement across the managed network environment.

Next, in one or more of the various embodiments, control may be returned to a calling process.

Figure 18:
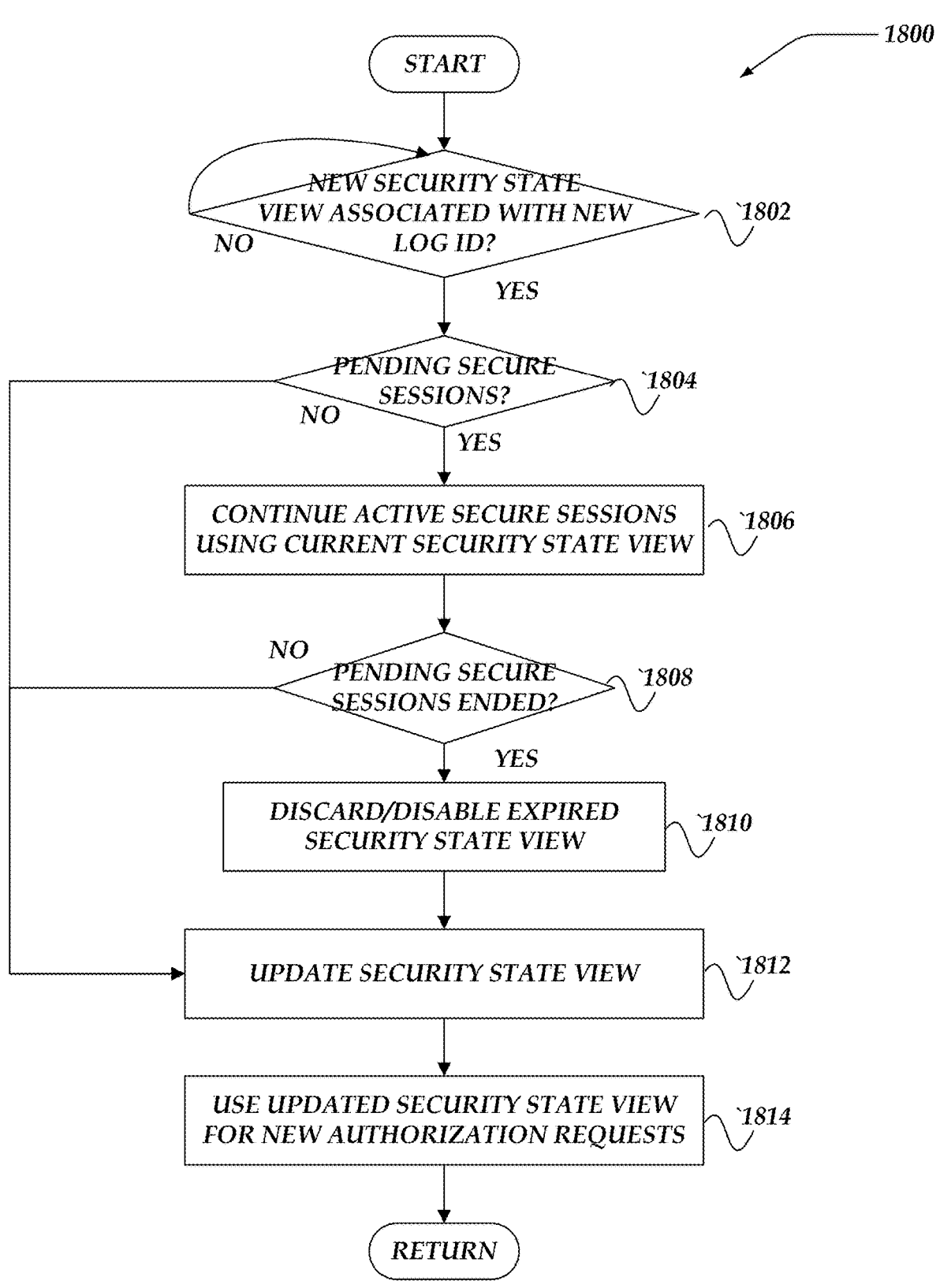
FIG. 18 illustrates a flowchart of a process for distributing security policies in accordance with one or more of the various embodiments.

FIG. 18 illustrates a flowchart of process 1800 for distributing security policies in accordance with one or more of the various embodiments. After a start block, at decision block 1802, in one or more of the various embodiments, if a new security state view associated with a new log ID may be determined, control may flow to decision block 1804; otherwise, control may loop back to decision block 1802.

In some embodiments, infrastructure security engines may be arranged to monitor for updated security state views that result from entity information changes or policy modifications requiring session management coordination with one or more associated mesh agents. In some embodiments, infrastructure security engines may be arranged to detect new security state views by comparing their current log identifier with previously active log identifiers to determine if session-aware security state view management operations may be required. Accordingly, in some embodiments, infrastructure security engines may be arranged to employ event-driven mechanisms, periodic checks, or notification systems to identify if new security state views have been generated that may impact ongoing sessions or require coordination with active mesh agent operations. In some embodiments, if no new security state view may be available, infrastructure security engines may continue monitoring activities until entity modifications or policy changes generate updated security state views requiring session management operations.

At decision block 1804, in one or more of the various embodiments, if there may be one or more pending sessions, control may flow to block 1806; otherwise, control may flow to block 1812. In some embodiments, infrastructure security engines may be arranged to evaluate active session states across one or more mesh agents to determine if ongoing client connections or resource access operations depend on current security state views before implementing security state view transitions. In some embodiments, infrastructure security engines may be arranged to maintain session tracking information that associates active sessions with specific security state view versions to ensure consistent policy enforcement throughout session lifecycles. Accordingly, in some embodiments, infrastructure security engines may be arranged to query mesh agents for session dependency information to identify sessions that may require preservation of current security state views during security state view update operations. In some embodiments, if no pending sessions exist across the managed mesh agent infrastructure, infrastructure security engines may proceed directly with security state view update operations without session coordination considerations.

At block 1806, in one or more of the various embodiments, the one or more mesh agents associated with the pending session may continue to use the one or more active session using their associated security state views. In some embodiments, mesh agents may be arranged to maintain multiple versions of security state views concurrently to support ongoing sessions that were initiated using prior security state view versions while accommodating new security state view deployments. In some embodiments, mesh agents may be arranged to preserve session continuity by continuing to enforce security policies based on the security state view that was active when the session was established rather than immediately switching to newer security state views. Accordingly, in some embodiments, mesh agents may be arranged to isolate session operations from security state view updates to prevent policy enforcement inconsistencies that may disrupt active client connections or resource access operations. In some embodiments, session-specific security state view preservation enables mesh agents to maintain reliable service delivery while accommodating dynamic policy updates in the managed network environment.

At decision block 1808, in one or more of the various embodiments, if the one or more pending session may have ended, control may flow to block 1810; otherwise, control may flow to block 1812. In some embodiments, infrastructure security engines may be arranged to monitor session completion events across one or more mesh agents to determine if security state view cleanup operations may be performed for versions that are no longer required for active sessions. In some embodiments, infrastructure security engines may be arranged to track session lifecycles to identify opportunities for memory optimization by removing superseded security state views that have no remaining session dependencies. Accordingly, in some embodiments, infrastructure security engines may be arranged to employ session monitoring mechanisms that provide notifications if sessions terminate to trigger security state view maintenance activities across the mesh agent infrastructure. In some embodiments, if pending sessions remain active, infrastructure security engines may defer security state view cleanup operations to preserve policy enforcement consistency for ongoing sessions.

At block 1810, in one or more of the various embodiments, infrastructure security engines may be arranged to discard or disable to one or more superseded security state views. In some embodiments, infrastructure security engines may be arranged to perform garbage collection operations on security state views that are no longer required for active sessions to optimize memory utilization or reduce storage overhead across the mesh agent infrastructure. In some embodiments, infrastructure security engines may be arranged to implement cleanup policies that determine retention periods for superseded security state views based on system capacity constraints, administrative requirements, or operational considerations. Accordingly, in some embodiments, infrastructure security engines may be arranged to validate that no active sessions depend on superseded security state views before performing removal operations to prevent disruption of ongoing client connections across one or more mesh agents. Thus, in some embodiments, security state view cleanup operations enable infrastructure security engines to maintain efficient resource utilization while preserving session consistency requirements across the distributed mesh agent environment.

At block 1812, in one or more of the various embodiments, infrastructure security engines may be arranged to update the security state view associated with the one or more mesh agents. In some embodiments, infrastructure security engines may be arranged to distribute updated security state views to one or more associated mesh agents using secure communication channels that ensure confidentiality or integrity of policy distribution operations. In some embodiments, infrastructure security engines may be arranged to calculate incremental changes between current mesh agent security state views or the latest security state view to minimize network bandwidth utilization during update operations. Accordingly, in some embodiments, infrastructure security engines may be arranged to coordinate mesh agent updates to ensure consistent policy enforcement across distributed network segments while managing update scheduling to minimize operational disruption. In some embodiments, infrastructure security engines may be arranged to validate successful mesh agent synchronization by receiving confirmation messages that include updated log identifiers indicating successful security state view deployment.

At block 1814, in one or more of the various embodiments, infrastructure security engines or mesh agents may be arranged to use the new or updated security state views for new authorization requests. In some embodiments, infrastructure security engines or mesh agents may be arranged to apply updated security state views to newly initiated sessions or authorization requests while maintaining existing sessions using their original security state view versions for consistent policy enforcement. In some embodiments, infrastructure security engines or mesh agents may be arranged to ensure that authorization decisions reflect current entity attributes, policy modifications, or access permissions as represented in the updated security state views. Accordingly, in some embodiments, infrastructure security engines or mesh agents may be arranged to implement policy enforcement mechanisms that seamlessly transition between security state view versions based on session establishment timing or authorization request contexts. Thus, in some embodiments, selective application of updated security state views enables infrastructure security engines or mesh agents to maintain session consistency while ensuring that new operations benefit from current security policies or entity information.

Next, in one or more of the various embodiments, control may be returned to a calling process.

Figure 19:
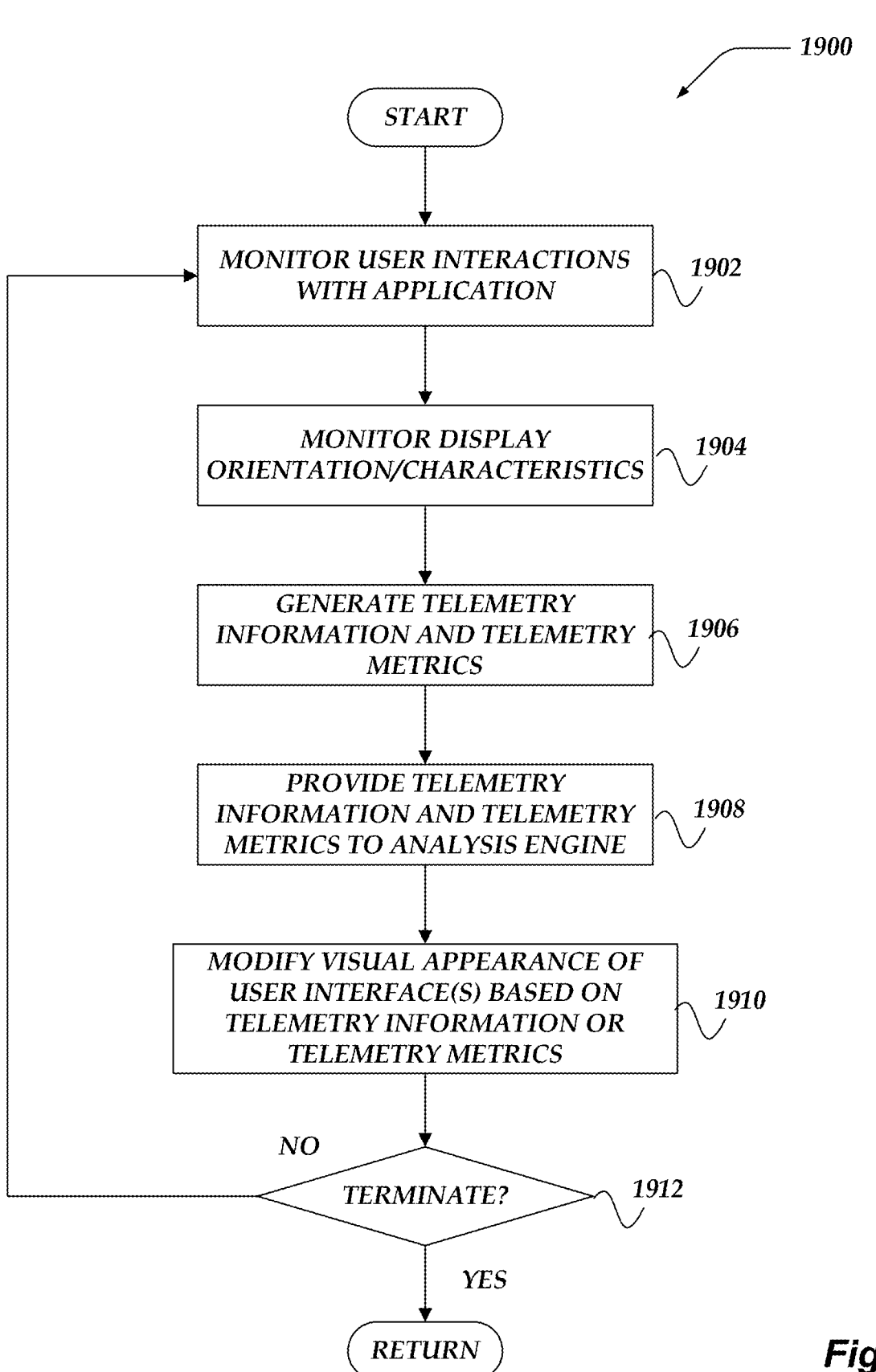
FIG. 19 illustrates a flowchart of a process for collecting and applying telemetry information and telemetry metrics for distributing security policies in accordance with one or more of the various embodiments.

FIG. 19 illustrates a flowchart of process 1900 for collecting and applying telemetry information and telemetry metrics for distributing security policies in accordance with one or more of the various embodiments. After a start block, at block 1902, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 13 for additional details.

At block 1904, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1906, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1908, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as analysis engines, threat hunting engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1910, in one or more of the various embodiments, analysis engines or threat hunting engines may be arranged to modify the visual appearance of one or more user interfaces based on the telemetry information or telemetry metrics.

Accordingly, in some embodiments, analysis engines or threat hunting engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines may be arranged to highlight or size the preferred user interface elements or display panels. For example, if users are determined to rarely interact with a particular display panel, analysis engines may be arranged to reduce the size, diminish the shape, disable its controls, and reposition that display panel to improve the efficiency of display screen usage. See, also FIG. 13 and its description.

At decision block 1912, in one or more of the various embodiments, if the telemetry engine, analysis engine, or threat hunting engine may be terminated, control may be returned to a calling process; otherwise, control may loop back to block 1902. In some embodiments, telemetry engines may be arranged to continuously or periodically provide updated/current telemetry information or telemetry metrics to enable analysis engines or threat hunting engines to dynamically change the visual appearance of the one or more user interfaces. Accordingly, in some embodiments, process 1900 may continue operation until it may be explicitly terminated or the operation of the associated analysis engines or threat hunting engines may be terminated.

It will be understood that each block of the flowchart illustrations or combinations of blocks in these flowchart illustrations, may be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing interactions with applications in a computing environment using one or more processors that are configured to execute instructions that cause performance of actions, comprising:

obtaining one or more entity change entries associated with updating, adding or removing a plurality of entities from an entity datastore; and employing a request to obtain a security state view to perform further actions, including:

obtaining a new log identifier based on a current log identifier associated with the request;

obtaining one or more log change entries associated with the new log identifier and the plurality of entities based on the one or more entity change entries;

collecting one or more entities based on one or more other log change entries that are associated with one or more log identifiers that are associated with the request; and obtaining the security state view based on the one or more entities, wherein the security state view is associated with the new log identifier, and wherein the security state view enforces one or more security policies for the one or more entities in the computing environment; and obtaining a user interface that includes one or more display panels for content that includes a report associated with the security state view that is dynamically transformed and arranged for display to a user based on one or more of user interaction telemetry, user feedback or telemetry metrics.

2. The method of claim 1, further comprising:

monitoring one or more entity information sources that include one or more of a configuration database, an identity provider, a credential service, or a directory system;

obtaining one or more entity modifications from the one or more entity information sources;

collecting one or more entity attribute changes that are associated with policy enforcement; and obtaining an entity change entry for each entity associated with the one or more entity attribute changes.

3. The method of claim 1, wherein obtaining the one or more entity change entries, further comprises:

collecting one or more entity identifiers that correspond to one or more updated entities; and associating each of the one or more entity identifiers with an entity change entry.

4. The method of claim 1, wherein the one or more entities include one or more of a user account, a resource endpoint, an application service, a network segment, or a policy rule that is referenced by the one or more security policies.

5. The method of claim 1, further comprising:

collecting one or more mesh agents that are associated with another log identifier and another security state view; and obtaining information associated with one or more differences between the security state view and the other security state views based on the security state view, the other log identifier, and the other security state view, wherein the information is communicated to the one or more mesh agents.

6. The method of claim 1, further comprising:

obtaining one or more active sessions that are associated with one or more security state views, wherein the one or more active sessions are associated with separate log identifiers;

preserving the one or more security state views that are associated with the one or more active sessions;

collecting one or more session completion events associated with the one or more active sessions; and discarding the one or more security state views that are associated with the one or more session completion events.

7. The method of claim 1, wherein obtaining the security state view, further comprises:

obtaining one or more partial security state views based on the one or more security policies that reference the one or more entities; and updating the security state view to include the one or more partial security state views.

8. The method of claim 1, further comprising:

obtaining one or more adapters configured to transform entity information from one or more entity datastore formats into one or more security state formats, wherein the one or more adapters include one or more of an instruction set, a data transformation rule, a format converter, or an entity attribute filter; and converting the one or more entities from the one or more entity datastore formats into one or more security state view formats for inclusion in the security state view to enforce the one or more security policies.

9. A network computer for managing interactions with applications, comprising:

a memory that stores at least instructions; and one or more processors that execute instructions that are configured to cause actions, including:

obtaining one or more entity change entries associated with updating, adding or removing a plurality of entities from an entity datastore; and employing a request to obtain a security state view to perform further actions, including:

obtaining a new log identifier based on a current log identifier associated with the request;

obtaining one or more log change entries associated with the new log identifier and the plurality of entities based on the one or more entity change entries;

collecting one or more entities based on one or more other log change entries that are associated with one or more log identifiers that are associated with the request; and obtaining the security state view based on the one or more entities, wherein the security state view is associated with the new log identifier, and wherein the security state view enforces one or more security policies for the one or more entities in the computing environment; and obtaining a user interface that includes one or more display panels for content that includes a report associated with the security state view that is dynamically transformed and arranged for display to a user based on one or more of user interaction telemetry, user feedback or telemetry metrics.

10. The network computer of claim 9, wherein the one or more processors execute instructions that are configured to cause actions, further comprising:

monitoring one or more entity information sources that include one or more of a configuration database, an identity provider, a credential service, or a directory system;

obtaining one or more entity modifications from the one or more entity information sources;

collecting one or more entity attribute changes that are associated with policy enforcement; and obtaining an entity change entry for each entity associated with the one or more entity attribute changes.

11. The network computer of claim 9, wherein obtaining the one or more entity change entries, further comprises:

collecting one or more entity identifiers that correspond to one or more updated entities; and associating each of the one or more entity identifiers with an entity change entry.

12. The network computer of claim 9, wherein the one or more entities include one or more of a user account, a resource endpoint, an application service, a network segment, or a policy rule that is referenced by the one or more security policies.

13. The network computer of claim 9, wherein the one or more processors execute instructions that are configured to cause actions, further comprising:

collecting one or more mesh agents that are associated with another log identifier and another security state view; and obtaining information associated with one or more differences between the security state view and the other security state views based on the security state view, the other log identifier, and the other security state view, wherein the information is communicated to the one or more mesh agents.

14. The network computer of claim 9, wherein the one or more processors execute instructions that are configured to cause actions, further comprising:

obtaining one or more active sessions that are associated with one or more security state views, wherein the one or more active sessions are associated with separate log identifiers;

preserving the one or more security state views that are associated with the one or more active sessions;

collecting one or more session completion events associated with the one or more active sessions; and discarding the one or more security state views that are associated with the one or more session completion events.

15. The network computer of claim 9, wherein obtaining the security state view, further comprises:

obtaining one or more partial security state views based on the one or more security policies that reference the one or more entities; and updating the security state view to include the one or more partial security state views.

16. The network computer of claim 9, wherein the one or more processors execute instructions that are configured to cause actions, further comprising:

obtaining one or more adapters configured to transform entity information from one or more entity datastore formats into one or more security state formats, wherein the one or more adapters include one or more of an instruction set, a data transformation rule, a format converter, or an entity attribute filter; and converting the one or more entities from the one or more entity datastore formats into one or more security state view formats for inclusion in the security state view to enforce the one or more security policies.

17. A processor readable non-transitory storage media that includes instructions configured for managing interactions with applications in a computing environment, wherein execution of the instructions by one or more processors on one or more network computers performs actions, comprising:

obtaining one or more entity change entries associated with updating, adding or removing a plurality of entities from an entity datastore; and employing a request to obtain a security state view to perform further actions, including:

obtaining a new log identifier based on a current log identifier associated with the request;

obtaining one or more log change entries associated with the new log identifier and the plurality of entities based on the one or more entity change entries;

collecting one or more entities based on one or more other log change entries that are associated with one or more log identifiers that are associated with the request; and obtaining the security state view based on the one or more entities, wherein the security state view is associated with the new log identifier, and wherein the security state view enforces one or more security policies for the one or more entities in the computing environment; and obtaining a user interface that includes one or more display panels for content that includes a report associated with the security state view that is dynamically transformed and arranged for display to a user based on one or more of user interaction telemetry, user feedback or telemetry metrics.

18. The media of claim 17, wherein the one or more entities include one or more of a user account, a resource endpoint, an application service, a network segment, or a policy rule that is referenced by the one or more security policies.

19. The media of claim 17, further comprising:

collecting one or more mesh agents that are associated with another log identifier and another security state view; and obtaining information associated with one or more differences between the security state view and the other security state views based on the security state view, the other log identifier, and the other security state view, wherein the information is communicated to the one or more mesh agents.

20. The media of claim 17, further comprising:

obtaining one or more adapters configured to transform entity information from one or more entity datastore formats into one or more security state formats, wherein the one or more adapters include one or more of an instruction set, a data transformation rule, a format converter, or an entity attribute filter; and converting the one or more entities from the one or more entity datastore formats into one or more security state view formats for inclusion in the security state view to enforce the one or more security policies.

* * * * *